US008344175B2

(12) United States Patent
Goldfinger et al.

(10) Patent No.: US 8,344,175 B2
(45) Date of Patent: *Jan. 1, 2013

(54) LIQUID CRYSTAL COMPOSITIONS, POLYMER NETWORKS DERIVED THEREFROM AND PROCESS FOR MAKING THE SAME

(75) Inventors: Marc B. Goldfinger, West Chester, PA (US); Jose Manuel Rodriguez-Parada, Hockessin, DE (US); Lee A. Silverman, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,891

(22) Filed: Jan. 25, 2011

(65) Prior Publication Data

US 2011/0114885 A1 May 19, 2011

Related U.S. Application Data

(62) Division of application No. 11/731,289, filed on Mar. 30, 2007, now Pat. No. 7,879,256.

(60) Provisional application No. 60/788,525, filed on Mar. 31, 2006.

(51) Int. Cl.
*C07C 67/08* (2006.01)
*C07C 69/76* (2006.01)

(52) U.S. Cl. ........... 560/98; 560/80; 560/81; 560/84; 560/85; 560/100

(58) Field of Classification Search ........... 560/880, 560/80, 81, 84, 85, 98, 100
See application file for complete search history.

(56) References Cited

U.S. PATENT DOCUMENTS

| | | | |
|---|---|---|---|
| 4,614,619 A | 9/1986 | Shannon | |
| 4,637,896 A | 1/1987 | Shannon | |
| 5,506,704 A | 4/1996 | Broer et al. | |
| 5,560,864 A | 10/1996 | Goulding | |
| 5,780,629 A | 7/1998 | Etzbach et al. | |
| 5,793,456 A | 8/1998 | Broer et al. | |
| 5,833,880 A | 11/1998 | Siemensmeyer et al. | |
| 5,885,242 A | 3/1999 | Arick et al. | |
| 5,942,030 A | 8/1999 | Schuhmacher et al. | |
| 6,010,643 A | 1/2000 | Coates et al. | |
| 6,060,042 A | 5/2000 | Schuhmacher et al. | |
| 6,120,859 A | 9/2000 | Buchecker et al. | |
| 6,217,792 B1 | 4/2001 | Parri et al. | |
| 6,410,130 B1 | 6/2002 | Schuhmacher et al. | |
| 6,468,444 B1 | 10/2002 | Meyer | |
| 6,607,677 B1 | 8/2003 | Buchecker et al. | |
| 6,723,395 B2 | 4/2004 | May et al. | |
| 6,887,455 B2 | 5/2005 | Carpenter et al. | |
| 7,119,161 B2 | 10/2006 | Lawandy | |
| 7,736,532 B2* | 6/2010 | Silverman et al. | 252/299.01 |
| 7,744,970 B2* | 6/2010 | Silverman et al. | 428/1.3 |
| 7,749,577 B2* | 7/2010 | Goldfinger et al. | 428/1.3 |
| 7,879,256 B2* | 2/2011 | Goldfinger et al. | 252/299.67 |
| 7,988,881 B2 | 8/2011 | Qi | |
| 8,034,255 B2 | 10/2011 | Goldfinger | |
| 8,044,228 B2* | 10/2011 | Goldfinger | 560/55 |
| 8,067,068 B2 | 11/2011 | Goldfinger | |
| 2002/0013482 A1 | 1/2002 | Brader et al. | |
| 2005/0224754 A1 | 10/2005 | Harai et al. | |
| 2007/0116945 A1* | 5/2007 | Goldfinger et al. | 428/323 |
| 2007/0152188 A1* | 7/2007 | Silverman et al. | 252/299.01 |
| 2007/0154718 A1* | 7/2007 | Silverman et al. | 428/411.1 |
| 2007/0228326 A1 | 10/2007 | Goldfinger | |

(Continued)

FOREIGN PATENT DOCUMENTS

DE 4408170 A1 9/1995

(Continued)

OTHER PUBLICATIONS

Alexey Bobrovsky, et. al., AStudy of Photooptical Processes in Photosensivtive Cholesteric Azobenzene Containing Polymer Mixture under an Actiton of the Polarized and Nonpolarized Light, Science Direct, Aug. 27, 2005.
Aileen A. Craig et. al., Effect of Spacer Length on the Thermal Properties of Side-Chain Liquid Crystal Polymethacrylates. 2. Synthesis and Characterization of the Poly[w-{4'-cyanobiphenyl-4-yloxy) alkyl methacrylate}s, Macromolecules, 1995, vol. 28:3617-3624.
P.G. De Gennes et. al., The Physics of Liquid Crystals, 1995, Oxford University Press (Book Not Included).
H. Bassler et. al., Helical Twisting Power of Steroidal Solutes in Cholesteric Mesophases, J. Chem. Phys., 1970, vol. 52:631-637.

(Continued)

*Primary Examiner* — Shean C Wu
(74) *Attorney, Agent, or Firm* — Kevin S. Dobson

(57) ABSTRACT

The invention relates to compounds of Formula (I):

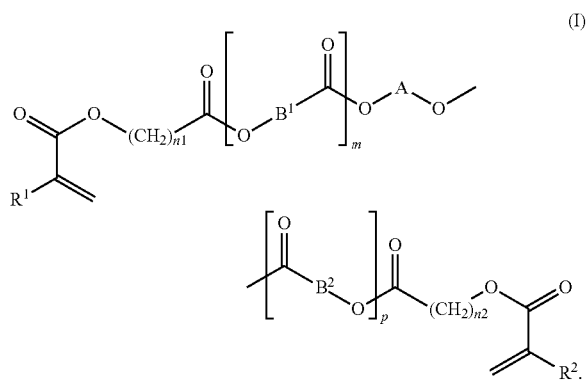

The invention further relates to liquid crystal compositions comprising compounds of Formula (I); compositions further comprising one or more chiral compounds; and polymer networks derived from the polymerization of the liquid crystal compositions. Another embodiment relates to processes for providing compounds of Formula (I).

11 Claims, 1 Drawing Sheet

U.S. PATENT DOCUMENTS

| 2007/0267599 A1 | 11/2007 | Goldfinger |
|---|---|---|
| 2009/0161061 A1 | 6/2009 | Qi |

FOREIGN PATENT DOCUMENTS

| EP | 261712 A1 | 3/1988 |
|---|---|---|
| EP | 397263 B1 | 12/1994 |
| EP | 331233 B1 | 4/1997 |
| EP | 1038941 | 2/2002 |
| EP | 0734852 | 12/2002 |
| JP | 1992281403 | 7/1992 |
| JP | 1994016616 | 1/1994 |
| JP | 2000122059 | 4/2000 |
| JP | 2005097377 | 4/2005 |
| WO | 9516007 | 6/1995 |
| WO | 9847979 A1 | 10/1998 |
| WO | 9958334 | 11/1999 |
| WO | 0160604 | 8/2001 |
| WO | 02066493 A2 | 8/2002 |
| WO | 2006128090 | 11/2006 |
| WO | 2006128091 A2 | 11/2006 |
| WO | 2009023759 | 2/2009 |
| WO | 2009023762 | 2/2009 |

OTHER PUBLICATIONS

Dirk J. Broer et. al., Oriented Polymer Networks From a Mesogenic Diacrylate, Makromol. Chem., 1989, vol. 190:2255-2268.

Seiji Kurihara et. al. Preparation of Helical Polyelectrolyte Networks by Polymerization of Hydrogen Bonding Liquid Crystalline Monomers, Macromolecules, 1988, vol. 31:5940-5942.

Chain-Shu et. al., Preparation of Liquid-Crystal Thermosets: In Situ Photopolymerization of Oriented Liquid-Crystal Diacrylates, J. Polym. Sci., Part A: Polym. Chem., 1999, vol. 37:3929-3935.

Dirk J. Broer et. al., In-Situ Photopolymerization of Oriented Liquid-Crystalline Acrylates, 4, Influence of a Lateral Methyl Substituent on Monomer and Oriented Polymer Network Properties of a Mesogenic Diacrylate, Makromol. Chem., 1989, vol. 190:3201-3215.

Shibaev et. al., Thermotropic Liquid Crysalline Polymers 8. Optical and Structural Properties of New Nematic and Cholesteric Polymers, Polymer Bullentin, 1982, vol. 6:485-492.

E.V. Dehmlow, Phase-Tranfer Catalyzed Two-Phase Reactions in Preparative Organic Chemistry, Angewante Chemie, International Edition, 1974, vol, 13:170-179.

Pretsch et. al., Tables of Spectral Data for Structure Determination of Organic Compounds, 2nd Edition, 1989, pp. 141-142.

Dirk J. Broer et. al., In-Situ Photopolymerization of Oriented Liquid-Crystalline Acrylates, 5), Makromol. Chem., 1991, vol. 192:59-74.

CAPLUS 2005: 315856.

\* cited by examiner

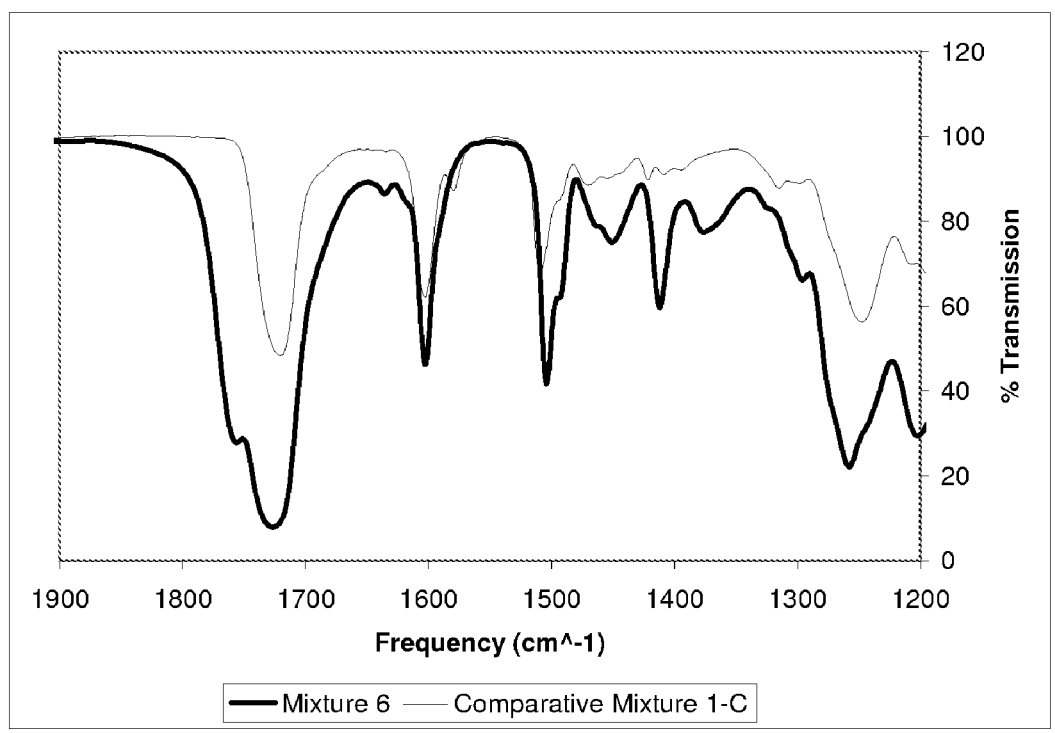

LIQUID CRYSTAL COMPOSITIONS, POLYMER NETWORKS DERIVED THEREFROM AND PROCESS FOR MAKING THE SAME

This application is a division of, and claims the benefit under 35U.S.C. §120 of, U.S. application Ser. No. 11/731,289, filed Mar. 30, 2007, which is by this reference incorporated in its entirety as a part hereof for all purposes.

This application claims the benefit of U.S. Provisional Application No. 60/788,525, filed Mar. 31, 2006, which is incorporated in its entirety as a part hereof for all purposes.

TECHNICAL FIELD

The present invention is related to the chemical synthesis of bis (meth)acrylate liquid crystal compounds and polymerization of liquid crystal compositions to provide polymer networks with useful nematic and cholesteric optical properties.

BACKGROUND

Thermotropic liquid crystals are generally crystalline compounds with significant anisotropy in shape. That is, at the molecular level, they are characterized by a rod-like or disc like structure. When heated they typically melt in a stepwise manner, exhibiting one or more thermal transitions from a crystal to a final isotropic phase. The intermediate phases, known as mesophases, can include several types of smectic phases wherein the molecules are generally confined to layers; and a nematic phase wherein the molecules are aligned parallel to one another with no long range positional order. The liquid crystal phase can be achieved in a heating cycle, or can be arrived at in cooling from an isotropic phase. A comprehensive description of the structure of liquid crystals in general, and twisted nematic liquid crystals in particular is given in "The Physics of Liquid Crystals," P. G. de Gennes and J. Prost, Oxford University Press, 1995.

An important variant of the nematic phase is one wherein a chiral moiety is present, referred to as a twisted nematic or cholesteric phase. In this case, the molecules are parallel to each other as in the nematic phase, but the director of molecules (the average direction of the rodlike molecules) changes direction through the thickness of a layer to provide a helical packing of the nematic molecules. The pitch of the helix is perpendicular to the long axes of the molecules. This helical packing of anisotropic molecules leads to important and characteristic optical properties of twisted nematic phases including circular dichroism, a high degree of rotary power; and the selective reflection of light, including ultraviolet, visible, and near-IR light. Reflection in the visible region leads to brilliantly colored layers. The sense of the helix can either be right-handed or left-handed, and the rotational sense is an important characteristic of the material. The chiral moiety either may be present in the liquid crystalline molecule itself, for instance, as in a cholesteryl ester, or can be added to the nematic phase as a dopant, with induction of the cholesteric phase. This phenomenon is well documented, see e.g. H. Bassler, M. M. Labes, J. Chem. Phys., 52 p 631 (1970).

There has been significant effort invested in the synthesis and polymerization methods for preparing stable polymer layers exhibiting fixed nematic and/or cholesteric optical properties. One approach has been to synthesize monofunctional and/or polyfunctional reactive monomers that exhibit a nematic or cholesteric phase upon melting, formulate a low melting liquid crystal composition, and polymerize the liquid crystal composition in its nematic or cholesteric phase to provide a polymer network exhibiting stable optical properties of the nematic or cholesteric phase. Use of cholesteric monomers alone, as disclosed in U.S. Pat. No. 4,637,896, provided cholesteric layers with the desired optical properties, but the polymer layers possessed relatively weak mechanical properties.

Many efforts have been made to improve the physical properties and thermal stabilities by formulating twisted nematic monomer phases that are capable of crosslinking polymerizations to provide polymer networks. Examples of these crosslinking monomers are his (meth)acrylates with ether groups (—O—) linking a core mesogen to flexible spacers and the polymerizable (meth)acrylates. Their synthesis and use in forming polymer networks are disclosed in Makromol. Chem. 190, 2255-2268 (1989); Macromolecules, 1988, 31, 5940; Makromol. Chem. 192, 59-74 (1991); WO 1998/047979; J. Polym. Sci.: Part A: Polym. Chem., Vol. 37, 3929-3935 (1999); Makromol. Chem. 190, 3201-3215 (1989); U.S. Pat. No. 5,833,880; DE 4,408,170; EP 261,712; EP 331,233 B1; EP 397,263 B1; and JP 1994/016616A. Although many of these references also claim ester groups (—C(O)—O—) linking the core mesogen to flexible spacers and the polymerizable (meth)acrylate, there is limited disclosure in any reference useful in relation to the teaching of how to make and use bis(meth)acrylates with ester groups (—C(O)—O—) linking the core mesogen to flexible spacers and the polymerizable (meth)acrylates. Furthermore, there is limited disclosure in relation to their specific physical or chemical properties.

The preparation of monofunctional (meth)acrylate liquid crystal monomers having an aliphatic ester group (—C(O)—O—) linking the mesogen to a flexible spacer and the polymerizable (meth)acrylate is disclosed by Shibaev, et al, in Polymer Bulletin, 6, 485-492 (1982), and similar compounds linking a (meth)acrylate to a cholesteryl mesogen via a flexible spacer and an ester moiety are disclosed in U.S. Pat. No. 4,614,619. However, since his (meth)acrylate mesogens with ester linkages have not been prepared, any benefit of the utilities and properties previously thought to exist for them is difficult to realize.

A need thus remains for a process to make bis(meth)acrylates with esters linking the mesogen to a flexible spacer and the polymerizable (meth)acrylates. There is also a need for crosslinking monomers that exhibit nematic and/or cholesteric phases over broad temperature ranges, and there is a need for polymer networks that exhibit cholesteric optical properties.

SUMMARY

One embodiment of the invention is a compound of Formula (I):

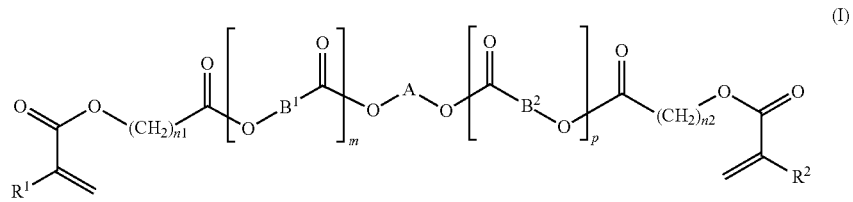

wherein $R^1$ and $R^2$ are each independently selected from the group: H, F, Cl and $CH_3$; n1 and n2 are each independently integers 3 to 20; m and p are each independently integers 0, 1 or 2;

A is a divalent radical selected from the group:

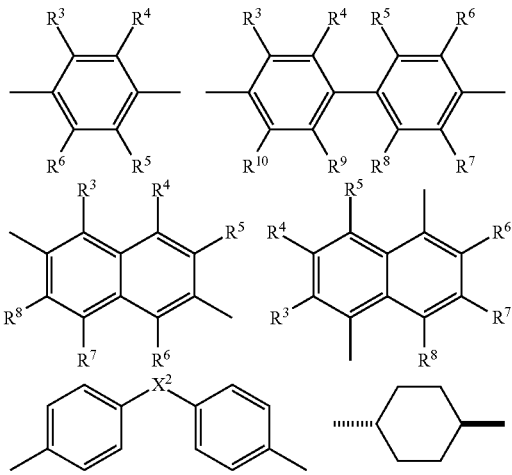

wherein $R^3$-$R^{10}$ are each independently selected from the group: H, C1-C8 straight or branched chain alkyl, C1-C8 straight or branched chain alkyloxy, F, Cl, phenyl, —C(O)CH$_3$, CN, and CF$_3$;

$X^2$ is a divalent radical selected from the group: —O—, —(CH$_3$)$_2$C—, and —(CF$_3$)$_2$C—; and each $B^1$ and $B^2$ is a divalent radical independently selected from the group: $R^{11}$-substituted-1,4-phenyl, wherein $R^{11}$ is H, —CH$_3$ or —OCH$_3$; 2,6-naphthyl; and 4,4'-biphenyl; with the proviso that when m+p is equal to 3 or 4, at least two of $B^1$ and $B^2$ are $R^{11}$-substituted-1,4-phenyl.

Another embodiment of the invention is a liquid crystal composition comprising at least one compound of Formula (I), and in a further embodiment the liquid crystal composition includes at least one chiral compound.

Another embodiment of the invention is a polymer network derived from the polymerization of the liquid crystal composition comprising at least one compound of Formula (I), and in a further embodiment the polymer network is derived from polymerization of the liquid crystal composition including at least one chiral compound.

Another embodiment of the invention is a process comprising: (a) providing one or more organic polyol(s) wherein each polyol comprises at least two hydroxyl groups and at least two covalently bonded carbon atoms, each hydroxyl group being bonded to a different carbon atom within an organic polyol; (b) reacting the organic polyol(s) with one or more functionalized alkyl acid(s) or acid halide(s) of the Formula (V):

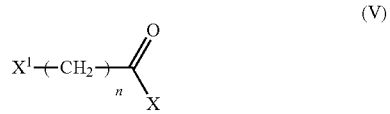

wherein X is Cl, Br or —OH; $X^1$ is selected from the group: Cl, Br, I, -OMs, -OTs and -OTf (as described below); and n is an integer equal to 3 to 20; and a first reaction solvent at a first reaction temperature to provide one or more polyfunctionalized aryl alkanoate ester(s) and a first spent reaction mixture; and (c) reacting the one or more polyfunctionalized aryl alkanoate ester(s) with a (meth)acrylate salt in the presence of a phase transfer catalyst, and a second reaction solvent at a second reaction temperature; to provide one or more poly(meth)acrylate-aryl alkanoate ester(s) and a second spent reaction mixture.

BRIEF DESCRIPTION OF THE DRAWINGS

FIG. 1 illustrates the FT-IR spectrum of a polymer network of the invention having aryl alkanoate ester linkages and a conventional polymer network having ether linkages.

DETAILED DESCRIPTION

The terms (meth)acrylate salt, (meth)acrylate ester, (meth)acrylate acid, and the like, herein encompass materials and moieties comprising: methacrylate, for instance wherein $R^1$ and/or $R^2$ is methyl; acrylate, wherein $R^1$ and/or $R^2$ is H; chloroacrylate, wherein $R^1$ and/or $R^2$ is Cl; and fluoroacrylate, wherein $R^1$ and/or $R^2$ is F; unless specifically defined otherwise.

The term "twisted nematic phase" and "cholesteric phase" and "chiral nematic" herein are synonymous.

Throughout the specification, in Formula (I), when -A- is a trans-cyclohexyl moiety and one or both of m and p is an integer equal to 0, the term "aryl alkanoate ester(s)" can refer to cyclohexyl alkanoate ester(s).

One embodiment of the invention is a compound of Formula (I):

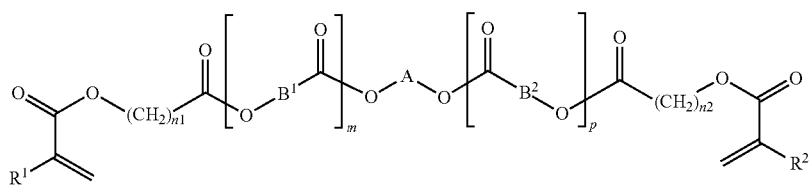

wherein $R^1$ and $R^2$ are each independently selected from the group: H, F, Cl and CH$_3$; n1 and n2 are each independently integers 3 to 20; m and p are each independently integers 0, 1 or 2;

A is a divalent radical selected from the group:

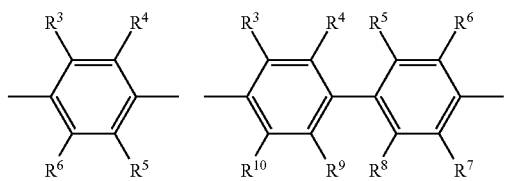

-continued

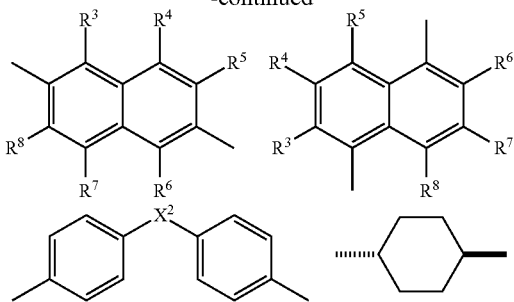

wherein $R^3$-$R^{10}$ are each independently selected from the group: H, C1-C8 straight or branched chain alkyl, C1-C8 straight or branched chain alkyloxy, F, Cl, phenyl, —C(O)CH$_3$, CN and CF$_3$;

$X^2$ is a divalent radical selected from the group: —O—, —(CH$_3$)$_2$C—, and —(CF$_3$)$_2$C—; and each $B^1$ and $B^2$ is a divalent radical independently selected from the group: $R^{11}$-substituted-1,4-phenyl, wherein $R^{11}$ is H, —CH$_3$ or —OCH$_3$; 2,6-naphthyl; and 4,4'-biphenyl; with the proviso that when m+p is equal to 3 or 4, at least two of $B^1$ and $B^2$ are $R^{11}$-substituted-1,4-phenyl.

Preferably, $R^1$ and $R^2$ are independently selected from H and CH$_3$, and more preferably, $R^1$ and $R^2$ are H. Preferably n1 and n2 are each independently integers 3 to 10. Preferably, when m and p=2, $B^1$ and $B^2$ are each independently $R^{11}$-substituted-1,4-phenyl.

In the phrase "each $B^1$ and $B^2$ is a divalent radical independently selected from the group.", when m=2, the two $B^1$ units are each selected independently, that is they may be the same or different; and when p=2, the two $B^2$ units are each selected independently, that is they may be the same or different. In addition, a C1-C8 group may be any one or more of C$_1$, C$_2$, C$_3$, C$_4$, C$_5$, C$_6$, C$_7$ or C$_8$.

The compounds as described above in Formula (I) have a variety of uses in polymerizable liquid crystal compositions. Choices may be made from within and among the prescribed ranges for the variable radicals and substituents such that the compound is, for example, either symmetric or asymmetric.

A preferred embodiment of the invention is a compound as described in Formula (I), wherein m and p equal 0, and Formula (I) is selected from the group of Formulas (IIa-f):

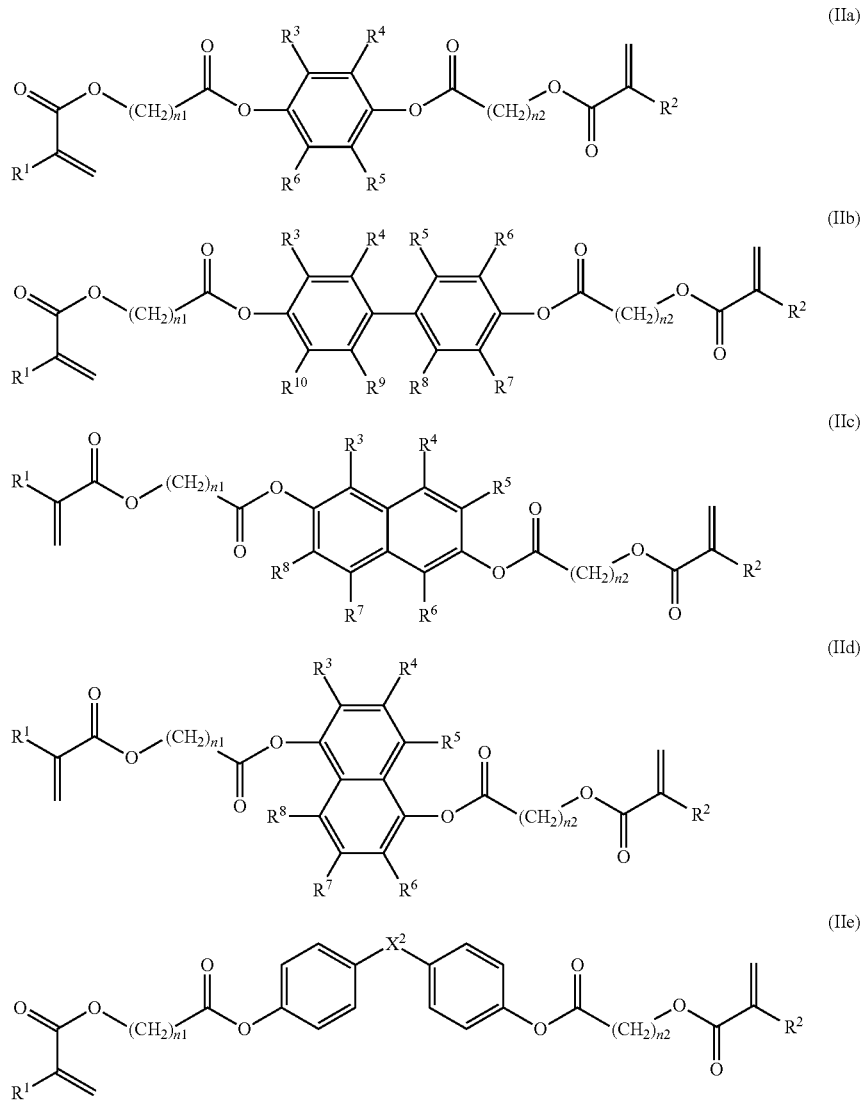

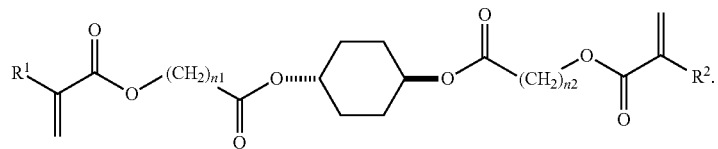
(IIf)

Compounds as described in Formula (IIa-f) are useful as polymerizable diluents and viscosity modifiers for liquid crystal compositions. The synthesis of these materials is described below in the process of the invention. Preferred compounds within this group are those as described in Formulas (IIa-d) wherein $R^3$-$R^8$ are H; in Formula (IIa) wherein
$R^3$-$R^5$ are H and $R^6$ is $CH_3$; and in Formula (IIe) wherein $X^2$ is —C($CH_3$)$_2$— or —O—.

Another preferred embodiment of the invention is a compound as described in Formula (I), wherein m is 1 and p is 0, and Formula (I) is selected from the group of Formulas (IIIa-e):

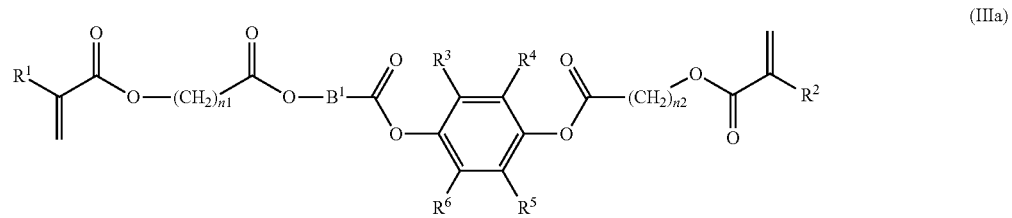
(IIIa)

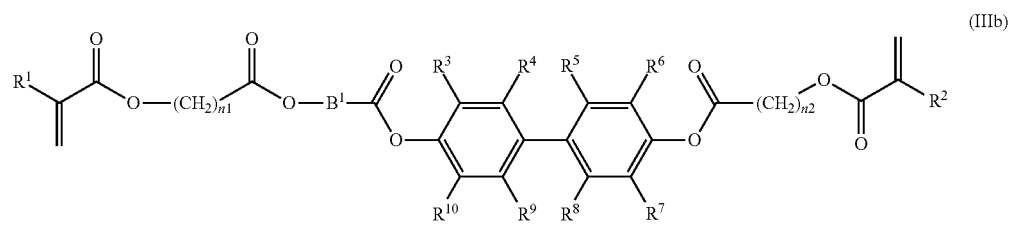
(IIIb)

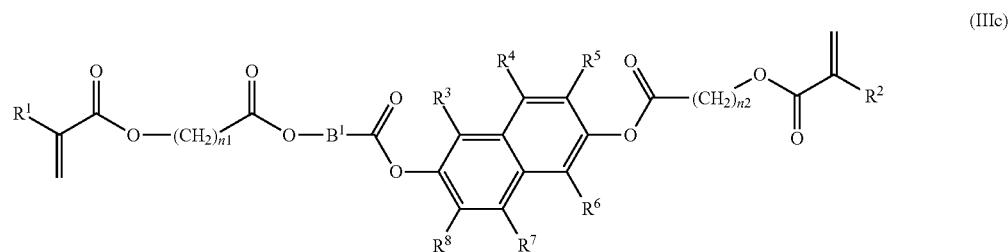
(IIIc)

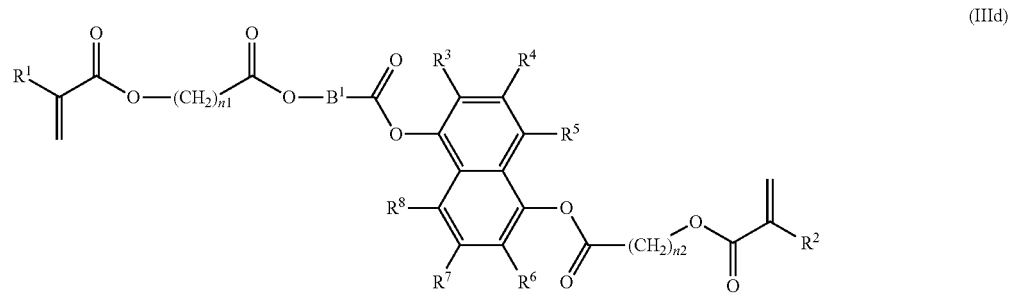
(IIId)

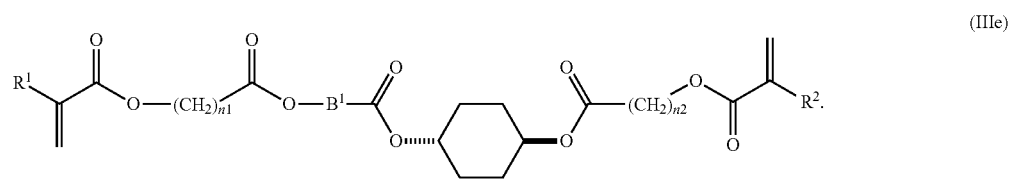
(IIIe)

Compounds as described in Formula (IIIa-e) are useful in polymerizable liquid crystal compositions, also of the invention. Many of these compounds exhibit nematic phases at or near room temperature (RT) and can be mixed with other liquid crystal monomers to provide nematic phases over broad temperature ranges. Other compounds within this group may exhibit low melting points and can be used as reactive diluents and viscosity modifiers in liquid crystal mixtures. A preferred group of compounds is selected from those as described in Formula (Ma) wherein $R^1$-$R^6$ is H. Another preferred group of compounds are those as described in Formula (Ma) wherein $R^1$ and $R^2$ are H; one of the groups $R^3$-$R^6$ is $CH_3$; and three of the group $R^3$-$R^6$ are H. The synthesis of these compounds is described below in the process of the invention. Especially preferred materials are those as described in Formula (Ma) wherein $R^3$-$R^6$ are H and $R^1$ and $R^2$ are H.

Another preferred embodiment of the invention is a compound as described in Formula (I) wherein m and p are equal to 1, and Formula (I) is selected from the group of Formulas (IVa-e):

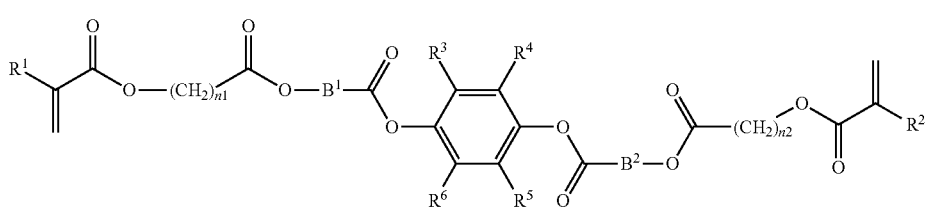

(IVa)

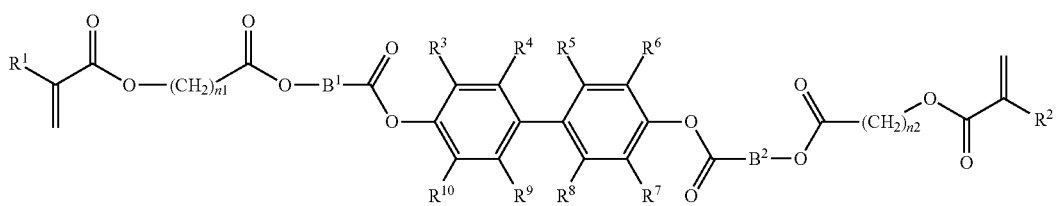

(IVb)

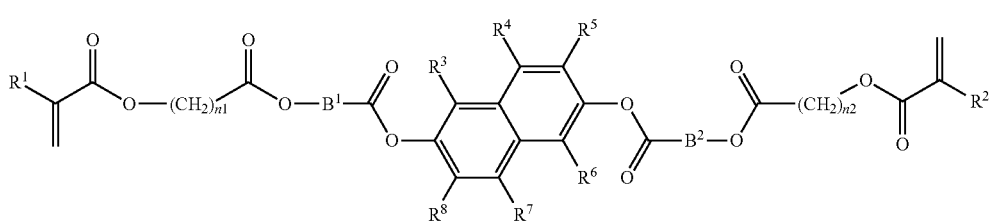

(IVc)

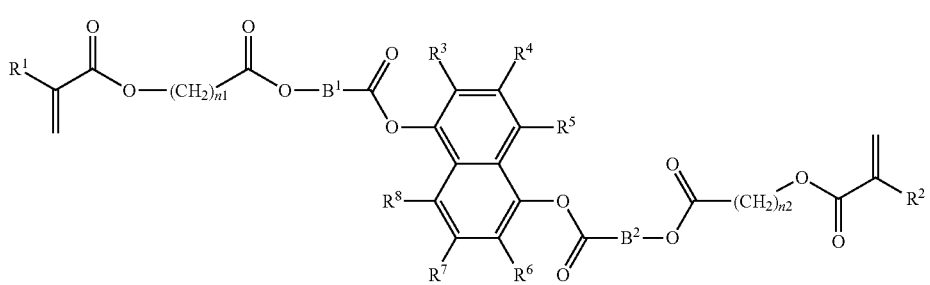

(IVd)

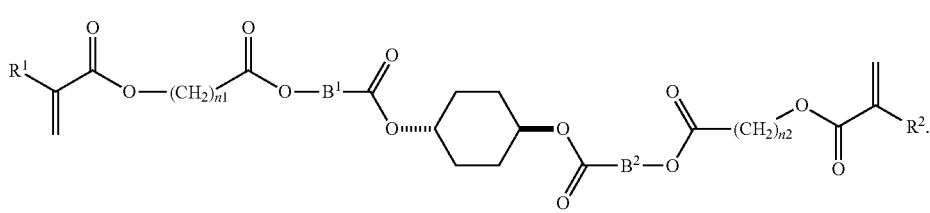

(IVe)

Compounds as described in Formula (IVa-e) are useful in polymerizable liquid crystal compositions, also of the invention. Many of these compounds exhibit broad nematic phases and can be mixed with other liquid crystal monomers to provide nematic phases over broad temperature ranges. A preferred group of compounds are those as described in Formula (IVa) wherein $B^1$ and $B^2$ are $R^{11}$-substituted-1,4-phenyl; and $R^1$ and $R^2$ are each independently H or $CH_3$. Within this group a more preferred group is wherein one of the group $R^3$-$R^6$ is Cl or $CH_3$; and three of the group $R^3$-$R^6$ are H. Within these preferred groups more preferred are those compounds wherein n1 and n2 are, independently, integers 3 to 10. The synthesis of these materials is described below in the process of the invention.

Another embodiment of this invention is a process for preparing the compounds as described in Formula (I), such as the compounds as described in Formula (IIa-f), (IIIa-e) and (IVa-e). This process comprises (a) providing one or more organic polyol(s) wherein each polyol comprises at least two hydroxyl groups and at least two covalently bonded carbon atoms, each hydroxyl group is bonded to a different carbon atom within an organic polyol; (b) reacting the organic polyol(s) with one or more functionalized alkyl acid(s) or acid halide(s) of the Formula (V):

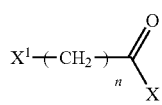

(V)

wherein X is Cl, Br or —OH; $X^1$ is selected from the group: Cl, Br, I, -OMs (wherein Ms is methanesulfonyl), -OTs (wherein, Ts is toluenesulfonyl), and -OTf (wherein Tf is trifluoromethanesulfonyl); and n is an integer equal to 3 to 20; and a first reaction solvent at a first reaction temperature to provide one or more polyfunctionalized aryl alkanoate ester(s) and a first spent reaction mixture; (c) reacting the one or more polyfunctionalized aryl alkanoate ester(s) with a (meth)acrylate salt in the presence of a phase transfer catalyst, and a second reaction solvent at a second reaction temperature; to provide one or more poly (meth)acrylate-aryl alkanoate ester(s) and a second spent reaction mixture. Preferably, the process step (b) further comprises the use of a base, and when X is —OH, further comprises a carbodiimide dehydrating agent. Preferably, step (c) further comprises the use of one or more radical inhibitors.

In various embodiments of the process of this invention, the polyol(s) may be selected from the group of compounds of Formulas (VIa-e):

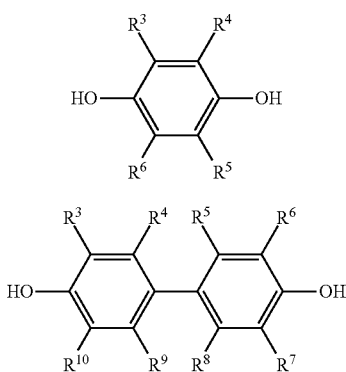

(VIa)

(VIb)

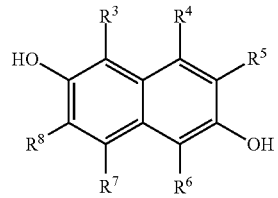

(VIc)

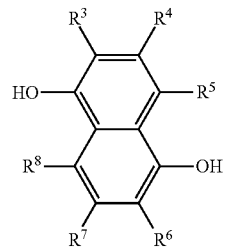

(VId)

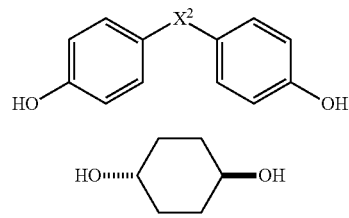

(VIe)

(VIf)

wherein $R^3$-$R^{10}$ and $X^2$ are as described above. This embodiment of the process can be used to provide compounds of Formula (IIa-f) described above. Specific diols of Formula (VIa-f) useful and preferred in the process include: hydroquinone, methylhydroquinone, chlorohydroquinone, 4,4'-dihydroxybiphenyl, 2,6-dihydroxynapthalene, 1,5-dihydroxynapthalene, Bisphenol A, 6F-Bisphenol A, 4,4'-oxydiphenol, and trans-1,4-cyclohexanediol.

In other embodiments of the process of this invention, the polyol(s) may include one or more ester diols selected from the group of compounds of Formulas (VIIa-g):

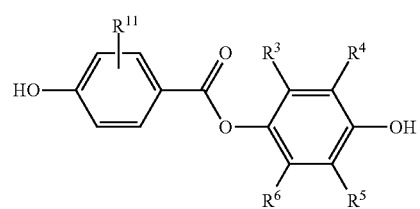

(VIIa)

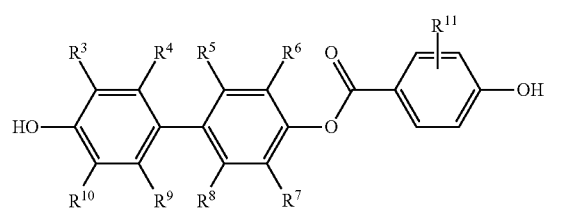

(VIIb)

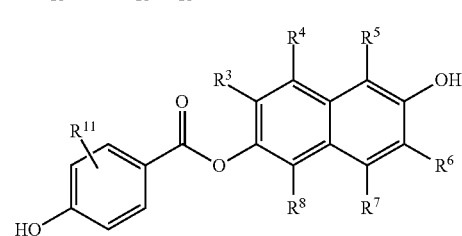

(VIIc)

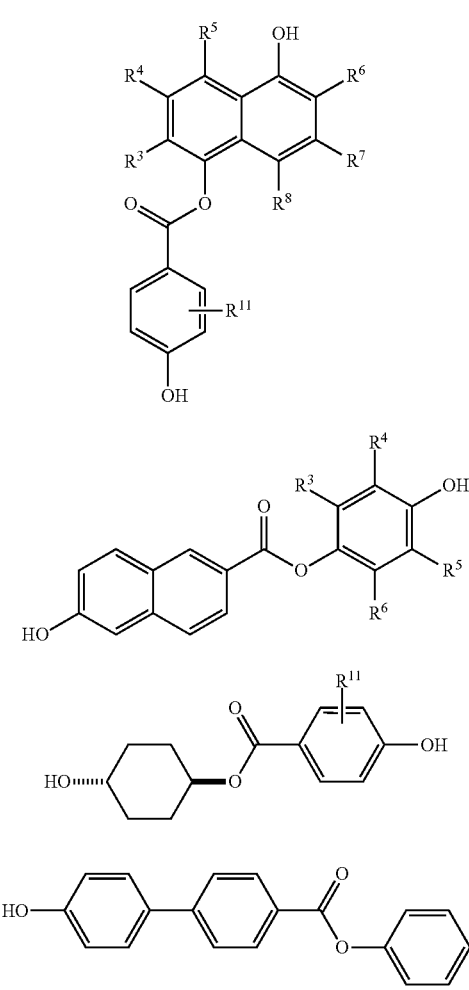

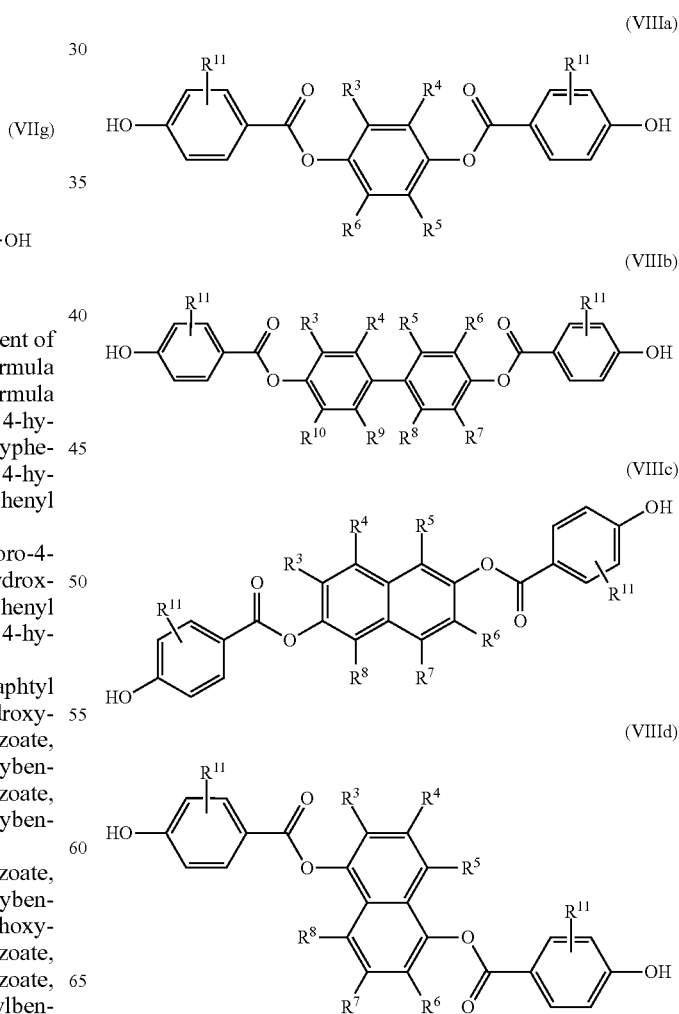

Other ester diols useful and preferred in the process that provide specific compounds as described by Formula (VIIe) derived from 6-hydroxy-2-napthalene carboxylic acid are: 6-hydroxynapthalene-2-carboxylic acid 4-hydroxyphenyl ester (CAS No. [17295-17-9]), 6-hydroxynapthalene-2-carboxylic acid 2-methyl-4-hydroxyphenyl ester, 6-hydroxynapthalene-2-carboxylic acid 3-methyl-4-hydroxyphenyl ester, 6-hydroxynapthalene-2-carboxylic acid 2-chloro-4-hydroxyphenyl ester, and 6-hydroxynapthalene-2-carboxylic acid 3-chloro-4-hydroxyphenyl ester.

Other ester diols useful and preferred in the process that provide specific compounds as described in Formula (VIIg) derived from 4'-hydroxy-4-biphenyl carboxylic acid include: 4'-hydroxybiphenyl-4-carboxylic acid 4-hydroxyphenyl ester, 4'-hydroxybiphenyl-4-carboxylic acid 2-methyl-4-hydroxyphenyl ester, 4'-hydroxybiphenyl-4-carboxylic acid 3-methyl-4-hydroxyphenyl ester, 4'-hydroxybiphenyl-4-carboxylic acid 2-chloro-4-hydroxyphenyl ester, and 4'-hydroxybiphenyl-4-carboxylic acid 3-chloro-4-hydroxyphenyl ester.

In another preferred embodiment of the process of the invention, the polyol(s) may include one or more diester diol(s) selected from the group of compounds of Formulas (VIIIa-f):

wherein $R^3$-$R^{11}$ are as described above. This embodiment of the process can be used to provide compounds of Formula (IIIa-e) described above. Specific ester diols of Formula (VIIa-g) useful and preferred in the process include: 4-hydroxyphenyl 4-hydroxybenzoate, 2-methyl-4-hydroxyphenyl 4-hydroxybenzoate, 3-methyl-4-hydroxyphenyl 4-hydroxybenzoate, 2-chloro-4-hydroxyphenyl 4-hydroxybenzoate,
3-chloro-4-hydroxyphenyl 4-hydroxybenzoate, 2-fluoro-4-hydroxyphenyl 4-hydroxybenzoate, 3-fluoro-4-hydroxyphenyl 4-hydroxybenzoate, 2-phenyl-4-hydroxyphenyl 4-hydroxybenzoate, 3-phenyl-4-hydroxyphenyl 4-hydroxybenzoate,
6-hydroxynaphthyl 4-hydroxybenzoate, 5-hydroxynaphtyl 4-hydroxybenzoate, 4-(4'-hydroxybiphenyl) 4-hydroxybenzoate, trans-4-hydroxycyclohexyl 4-hydroxybenzoate, trans-4-hydroxycyclohexyl 4-hydroxy-3-methoxybenzoate, 4-hydroxyphenyl 4-hydroxy-3-methoxybenzoate, 2-methyl-4-hydroxyphenyl 4-hydroxy-3-methoxybenzoate,
3-methyl-4-hydroxyphenyl 4-hydroxy-3-methoxybenzoate, 2-chloro-4-hydroxyphenyl 4-hydroxy-3-methoxybenzoate, 3-chloro-4-hydroxyphenyl 4-hydroxy-3-methoxybenzoate, 4-hydroxyphenyl 4-hydroxy-3-methylbenzoate, 2-methyl-4-hydroxyphenyl 4-hydroxy-3-methylbenzoate, and 3-methyl-4-hydroxyphenyl 4-hydroxy-3-methylbenzoate.

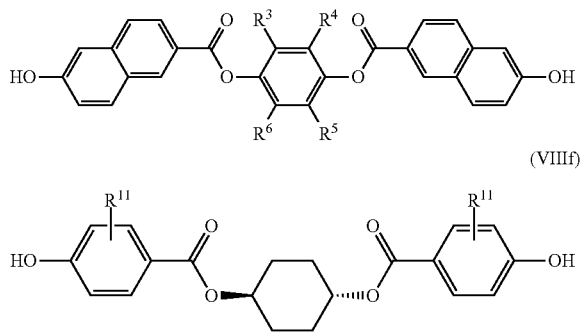

wherein R³-R¹¹ are as described above. This embodiment of the process can be used to provide compounds as described in Formula (IVa-e) described above. Specific diester diols of Formula (VIIIa-f) useful and preferred in the process include compounds listed in Table 1 that are specific examples of compounds of Formula (VIIIa-f).

Preferred functionalized alkyl acid halide(s) as described in Formula (V) are acid chlorides (X═Cl) wherein X¹ is Br. When the organic polyol is a diol, the amount of the functionalized alkyl acid halide(s) to be used is preferably about 1.8 to about 2.5 equivalents, and more preferably about 2.0 to about 2.2 equivalents, based on the amount of the diol. In a preferred embodiment in step (b), the one or more functionalized alkyl acid halide(s) comprise two or more functionalized alkyl acid halides, and said step (b) provides a mixture of at least three polyfunctionalized aryl alkanoate esters. In a preferred case, in step (b) the one or more functionalized alkyl acid halides(s) comprises two functionalized alkyl acid halide(s) in a molar ratio of about 0.05:1 to about 1:1; and said step (b) provides a mixture of at least three polyfunctionalized aryl alkanoate ester(s). This process, or derivations thereof using three or more functionalized alkyl acid halide(s), is a convenient and preferred process to provide complex mixtures of the compounds of the invention.

The first reaction solvent can be any solvent known in the art to be useful in performing acid halide condensations with alcohols, including alkyl ethers such as tetrahydrofuran (THF), dioxane or dimethoxyethane; alkyl esters such as ethyl acetate or butyl acetate; hydrocarbons such as xylenes or toluene; halogenated hydrocarbons such as 1,2-dichloroethane oe dichloromethane; and amides such as dimethylformamide or dimethylacetamide (DMAc). A preferred first reaction solvent is THF.

The (meth)acrylate salt useful in step (c) can be derived from neutralization of the corresponding (meth)acrylate acid including methacrylic acid, acrylic acid, 2-chloroacrylic acid, and 2-fluoroacrylic acid. The base used in the neutralization can be an alkali metal base, for instance potassium carbonate and bicarbonate; sodium carbonate and bicarbonate; lithium carbonate and bicarbonate; and cesium carbonate and bicarbonate; to provide an alkali metal (meth)acrylate salt. The base can be an alkali earth metal base, for instance magnesium, calcium or barium carbonate, to provide an alkali earth metal (meth)acrylate salt. The base also can be an amine base, and particularly a hindered amine base such as a tertiary aliphatic, aromatic or heterocyclic amine as described above; to provide an ammonium (meth)acrylate salt. Preferred (meth)acrylate salts for step (c) are selected from the group: potassium (meth)acrylate and ammonium (meth)acrylates selected from the group: triethylammonium.

The (meth)acrylate salt can be provided from commercial sources; it can be prepared in a separate process step and used directly or purified by one or more methods known in the art such as washing, filtering, drying, recrystallizing, or precipitating the salt; or it can be made in situ by neutralization of a (meth)acrylate acid with a base. In a preferred embodiment of the invention, the (meth)acrylate salt is provided by mixing (meth)acrylic acid and an alkali metal carbonate selected from the group: potassium hydrogen carbonate and potassium carbonate, in a molar ratio of about 1:1 to about 1:5, respectively, in said second reaction solvent.

In a preferred embodiment of the process, the amount of (meth)acrylate salt to be used is about 2.0 to about 10.0 equivalents per equivalent of the polyfunctionalized aryl alkanoate ester(s). Preferably the (meth)acrylate salt is an acrylate salt.

The phase transfer catalyst that may be used in step (c) is a substance that, being at least partly present in or wetted by a first (usually organic) phase, promotes reaction between a reactant in the first phase and a reactant that it transfers to the first phase from a second phase, usually an aqueous or a solid phase. After reaction, the phase transfer catalyst is released for transferring further reactant. Suitably the phase transfer catalyst is a quaternary ammonium or phosphonium salt, preferably containing bulky organic groups, usually alkyl or aralkyl groups, to make it soluble in the organic phase. It is preferred that the phase catalyst is a tetraalkyl or aralkyl (e.g. benzyl) trialkyl ammonium or phosphonium salt in which the total number of carbon atoms attached to each nitrogen or phosphorus atom is at least 4. It is especially preferred that the number should be in the range of from 16 to 40. Other substances suitable for use herein as the phase transfer catalyst include those reviewed by E. V. Dehmlow in Angewante Chemie, (International Edition), 13, 170 (1974).

Quaternary ammonium salts suitable for use as the phase transfer catalyst herein include: cetyltrimethylammonium bromide, dicetyldimethylammonium chloride, octyltributylammonium bromide, trioctylmethylammonium chloride (available as Aliquat™ 336), benzyldimethyllaurylammonium chloride, benzyltriethylammonium chloride, dilauryldimethylammonium chloride, tetrabutylammonium bromide, tetrabutylammonium hydrogen sulfate and tetrabutylammonium iodide. Quaternary phosphonium salts suitable for use as the phase transfer catalyst herein include cetyltripropylphosphonium bromide and triphenylethylphosphonium bromide. Other phase transfer catalysts that may be used include crown ethers and polyethylene glycol variants. The phase transfer catalyst may be present in an amount ranging from about 0.001 to about 0.9 mole equivalents, and preferably about 0.1 to about 0.5 mole equivalents, of the polyfunctionalized aryl alkanoate ester(s). A preferred phase transfer catalyst is selected from the group: tetrabutylammonium iodide, tetrabutylammonium bromide, and tetraheptyl ammonium bromide; and crown ethers selected from the group: 18-crown-6, CAS No. [17455-13-9]; benzo-18-crown-6, CAS No. [14078-24-9]; 15-crown-5, CAS No. [33100-27-5]; and benzo-15-crown-5, CAS No. [140-44-3].

The second reaction solvent can be any solvent known in the art to be useful in performing nucleophilic displacement of —X¹ with a (meth)acrylate salt. However, there is a preference for particular second reaction solvents that are aprotic in structure, and have a dipole moment of about 3.5 or less. Solvents that are aprotic in structure are those that are devoid of active hydrogens such as hydroxyl or acid functionality. Solvents having these characteristics provide high rates of conversion of the polyfunctionalized aryl alkanoate ester(s) to product while maintaining a very low level of undesired ester cleavage products. Preferred second reaction solvents include those selected from the group: alkyl ethers including tetrahydrofuran, dioxane and dimethoxyethane; ketones including acetone and 2-butanone; alkyl esters including butyl acetate and ethyl acetate; and acetonitrile. In a preferred embodiment, the second reaction solvent may be the first spent reaction mixture.

The first reaction temperature and second reaction temperature are reaction temperatures that give a reasonable rate of reaction with a minimum of by-products. The first reaction temperature generally is between −30° C. and about 50° C., and preferably about 0° C. to about room temperature (RT, e.g. 25° C.). The second reaction temperature is generally about RT to about 120° C., and preferably about 50° C. to about 100° C.

A base, when used in step (b), can include an inorganic base, for instance an alkali metal or alkali earth metal hydroxide, carbonate or bicarbonate; or an organic base such as an amine base that has at least two aliphatic groups, or in which the N atom is in a cycloaliphatic or aromatic ring, substituted in a manner that induces steric crowding around the N atom. Typically the amine base will be of low water solubility and have a $pK_a$ of the conjugate acid of about 10. Thus, it may be a heteroaromatic base such as pyridine or a substituted pyridine, for example 2,6-dimethylpyridine; or it may be a secondary amine providing it is sufficiently sterically hindered. An example of a suitable secondary amine is 2,2,6,6-tetramethyl-piperidine. Preferably, however, it is a tertiary amine of formula $R^{12}R^{13}R^{14}N$ wherein $R^{12}$, $R^{13}$ and $R^{14}$ are each independently C1-C10 alkyl groups or C3-C6 cycloalkyl groups. The alkyl groups may be straight or branched chain. Examples of suitable alkyl groups include methyl, ethyl, isopropyl, n-propyl, n-butyl, sec-butyl and tert-butyl. Suitable tertiary amines of formula $R^{12}R^{13}R^{14}N$ are, for example, N,N-diisopropylethylamine, N,N-dimethylaniline, triethylamine, t-butyldimethylamine, N,N-diisopropylmethylamine, N,N-diisopropylisobutylamine, N,N-diisopropyl-2-ethylbutylamine, tri-n-butylamine. Preferred are amine bases selected from the group: triethylamine, diisopropylethylamine, tributyl amine, pyridine, and 2,6-dimethylpyridine. The base is preferably present in an amount of about 0.8 to about 5 equivalents per equivalent of the functionalized alkyl acid halide(s).

When the base used in step (b) is an amine base, a by-product of the reaction is an amine salt such as an amine hydrochloride. In a preferred embodiment the amine salt is removed from the first spent reaction mixture by, for instance, filtering the reaction mixture. This is a convenient and preferred process wherein the second reaction solvent can include the first reaction solvent. In another embodiment, the one or more polyfunctionalized aryl alkanoate ester(s) provided by step (b) can be separated from the first spent reaction mixture by a variety of methods known in the art. Preferred methods include any one or more of the steps: filtering the amine salt by-product; precipitating the reaction mixture into water and filtering; partitioning the reaction mixture with water and/or organic solvents; washing with reaction mixture with water; drying the reaction mixture with a drying agent; removal of solvent by evaporation, chromatography, crystallization and/or recrystallization of the one or more polyfunctionalized aryl alkanoate ester(s); or washing the crude product with one or more solvents which selectively remove byproducts without dissolving the one or more polyfunctionalized aryl alkanoate ester(s).

When used in step (b), a suitable carbodiimide dehydrating agent may be any diimide commonly used in coupling acids with alcohols and phenols. A preferred carbodiimide for step (b) is dicyclohexylcarbodiimide A radical inhibitor, when used in step (c), may include any radical inhibitor known to inhibit radical polymerization reactions of (meth)acrylate groups including 2,6-di-tert-butylphenol, 2,6-di-tert-butyl-4-methylphenol, 2,6-di-tert-butyl-4-ethylphenol, 2-methyl-6-tert-butylphenol, 2,4,6-tri-tert-octylphenol, 2,4-dimethyl-6-tert-butylphenol, 2-tert-butyl-6-(α-methylbenzyl)phenol, 2,4-di-tert-octylphenol, 2,6-di-tert-butyl-4-methoxyphenol, 2,6-di-tert-octyl-4-decoxyphenol, 2-tert-butyl-4-chlorophenol, 2,6-di-tert-butyl-4 (N,N'-dimethylaminomethyl-phenol), 2,2'-methylene-bis(4-methyl-6-tert-butylphenol), 2,2'-methylene-bis(4-ethyl-6-tert-butylphenol), 2,2'-methylene-bis(4-methyl-6-nonylphenol), 4,4'methylenebis(2,6-di-tert-butylphenol), 4,4'-bis(2,6-di-tert-butylphenol), 4,4'-bis(2-methyl-6-tert-butylphenol), 4,4'-isopropylidenebis(2,6-di-tert-butylphenol), 1,4-hydroquinone, 4-methoxyphenol and the like; phosphorus compounds such as tri(nonylphenyl) phosphate, tridecyl phosphite, and the like; naphthol-based compounds such as 1,2-dihydroxynaphthalene, 1-amino-2-naphthol, 1-nitro-2-naphthol and the like; amine compounds such as trimethylamine, phenyl-β-naphthylamine, p-phenylenediamine, mercaptoethylamine, N-nitrosodimethylamine, benzotriazoles, phenothiazine, halo-dihydro-2,2,4-trimethylquinone and the like; or sulfur compounds such as dilaurylthio dipropionate, dilauryl sulfide and 2-mercaptobenzimidazole. The above list is not intended to be exhaustive; numerous classes of compounds that inhibit formation of radicals in organic materials are well known, and can be used in the practice of this process. The radical inhibitor can be a single compound, or a mixture or combination of two or more of such compounds. The preferred radical inhibitors are selected from the group: 2,6-di-tert-butyl-4-methylphenol, phenothiazine and tridecyl phosphate.

In another embodiment, the process further comprises separating the one or more poly(meth)acrylate-aryl alkanoate ester(s) provided by step (c) from the second spent reaction mixture. This can be done by a variety of methods known in the art including any one or more of the steps: filtering the second spent reaction mixture; precipitating the reaction mixture into water and filtering; partitioning the reaction mixture with water and/or organic solvents; washing the reaction mixture with water; drying the reaction mixture with a drying agent; removal of solvent by evaporation, chromatography, crystallization and/or recrystallization of the one or more poly(meth)acrylate-aryl alkanoate ester(s); and washing the crude product with one or more solvents that selectively remove byproducts without dissolving the one or more polyfunctionalized aryl alkanoate ester(s).

Another embodiment of this invention is a process for preparing the compounds of Formula (I) wherein m and/or p is equal 2. The process comprises (a) providing one or more polyol(s) selected from the group of those described by: Formula (VIIa-g) and (VIIIa-f); and (b) reacting the polyol(s) with one or more (meth)acrylate aryl acid halides of the of the Formula (IXa-c):

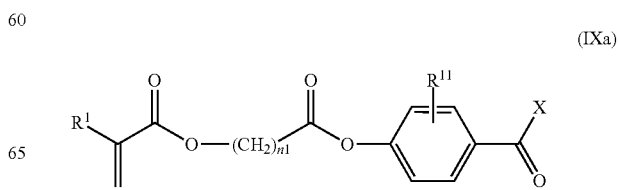

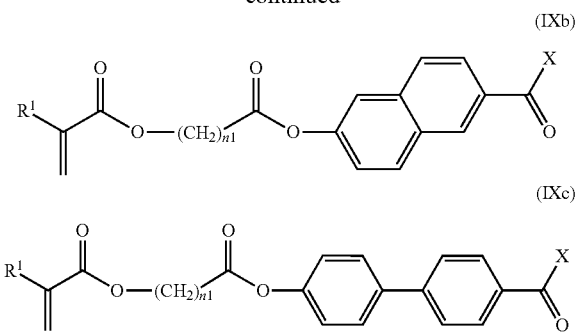

wherein X is Cl or Br, n1 is an integer 3-20; and $R^1$ and $R^{11}$ are as described above; and a first reaction solvent at a first reaction temperature, as described above, to provide one or more poly(meth)acrylate aryl alkanoate ester(s) of Formula (I) wherein m and/or p=2. Preferably step (b) includes the use of a base and one or more radical inhibitors, as described above.

The preparation of (meth)acrylate aryl acid halides of Formula (IX) is described in various examples as set forth below. In the processes described above, the contents of the reaction mixture are used in at least an amount that is sufficient to enable the reaction to proceed to provide the stated product at a rate and with a yield that is commercially useful.

The compounds of this invention, such as the compounds of Formulas (IIIa-e) and (IVa-e), are useful in polymerizable liquid crystal compositions. Many of these compounds exhibit nematic phases upon melting. They can be mixed together or with other liquid crystal monomers to provide nematic phases over broad temperature ranges at or near room temperature. Several compounds of various embodiments of this invention are listed in Tables 2 and 3 below with their corresponding thermal transitions that define their respective nematic phases. Mixtures of compounds of various embodiments of the invention are listed in Table 4 below with their corresponding thermal transitions that define their respective nematic phases.

The compounds provided by this invention generally have important attributes that are different from conventional polymerizable liquid crystal bis (meth)acrylates. Conventional polymerizable liquid crystal bis(meth)acrylates of the general formula
(C—I), as prepared in Makromol. Chem. 190, 2255-2268 (1989); Macromolecules, 1988, 31, 5940; Makromol. Chem. 192, 59-74 (1991); WO 1998/047979; J. Polym. Sci.: Part A: Polym. Chem., Vol. 37, 3929-3935 (1999); Makromol. Chem. 190, 3201-3215 (1989); U.S. Pat. No. 5,833,880; DE 4,408,170; EP 261,712; EP 331,233 B1; EP 397,263 B1; and JP 1994/016616A, and references cited therein, comprise ether groups (—O—) linking a core mesogen to flexible spacers and the polymerizable (meth)acrylates.

The synthetic methods used to prepare these conventional polymerizable liquid crystals are well documented. The thermal transitions of several polymerizable liquid crystal bis (meth)acrylates of general formula (C—I) are listed in Table 5 below.

As illustrated in Comparative Example 4, the synthetic methods used to prepare the conventional bis (meth)acrylates of general formula (C—I) are not useful for preparing the compounds provided by this invention. Furthermore, in comparison of their respective nematic phases, it is clear that the compounds provided by this invention unexpectedly exhibit nematic phases over significantly broader temperature ranges than their conventional (—O— linkage) counterparts of general formula (C—I). For instance, Compound 24 exhibits a nematic phase between 10 and 30° C., a 20° C. range, versus Comparative Compound 1-C exhibiting a nematic phase between 47 and 50° C., a 3° C. range. Compound 14 exhibits a nematic phase between 50 and 152° C., a 102° C. range, versus Comparative Compound 6-C, which exhibits a nematic phase from 93 to 124° C., a range of 31° C. Compound 9 exhibits a nematic phase between 46 and 130° C., a range of 84° C., versus Comparative Compound 7-C, which exhibits a nematic phase from 86 to 116° C., a range of 30° C. In addition, the compounds provided by this invention exhibit lower melting points than the conventional bis (meth) acrylates of formula (C—I). The lowest melting point for a liquid crystalline compound as described by Formula (IVa-e) is 43° C., exhibited by Compound 15. This may be compared to Comparative Compound 8-C, which exhibits a melting point of 57° C. Compound 17 also exhibits a melting point of 43° C., as compared to Comparative Compound 9-C, which exhibits a melting point of 66° C.

Furthermore, liquid crystal mixtures comprising compounds provided by this invention exhibit nematic phases over significantly broader temperature ranges and lower melting temperatures than their conventional (—O— linkage) counterparts corresponding to Formula (C—I). Mixture 9 exhibits a nematic phase from −24 to 149° C., a range of 173° C., as compared to Comparative Mixture 5-C, which exhibits a nematic phase from 60 to 97° C., a range of 37° C.

In contradistinction to these previous materials, another embodiment of the invention is a liquid crystal composition comprising at least one compound of Formula (I), and in a further embodiment the liquid crystal composition includes at least one chiral compound. Two or more compounds as provided by this invention can be mixed together to form a polymerizable nematic composition. Compounds as provided by this invention can also be mixed with conventional nematic liquid crystals or polymerizable liquid crystals to form polymerizable nematic compositions. Compounds as provided by this invention can further be mixed with chiral compounds, including polymerizable and/or non-polymerizable chiral monomers and/or polymerizable and/or non-polymerizable chiral nematic liquid crystals, to form polymerizable twisted nematic compositions, also an embodiment of the invention. Preferred liquid crystal compositions comprise at least one compound as described by Formula (IIIa-e).

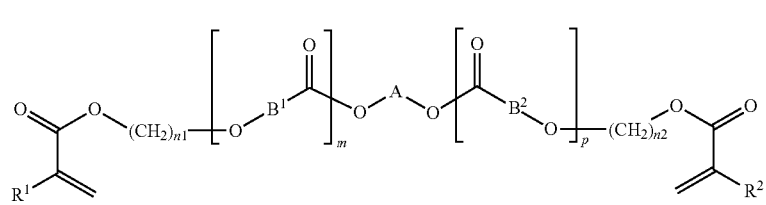

Other preferred liquid crystal compositions comprise at least one compound as described by Formula (IVa-e).

Chiral compounds, including cholesteryl esters or carbonate, such as benzoate esters, alkyl esters and alkyl carbonates of cholesterol, are known to exhibit cholesteric phases and are known to be useful in inducing chirality in a nematic phase to produce a twisted nematic phase. Cholesteryl esters useful for incorporation into liquid crystal compositions of this invention include cholesteryl benzoate, cholesteryl 4-alkylbenzoates and cholesteryl 4-alkoxybenzoates wherein the alkyl and alkoxy groups are C1 to C8 straight or branched chain alkyl groups, cholesteryl propionate, cholesteryl butanoate, cholesteryl hexanoate, cholesteryl octanoate, cholesteryl decanoate, cholesteryl undecanoate, cholesteryl dodecanoate, cholesteryl hexadecanoate, and cholesteryl octadecanoate. Cholesteryl carbonates useful for this purpose include phenyl cholesteryl carbonate, 4-alkylphenyl cholesteryl carbonates, 4-alkoxyphenyl cholesteryl carbonates, and alkyl cholesteryl carbonates wherein the alkyl or alkoxy groups are C1 to C8 straight or branched chain alkyl groups.

In one embodiment of a composition of this invention, the incorporated chiral compounds are polymerizable chiral monomers and include polymerizable cholesterol derivatives as described in U.S. Pat. No. 4,637,896; polymerizable terpenoid derivatives as described in U.S. Pat. No. 6,010,643; polymerizable derivatives wherein the chiral center is an asymmetric carbon atom of a branched alkyl chain as described in U.S. Pat. No. 5,560,864; polymerizable derivatives of vicinal diols or substituted vicinal diols as described in U.S. Pat. No. 6,120,859 and U.S. Pat. No. 6,607,677; and polymerizable chiral compounds as described in U.S. Pat. Nos. 6,723,395, 6,217,792, 5,942,030, 5,885,242, and 5,780,629. The references listed above in this paragraph is each incorporated in its entirety as a part hereof.

A preferred group of polymerizable chiral monomers for use in the compositions of this invention are those of Formula (X):

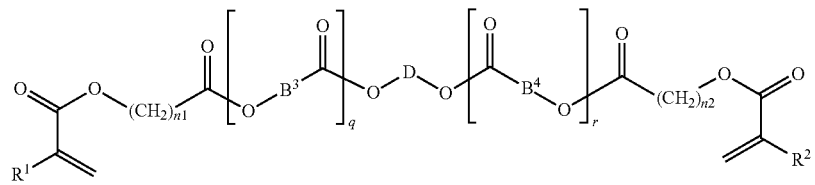

(X)

wherein $R^1$ and $R^2$ are each independently selected from the group: H, F, Cl and $CH_3$; n1 and n2 are each independently integers 3 to 20; q and r are each independently integers 0, 1 or 2 with the proviso that q+r is $\geq 1$; D is a divalent chiral radical selected from the group:

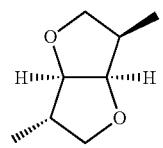

(D1)

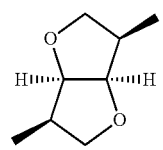

(D2)

-continued

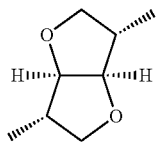

(D3)

and $B^3$ and $B^4$ are each divalent radicals independently selected from the group: $R^{11}$-substituted-1,4-phenyl, wherein $R^{11}$ is H, —$CH_3$ or —$OCH_3$; 2,6-naphthyl; and 4,4"-biphenyl; provided that when q+r=3, at least one of $B^3$ and $B^4$ is $R^4$-substituted-1,4-phenyl; and when q+r=4, at least two of $B^3$ and $B^4$ are $R^4$-substituted-1,4-phenyl. Preferably $R^1$ and $R^2$ are independently H, or $CH_3$; and n1 and n2 are independently an integer 3 to 10.

Choices may be made from within and among the prescribed ranges for the variable radicals and substituents such that the compound of Formula (X) is, for example, either symmetric or asymmetric.

Another preferred group of polymerizable chiral monomers for practicing this invention are those of Formula (XI):

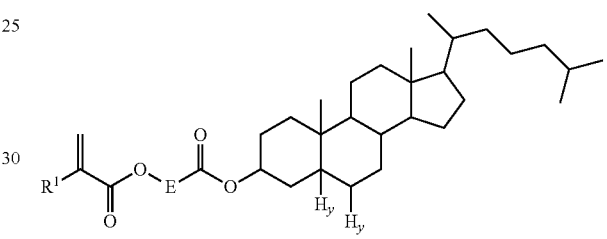

(XI)

wherein $R^1$ is selected from the group: H, F, Cl and $CH_3$; E is selected from the group: —$(CH_2)_{n3}$—, —$(CH_2)_{n4}O$—, and —$(CH_2CH_2O)_{n5}$—; n3 and n4 are each integers 3 to 20; n5 is an integer 1 to 4; and y is an integer 0 or 1.

Chiral compounds suitable for use in a composition as provided by this invention are also described in U.S. Provisional Application No. 60/787,829, filed Mar. 31, 2006, and entitled "Chiral Compounds, and Liquid Crystal Compositions and Polymer Networks Derived Therefrom", which is incorporated in its entirety as a part hereof for all purposes.

The liquid crystal compositions provided by this invention are mixtures useful in preparing polymer networks that exhibit the fixed optical properties of nematic or twisted nematic polymer networks. A polymer network as provided by this invention is one or more polymerized layer(s) comprising a liquid crystal composition that may be fabricated in a form such as polymerized films, coatings, castings and prints, including patterned, unpatterned, variable and nonvariable optical properties, and that can be made by a wide variety of methods as disclosed, for instance, in U.S. Pat. Nos. 4,637,896, 6,010,643 and 6,410,130, each of which is incorporated in its entirety as a part hereof.

In particular, one preferred method for making a polymer network comprises: providing a polymerizable liquid crystal mixture, in the form of a liquid crystal or isotropic phase, with a polymerization initiator, preferably a radical initiator; applying the liquid crystal mixture to one or more substrates, where the substrate(s) may optionally comprise an alignment layer, to provide a layer of liquid crystal; optionally treating the layer to provide a desired liquid crystal phase; and polymerizing the liquid crystal phase, preferably by exposing the liquid crystal phase to actinic radiation. Actinic radiation includes, for example, heat, microwave radiation, UV and visible light, and electron beam and other radiation.

The liquid crystal compositions provided by various embodiments of this invention can include a radical initiator. Although the radical initiator is preferably a photoinitiator useful in conducting photochemical polymerizations, such initiators are not required when curing is performed by electron beams. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]phenyl)-2-(4-morpholinyl)-1-propanone, 2-hydroxy-2-methyl-1-phenyl-propan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylaminobenzophenone, triphenylsulfonium hexafluorophosphate or mixtures of triphenylsulfonium salts. Preferably the photoinitiators are present at a level of about 0.1 wt % to about 3 wt % based on the total weight of the polymerizable liquid crystal mixture.

Forming a liquid crystal layer in a polymer network from a compound of this invention can be accomplished by any method that gives a uniform layer, or if desired, a patterned or non-uniform layer. Coating, including rod-coating, extrusion coating, gravure coating and spin-coating, spraying, printing, blading, knifing, or a combination of methods, can be used. Coating and knifing are preferred methods. Many commercial coating machines, devices such as a coating rod and knife blade, and printing machines can be used to apply the liquid crystal mixture as a liquid crystal or isotropic phase.

The ability of a twisted nematic phase to reflect light is dependent upon the alignment or texture of the twisted nematic phase. For many applications wherein a high degree of transparency is required outside the reflection band, or in applications that require very well defined reflection bands, a high degree of uniformity in a planar or homogeneous alignment is required. Discontinuities and domain boundaries in a planar alignment can cause a high degree of haze and degradation of the reflection band. A high degree of uniformity in planar alignment can be accomplished with a combination of alignment layers and/or mechanical shearing of the twisted nematic phase during and/or after application to the substrate(s). Alignment layers typically are polymers that are applied to substrates and mechanically buffed with a rubbing cloth or optically aligned with polarized light. The buffing or optical alignment allows the liquid crystal molecules applied to the interface to align in one direction. Useful polyimide alignment layers, for example, are described in U.S. Pat. No. 6,887,455. Alignment of twisted nematic phases by coating of dilute liquid crystal mixtures is described in U.S. Pat. No. 6,410,130.

Treating the liquid crystal layer to provide a desired liquid crystal phase can include steps such as cooling or heating the liquid crystal layer, for instance to achieve a desired phase or optical property; application of a mechanical shear to the liquid crystal layer, for instance by application of a knife blade to the liquid crystal layer or shearing two or more substrates wherein the liquid crystal layer is interposed; or vibration, sonication or other form of agitation to the substrate(s).

Another preferred method for making a polymer network comprises: providing an isotropic solution comprising a polymerizable liquid crystal mixture, a polymerization initiator, preferably a photoinitiator, and a carrier solvent; applying the isotropic solution to one or more substrate(s), preferably where the substrate(s) comprises an alignment layer, to provide an isotropic layer; removing the carrier solvent and, optionally, treating the layer, to provide a desired liquid crystal phase; and polymerizing the liquid crystal phase, preferably by exposing the liquid crystal phase to actinic radiation. Procedures such as these are more fully described in U.S. Pat. Nos. 6,010,643 and 4,637,896 wherein preparation of a liquid crystal layer using two substrates to form a cell is set forth. In a similar vein, U.S. Pat. Nos. 4,637,896 and 6,410,130 describe the preparation of a liquid crystal layer from an isotropic solution, followed by polymerization.

Where a carrier solvent is used with the liquid crystal composition, coating and spraying are preferred methods for applying the isotropic solution. Removing the carrier solvent can be accomplished by allowing the carrier solvent to evaporate, with or without heating and/or application of a vacuum. Allowing the carrier solvent to evaporate also may be accompanied and/or followed by application of a mechanical shear to the liquid crystal layer, as described above. Examples of suitable carrier solvents are linear or branched esters, especially acetic esters, cyclic ethers and esters, alcohols, lactones, aliphatic and aromatic hydrocarbons, such as toluene, xylene and cyclohexane, chlorinated hydrocarbons, such as dichloromethane, 1,1,2,2-tetrachloroethane, and also ketones, amides, N-alkylpyrrolidones, especially N-methylpyrrolidone. Additional examples of useful solvents include tetrahydrofuran (THF), dioxane, methyl ethyl ketone (MEK), and propylene glycol monomethyl ether acetate.

Liquid crystal compositions as provided by this invention may further comprise small amounts of a polymerizable diluent that may include, for example, 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate, tetraethylene glycol dimethacrylate, pentaerythritol tetraacrylate and ethoxylated pentaerythritol tetraacrylate.

Liquid crystal compositions as provided by this invention may further comprise small amounts of typical additives such as one or more of surfactants, leveling agents, viscosity modifiers, wetting agents, defoamers and UV stabilizers. Selection will often be based upon observed coating and alignment quality and the desired adhesion of the final polymer network to the substrate and other layers. Typical surfactants comprise siloxy-, fluoryl-, alkyl- and alkynyl-substituted surfactants. These include the Byk® (Byk Chemie), Zonyl® (DuPont), Triton® (Dow), Surfynol® (Air Products) and Dynol® (Air Products) surfactants.

A liquid crystal polymer network as provided by this invention can be characterized and differentiated from conventional polymerizable liquid crystal bis(meth)acrylates of the general Formula (C—I), as disclosed in Makromol. Chem. 190, 2255-2268 (1989) and U.S. Pat. No. 5,833,880 and references cited therein, by comparison of their IR absorption properties. Networks obtained upon photopolymerization of polymerizable liquid crystal bis(meth)acrylates of the general formula (C—I) contain aryl acrylate and alkyl alkanoate type ester linkages wherein $R^{15}$ is a linear, branched, or cyclic aliphatic chain and Ar is a conventional substituted or unsubstituted aromatic substituent. Polymerizable liquid crystal bis(meth)acrylates as provided by various embodiments of this invention contain the two aforementioned classes of ester linkages, but also contain aryl alkanoate type linkages. The ester stretches associated with aryl arylate and alkyl alkanoate type ester linkages are reported to be coincidental, while the stretch frequency for aryl alkanoate type linkages is reported to appear at approximately 20-30 $cm^{-1}$ higher frequency (Pretsch, Clerc, Seibl, Simon, Spectral Data for Structure Determination of Organic Compounds, Springer-Verlag, Berlin Heidelberg, $2^{nd}$ Ed., 1989, pp. I141-I142).

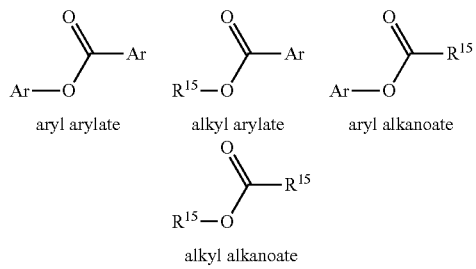

FIG. 1 displays IR spectra of crosslinked networks derived from Comparative Mixture 1-C, and Mixture 6, a composition provided by this invention. Comparative Mixture 1-C and Mixture 6 display nearly coincidental ester absorptions at 1723 and 1727 $cm^{-1}$, respectively. However, Mixture 6 displays an additional absorption at 1756 $cm^{-1}$ associated with the unique presence of aryl alkanoate linkages, consistent with literature predictions.

The ability of twisted nematic phases to selectively reflect light in the infrared, visible or ultraviolet region is useful in many applications. When the propagation direction of plane polarized or unpolarized light is along the helical axis of the twisted nematic layer, the wavelength of maximum reflection, $\lambda_o$, is governed by the equation $$\lambda_0 = n_a p,$$

wherein $n_a$ is the average of $n_o$ and $n_e$, and $n_o$ and $n_e$ are defined as the ordinary and extraordinary refractive indices respectively, of the twisted nematic phase measured in the propagation direction and p is the pitch of the helix (the distance the helix takes to repeat itself). Light outside the vicinity of $\lambda_0$ is essentially unaffected in transmission. For light with a wavelength in the vicinity of wavelength $\lambda_0$, the twisted nematic phase exhibits selective reflection of the light such that approximately 50% of the light is reflected and approximately 50% of the light is transmitted, with both the reflected and transmitted beams being substantially circularly polarized. A right handed helix reflects right handed circularly polarized light and transmits left handed circularly polarized light. The bandwidth $\Delta\lambda$ of this reflected wavelength band centered about $\lambda_0$ can be determined by the formula $\Delta\lambda = \lambda_0 \cdot \Delta n / n_a$, where $\Delta n = n_e - n_o$, reflecting the birefringence present in liquid crystal materials. The pitch p can be tuned effectively by manipulating the amount of chiral dopant, the twisting power of the dopant and selection of the nematic materials. The pitch is sensitive to to temperature, unwinding or tightening with a change in temperature; and to electric fields, dopants, and other environmental considerations. Thus, in the twisted nematic phase, manipulation of the pitch, and thus the wavelength of maximum reflection, can be accomplished with a wide variety of tools. Furthermore, the bandwidth $\Delta\lambda$ of the reflected wavelength band also can be manipulated in the manner described in U.S. Pat. No. 5,506,704 and U.S. Pat. No. 5,793,456.

Polymer networks as provided by this invention can be made either flexible or brittle depending on crosslinking Brittle films, for example, can be flaked and the flakes used as pigments in a variety of inks or paints for use in cosmetics and automobile paint. The films can be combined with other pigments or pigment layers, for instance black layers that act to enhance the brilliance of the reflected light.

Polymer networks as provided by this invention are useful as optical elements or components of an optical element. An optical element is any film, coating or shaped object that is used to modify the characteristics of light. The modifications produced by optical elements include changes in the intensity of light through changes in transmission or reflectivity, changes in wavelength or wavelength distribution, changes in the state of polarization, changes in the direction of propagation of part or all of the light, or changes in the spatial distribution of intensity by, for example, focusing, collimating, or diffusing the light. Examples of optical elements include linear polarizers, circular polarizers, lenses, mirrors, collimators, diffusers, reflectors and the like. One specific example of an optical element is a layer of a cholesteric network as provide by this invention that reflects light within the vicinity of $\lambda_0$, employed in a window structure.

An optical element prepared from a polymer network as provided by this invention may be used as a component in a multilayer laminate, one form of which may be a laminated article. In one embodiment, the optical element may be provided in the form of a sheet that has a thickness of greater than about 10 mils (0.25 mm), or about 20 mils (0.50 mm) or greater, where the total thickness of all components from which the laminate is composed may be a thickness of about 30 mils (0.75 mm) or greater to ensure adequate penetration resistance commonly regarded as a feature of safety laminates. Polymeric sheets useful for such purpose may be formed by any suitable process such as extrusion, calendering, solution casting or injection molding.

A polymeric sheet to be used as an interlayer within a laminate may have a roughened surface to effectively allow most of the air to be removed from between the surfaces of the laminate during the lamination process. This may be accomplished, for example, by mechanically embossing the sheet after extrusion, as described above, or by melt fracture during extrusion of the sheet and the like. This rough surface is only temporary and particularly functions to facilitate deairing during laminating after which it is melted smooth from the elevated temperature and pressure associated with autoclaving and other lamination processes.

In an embodiment where the optical element to be used in a laminate is a polymeric film, the film may be treated to enhance the adhesion to a coating or to a polymeric sheet or both. This treatment may take any suitable form known such as adhesives, primers, such as silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof. A film suitable for use herein as an optical element may have a thickness of about 10 mils (0.25 mm) or less, or a thickness of between about 0.5 mils (0.012 millimeters (mm)), to about 10 mils (0.25 mm), or a thickness of about 1 mil (0.025 mm) to about 5 mils (0.13 mm)

In a further embodiment, a process to produce a multilayer laminate according to this invention provides a polymeric sheet laminated to a polymeric film that is coated with the twisted nematic liquid crystal layer. The polymeric sheet may be lightly bonded to the film with the twisted nematic liquid crystal through a nip roll bonding process. The components may be heated to a temperature sufficient to promote temporary fusion bonding, i.e., to cause the surfaces of the polymeric sheet or the polymeric film to become tacky. Suitable temperatures are within the range of about 50° C. to about 120° C., with the preferred surface temperatures reaching about 65° C. The film with the twisted nematic liquid crystal is fed along with the polymeric sheet through nip rolls where the two layers are merged together under moderate pressure to form a weakly bonded laminate. Generally the bonding pressure will be within the range of about 10 psi (0.7 kg/sq cm), to about 75 psi (5.3 kg/sq cm), and is preferably within the range of about 25 psi (1.8 kg/sq cm), to about 30 psi (2.1 kg/sq cm). After bonding, the laminate is passed over a series of cooling rolls which ensure that the laminate taken up on a roll is not tacky. Laminates made through this process will have sufficient strength to allow handling by laminators who may produce further laminated articles, such as glass laminates, which encapsulate this laminate.

A multi-layer laminate may also be formed by an autoclave processes wherein a glass sheet, an interlayer composed of a polymeric sheet, a polymeric film with the twisted nematic liquid crystal (either in the form of a coated layer or of a film), a second polymeric sheet, and a second glass sheet are laminated together under heat and pressure and a vacuum (for example, in the range of about 27-28 inches (689-711 mm) Hg), to remove air.

In addition to a layer of a twisted nematic liquid crystal, whether as a polymeric sheet or as a polymeric film (either in the form of a coated layer or a film), a multilayer laminate as provided by this invention may include additional layers, such as other polymeric sheets, other coated or uncoated polymeric films, half-wave plates and absorptive layer. The additional layers may be glass or rigid transparent plastic sheets, such as, for example, polycarbonates, acrylics, polyacrylates, cyclic polyolefins, such as ethylene norbornene polymers, metallocene-catalyzed polystyrenes and the like and combinations thereof. Metal or ceramic plates may also be suitable, if transparency is not required for the laminate. The term "glass" is meant to include not only window glass, plate glass, silicate glass, sheet glass, and float glass, but also includes colored glass, specialty glass which includes ingredients to control, for example, solar heating, coated glass with, for example, sputtered metals, such as silver or indium tin oxide, for solar control purposes and other specialty glasses. The type of glass to be selected for a particular laminate depends on the intended use.

An absorptive layer may also comprise part of a laminate as provided herein. The absorptive layer may be in the form of a discrete film. In other embodiments the absorptive layer may be in the form of a coating on one or more of the twisted nematic liquid crystal layers, the polymeric sheets, the polymeric films and the rigid sheets. In still other embodiments the absorptive layer may be incorporated into one or more of the twisted nematic liquid crystal layers, the polymeric sheets, the polymeric films and the rigid sheets.

The present invention is further defined in the following examples. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

In the following examples, thermal transitions are given in degrees Centigrade. The following notations are used to describe the observed phases: K=crystal, N=nematic, S=smectic, TN*=twisted nematic, X=unidentified phase, I=isotropic, P=polymerized. The thermal transitions and phase assignments were made with differential scanning calorimetry and hotstage optical microscopy. Unless noted otherwise, the phase behavior refers to the first heating cycle.

The following materials are used in the examples of the invention. Compound 3, a chiral dopant used in the chiral nematic mixtures of the invention was prepared in the following manner:

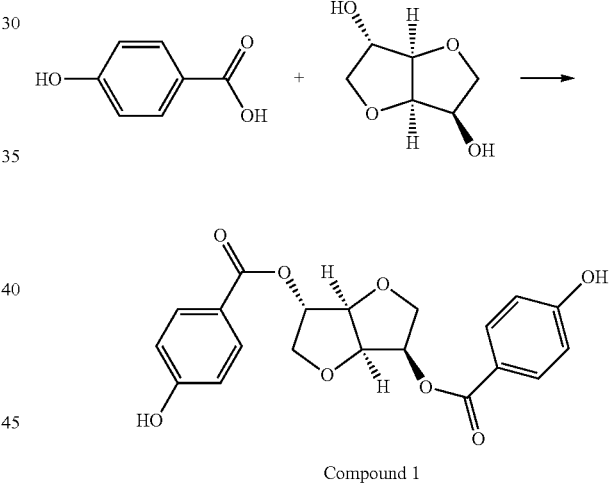

Compound 1

4-Hydroxybenzoic acid (80 g), isosorbide (40 g), p-toluenesulfonic acid (2 g), and xylenes (500 mL) were combined in a flask equipped with a Dean-Stark trap, condenser and mechanical stirrer. The reaction mixture was heated to reflux for 7 hrs at which time an additional charge of p-toluenesulfonic acid (1.0 g) was added and the mixture heated back to reflux. After 2.5 hrs, the reaction was allowed to cool to room temperature. The xylenes were decanted and the solids were taken up in 500 mL ethyl acetate, and washed with a 1% (w/v) sodium bicarbonate solution. The solvent was removed under reduced pressure, providing Compound 1. $^1$H NMR (DMSO-d$_6$, 400 MHz) δ 3.88-3.98 (m, 4H), 4.58 (d, J=4.9 Hz, 1H), 4.93 (t, J=5.3 Hz, 1H), 5.27 (br s, 1H), 5.32 (q, J=4.5 Hz, 1H), 6.85 (d, J=8.8 Hz, 2H), 6.87 (d, J=8.8 Hz, 2H), 7.81 (d, J=8.8 Hz, 2H), 7.84 (d, J=8.8 Hz, 2H), 10.36 (s, 2H).

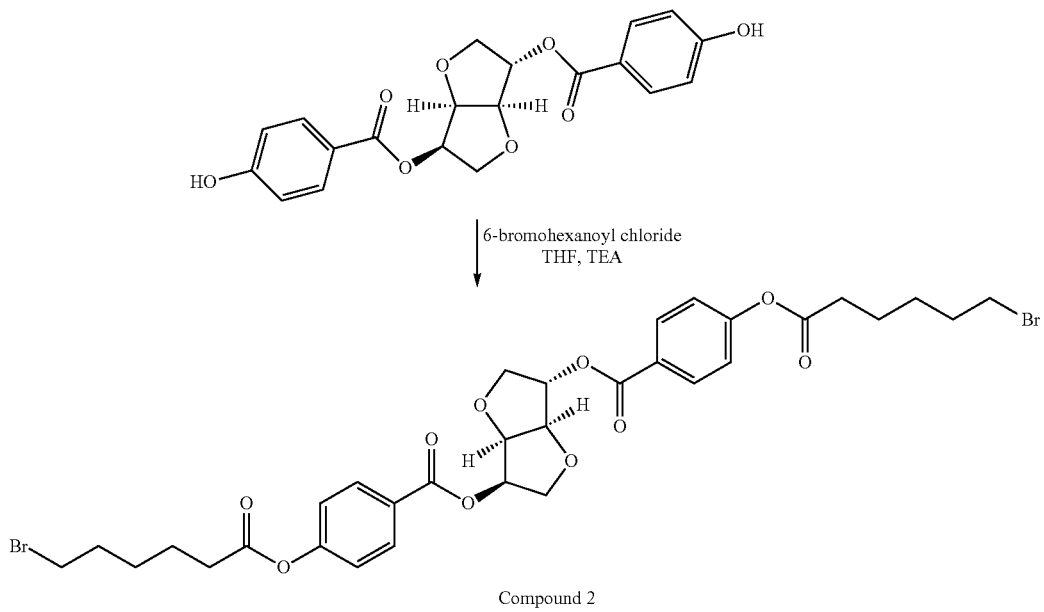

Compound 2

A mixture of Compound 1 (30 g), THF (200 mL), and triethylamine (48 mL) was cooled to 0° C. A mixture of 6-bromohexanoyl chloride (36.5 g) and tetrahydrofuran (150 mL) was added dropwise over 25 minutes. After stirring for 2 hrs the reaction was partitioned between water and diethyl ether and the organics were washed with dilute HCl, water, dried, filtered, and concentrated. The crude mixture was crystallized from isopropyl alcohol to provide Compound 2. $^1$H NMR (CDCl$_3$, 500 MHz) d1.59 (m, 4H), 1.80 (m, 4H), 1.93 (m, 4H), 2.60 (t, J=7.4 Hz, 2H), 2.61 (t, J=7.4 Hz, 2H), 3.43 (t, J=6.7 Hz, 2H), 3.44 (t, J=6.7 Hz, 2H), 4.07 (m, 4H), 4.66 (app d, 1H), 5.04 (app t, 1H), 5.41 (app q, 1H), 5.48 (app d, 1H), 7.16 (d, J=8.9 Hz, 2H), 7.18 (d, J=8.9 Hz, 2H), 8.04 (d, J=8.9 Hz, 2H), 8.11 (d, J=8.8 Hz, 2H).

acrylic acid (11.2 g). The mixture was heated to reflux for 6.5 hrs and stirred at RT for 16 h. The mixture was diluted with ethyl ether and washed with water. The organics were dried, filtered, concentrated, and then taken up in hot isopropyl alcohol. On cooling solids precipitated and were filtered to provide Compound 3. $^1$H NMR (CDCl$_3$, 400 MHz) δ 1.52 (m, 4H), 1.75 (m, 4H), 1.81 (m, 4H), 2.60 (t, J=7.4 Hz, 2H), 2.61 (t, J=7.4 Hz, 2H), 4.07 (m, 4H), 4.191 (t, J=6.5 Hz, 2H), 4.194 (t, J=6.5 Hz, 2H), 4.66 (app d, J=4.7 Hz, 1H), 5.05 (app t, J=5.2 Hz, 1H), 5.41 (app q, J=5.2 Hz, 1H), 5.48 (br s, 1H), 5.82 (br d, J=10.4 Hz, 2H), 6.12 (app dd, J=17.3, 10.4 Hz, 2H), 6.40 (app d, J=17.3 Jz, 2H), 7.16 (d, J=8.4 Hz, 2H), 7.18 (d, J=8.4 Hz, 2H), 8.04 (d, J=8.8 Hz, 2H), 8.10 (d, J=8.8 Hz, 2H).

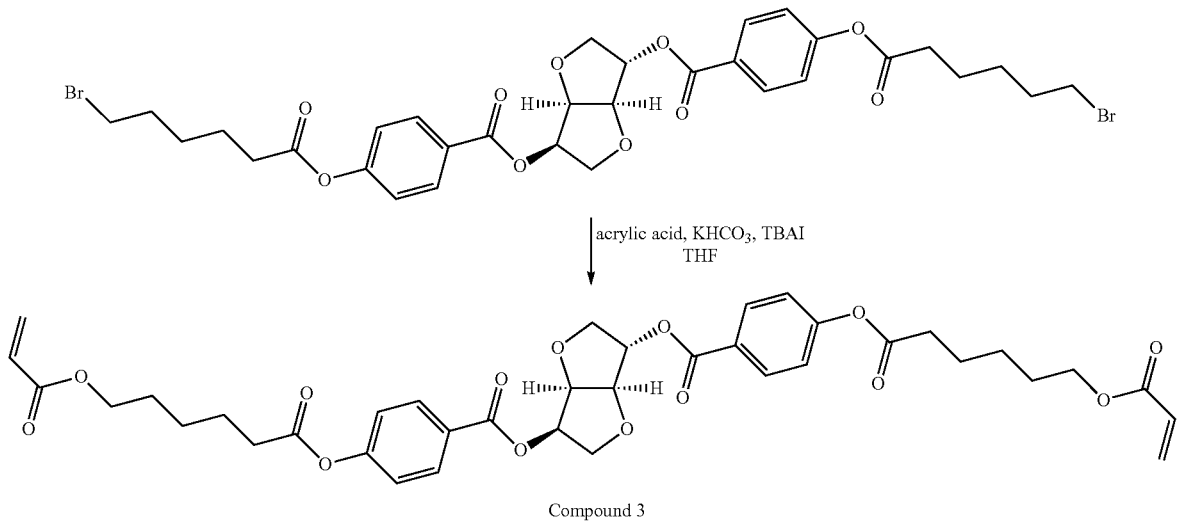

Compound 3

To a mixture of Compound 2 (40 g), potassium bicarbonate (48.7 g), tetrabutylammonium iodide (8.0 g), 2,6-di-tert-butyl-4-methylphenol (1.74 g), and THF (500 mL), was added Compound 6, a chiral dopant used in the chiral nematic mixtures of the invention, was prepared in the following manner:

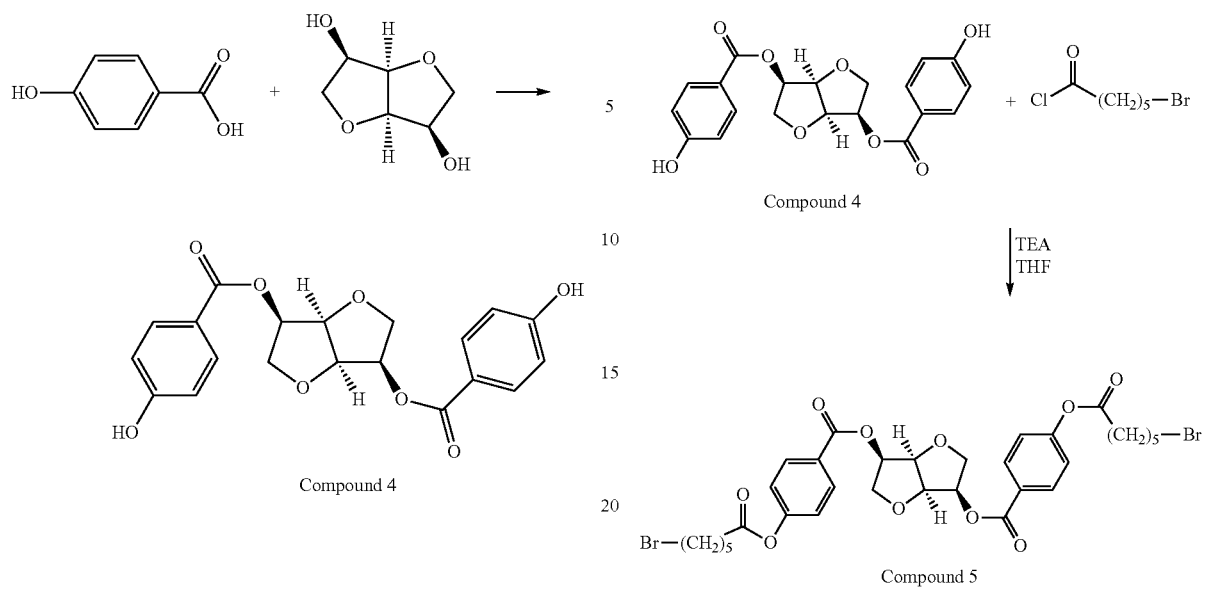

A mixture of 4-hydroxybenzoic acid (40 g), isomannide (20 g), toluene (85 mL), diethylene glycol dimethyl ether (4 mL), and concentrated sulfuric acid (1 g) was heated to reflux for 8 h under nitrogen. After cooling to RT, ethyl acetate (200 mL) was added and the mixture stirred for 2 h at 60° C. The mixture was cooled to RT and the resulting solid filtered and dried to provide Compound 4. $^1$H-NMR (DMSO-$d_6$, 500 MHz): δ 3.85 (d of d, 2H, $J_{HH}$=9.3 Hz); 4.05 (d of d, 2H, $J_{HH}$=9.3 Hz); 4.78 (m, 2H); 5.23 (m, 2H); 6.89 (d, 4H); 7.87 (d, 4H); 10.35 (s, 2H).

Compound 5 was prepared using an analogous procedure as was described above for the synthesis of Compound 2. $^1$H NMR (DMSO-$d_6$, 500 MHz): δ 1.50 (m, 4H); 1.69 (m, 4H); 1.86 (m, 4H); 2.64 (t, 4H, $J_{HH}$=7.2 Hz); 3.56 (t, 4H, $J_{HH}$=6.6 Hz); 3.90 (d of d, 2H, $J_{HH}$=9.1 Hz); 4.07 (d of d, 2H, $J_{HH}$=9.2 Hz); 4.82 (m, 2H); 5.29 (m, 2H); 7.31 (m, 4H); 8.06 (m, 4H).

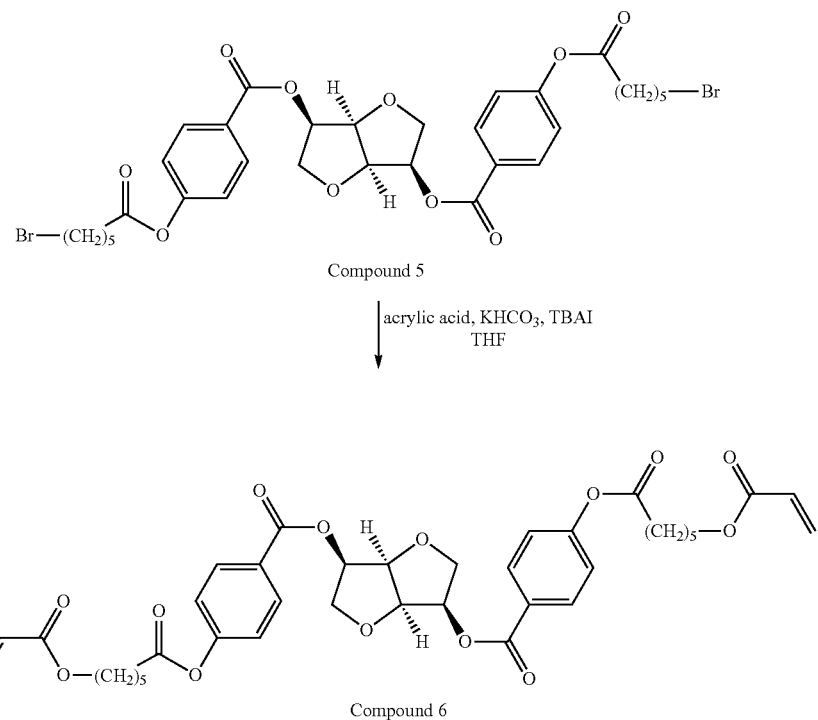

Compound 6 was prepared using an analogous procedure as was described above for the synthesis of Compound 3. $^1$H NMR (CDCl$_3$, 500 MHz) δ 1.52 (m, 4H), 1.75 (m, 4H), 1.81 (m, 4H), 2.60 (t, J=7.4 Hz, 4H), 3.99 (dd, J=9.4, 6.5 Hz, 2H), 4.13 (dd, J=9.4, 6.5 Hz, 2H), 4.20 (t, J=6.6 Hz, 4H), 4.87 (dd, J=4.1, 1.3 Hz, 2H), 5.33 (m, 2H), 5.82 (dd, J=10.5, 1.4 Hz, 2H), 6.12 (dd, J=17.3, 10.4 Hz, 2H), 6.40 (dd, J=17.3, 1.4 Hz, 2H), 7.18 (d, J=8.7 Hz, 4H), 8.12 (d, 8.7 Hz, 4H).

Example 1

This example illustrates the formation of Compound 9, a liquid crystal monomer of one embodiment of the invention.

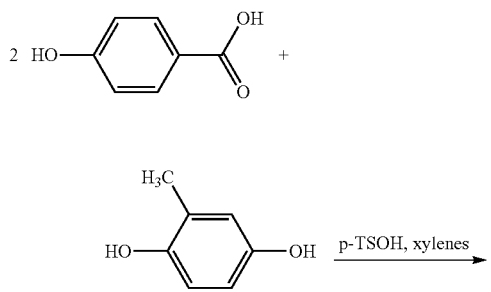

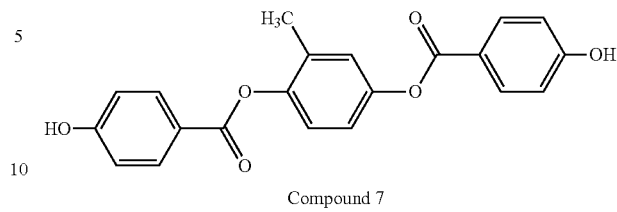

Compound 7

A mixture of 240.0 g 4-hydroxybenzoic acid, 100.2 g methylhydroquinone, 6 g p-toluenesulfonic acid, and 1.5 L xylenes was heated to reflux under a nitrogen atmosphere for a total of 26 h in a flask equipped with a Dean-Stark trap, condenser and mechanical stirrer. Additional p-toluenesulfonic acid (6.0 g portions) was added after 8 and 18 h after cooling the reaction mixture RT. The final reaction mixture was cooled to RT, the solids collected and washed with hexanes. The solids were slurried with hot acetone (600 mL) and cooled to RT, collected and dried to provide Compound 7. $^1$H NMR (DMSO-d$_6$, 500 MHz) δ 2.16 (s, 3H), 6.93 (d, J=8.8 Hz, 2H), 6.95 (d, J=8.8 Hz, 2H), 7.13 (m, 1H), 7.23 (m, 2H), 7.99 (d, J=8.8 Hz, 2H), 8.02 (d, J=8.8 Hz, 2H), 10.51 (s, 2H).

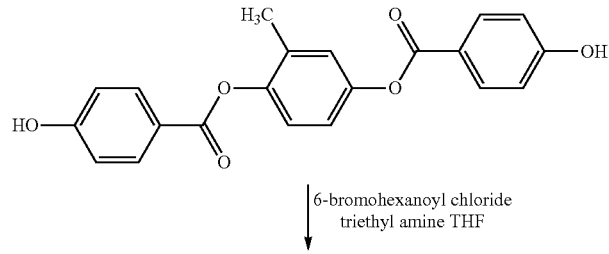

6-bromohexanoyl chloride
triethyl amine THF

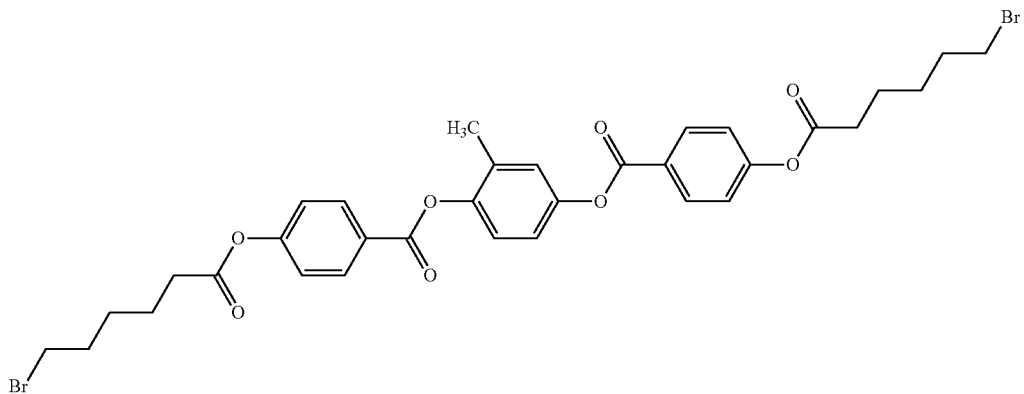

Compound 8

A mixture of Compound 7 (100 g), THF (750 mL), and triethylamine (165 mL) was cooled to 0° C. A mixture of 6-bromohexanoyl chloride (126.0 g) in tetrahydrofuran (400 mL) was added over about 0.75 h. The mixture was stirred at 0° C. for 2 h and allowed to warm to RT, and stirred for 2 h. The mixture was poured into 1.5 L water and hydrochloric acid (37%) was added until the mixture was pH 6. The mixture was stirred for 15 min and the solids collected. The solids were rinsed with water, methanol and then dried to provide Compound 8. $^1$H NMR (CDCl$_3$, 500 MHz) δ 1.60 (m, 4H), 1.81 (m, 4H), 1.95 (m, 4H), 2.25 (s, 3H), 2.62 (t, J=7.4 Hz, 2H), 2.63 (t, J=7.4 Hz, 2H), 3.45 (t, J=6.8 Hz, 4H), 7.10 (dd, J=8.6, 2.7 Hz, 1H), 7.14 (d, J=2.7, 1H), 7.19 (d, J=8.6 Hz, 1H), 7.24 (d, J=8.7 Hz, 2H), 7.25 (d, J=8.7 Hz, 2H), 8.22 (d, J=8.7 Hz, 2H), 8.25 (d, J=8.7 Hz, 2H).

the solvent removed and the product recrystallized from isopropanol to provide Compound 9 (17.25 g, 88%). $^1$H NMR (CDCl$_3$, 500 MHz) δ1.54 (m=4H), 1.77 (m, 4H), 1.83 (m, 4H), 2.25 (s, 3H), 2.624 (t, J=7.4 Hz, 2H), 2.629 (t, J=7.4 Hz, 2H), 4.21 (t, J=6.6, 4H), 5.82 (dd, J=10.4, 1.3 Hz, 2H), 6.13 (dd, J=17.3, 10.4 Hz, 2H), 6.40 (dd, J=17.3, 1.3 Hz, 2H), 7.10 (dd, J=8.7, 2.7 Hz, 1H), 7.15 (d, J=2.7, 1H), 7.19 (d, J=8.7, 1H), 7.24 (d, J=8.6 Hz, 2H), 7.25 (d, J=8.6 Hz, 2H), 8.22 (d, 8.6 Hz, 2H), 8.25 (d, J=8.6 Hz, 2H).

Examples 2-10

Compounds 10 through 18 that are liquid crystal monomers of various embodiments of the invention where prepared in a similar manner as described in Example 1:

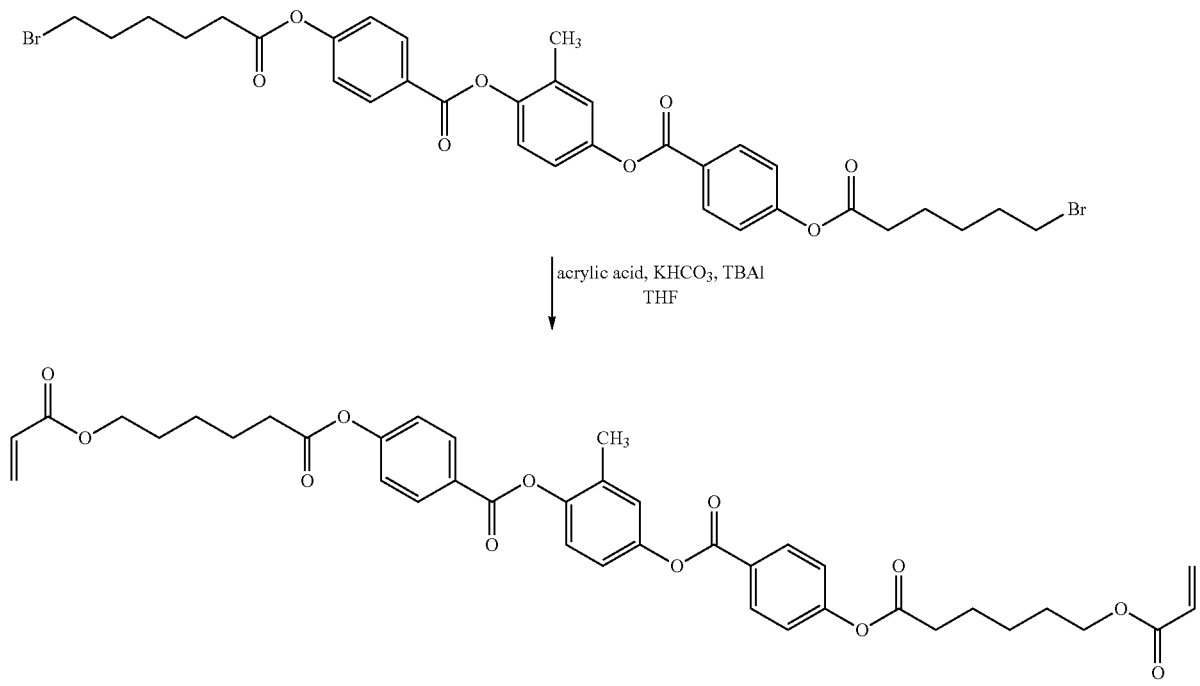

Compound 9

To a mixture of Compound 8 (20.0 g), 25.1 g potassium bicarbonate, 5.14 g tetrabutyl ammonium iodide, 1.04 g 2,6-di-tert-butyl-4-methylphenol, and THF (350 mL) was added 5.73 mL acrylic acid. The mixture was heated at 65° C. for 9 h and then allowed to stir at RT overnight. The mixture was partition between ether/water, and the ether layer washed with several portions of water. The ether layer was dried and

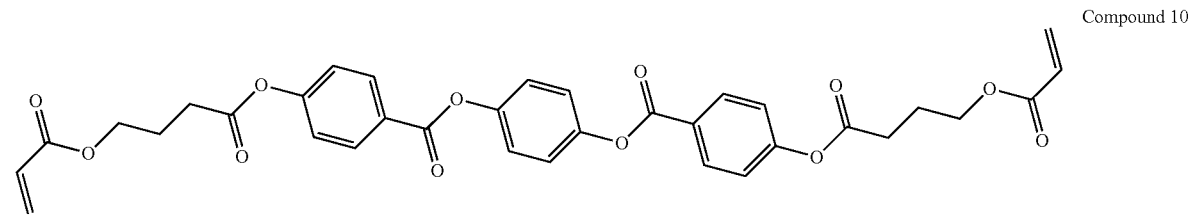 [SMILES: C=CC(=O)OCCCC(=O)Oc1ccc(C(=O)Oc2ccc(OC(=O)c3ccc(OC(=O)CCCOC(=O)C=C)cc3)cc2)cc1]

Compound 10

¹H NMR (CDCl₃, 500 MHz) δ 2.17 (m, 4H), 2.73 (t, J=7.3 Hz, 4H), 4.31 (t, J=6.3 Hz, 4H), 5.85 (dd, J=10.4, 1.4 Hz, 2H), 6.14 (dd, J=17.4, 10.4 Hz, 2H), 6.43 (dd, J=17.4, 1.4 Hz, 2H), 7.26 (d, J=8.7 Hz, 4H), 7.28 (s, 4H), 8.24 (d, J=8.7 Hz, 4H).

Hz, 2H), 4.310 (t, J=6.2 Hz, 2H), 5.858 (dd, J=10.5, 1.4 Hz, 1H), 5.860 (dd, J=10.5, 1.4 Hz, 1H), 6.144 (dd, J=17.4, 10.5 Hz, 1H), 6.146 (dd, J=17.4, 10.5 Hz, 1H), 6.434 (dd, J=17.4, 1.4 Hz, 1H), 6.437 (dd, J=17.4, 1.4 Hz, 1H), 7.10 (dd, J=8.6,

Compound 11

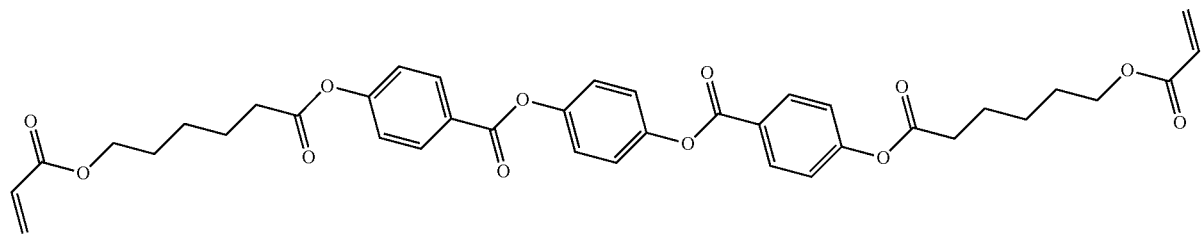

2.8 Hz, 1H), 7.15 (d, J=2.6, 1H), 7.19 (d, J=8.8 Hz, 1H), 7.25 (d, J=8.8 Hz, 2H), 7.27 (d, J=8.8 Hz, 2H), 8.23 (d, J=8.8 Hz, 2H), 8.26 (d, J=8.8 Hz, 2H).

¹H NMR (CDCl₃, 500 MHz) δ 1.54 (m, 4H), 1.76 (m, 4H), 1.83 (m, 4H), 2.63 (t, J=7.4 Hz, 4H), 4.20 (t, J=6.6 Hz, 4H), 5.82 (dd, J=10.5, 1.4 Hz, 2H), 6.12 (dd, J=17.4, 10.5 Hz, 2H), 6.41 (dd, J=17.4, 1.4 Hz, 2H), 7.24 (d, J=8.7 Hz, 4H), 7.28 (s, 4H), 8.23 (d, J=8.7 Hz, 4H).

Compound 12

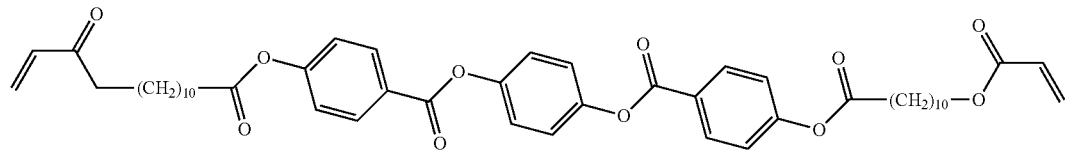

¹H NMR (CDCl₃, 500 MHz) δ 1.28-1.47 (m, 24H), 1.67 (m, 4H), 1.77 (m, 4H), 2.59 (t, J=7.5 Hz, 4H), 4.16 (t, J=6.7 Hz, 4H), 5.80 (dd, J=10.5, 1.3 Hz, 2H), 6.12 (dd, J=17.4, 10.5 Hz, 2H), 6.39 (J=17.4, 1.3 Hz, 2H), 7.24 (d, J=8.7 Hz, 4H), 7.28 (s, 4H), 8.23 (d, J=8.7 Hz, 4H).

Compound 13

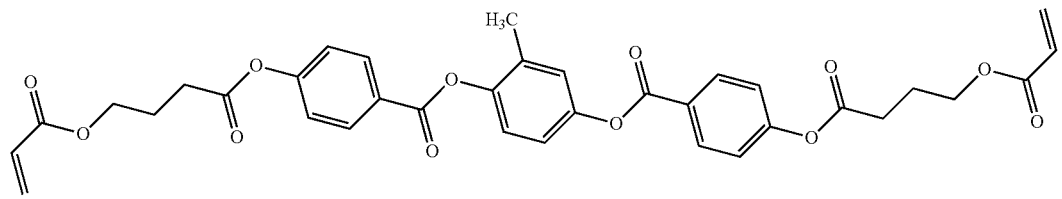

¹H NMR (CDCl₃, 500 MHz) δ 2.17 (m, 4H), 2.26 (s, 3H), 2.73 (t, J=7.3 Hz, 2H), 2.74 (t, J=7.3 Hz, 2H), 4.308 (t, J=6.2

Compound 14

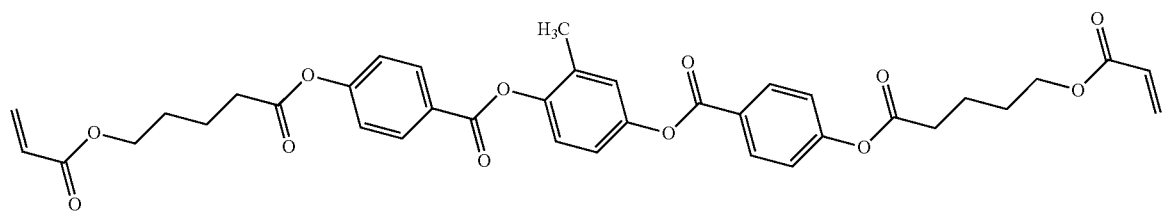

¹H NMR (CDCl₃, 500 MHz) δ 1.86 (m, 8H), 2.25 (s, 3H), 2.66 (t, J=7.0 Hz, 2H), 2.67 (t, J=7.0 Hz, 2H), 4.24 (t, J=6.2 Hz, 4H), 5.84 (dd, J=10.5, 1.3 Hz, 2H), 6.14 (dd, J=17.4, 10.5 Hz, 2H), 6.42 (dd, J=17.4, 1.3 Hz, 2H), 7.10 (dd, J=8.7, 2.6 Hz, 1H), 7.14 (d, 2.6 Hz, 1H), 7.19 (d, J=8.7 Hz, 1H), 7.24 (d, J=8.8 Hz, 2H), 7.25 (d, J=8.8 Hz, 2H), 8.23 (d, J=8.8 Hz, 2H), 8.25 (d, J=8.8 Hz, 2H).

Compound 15

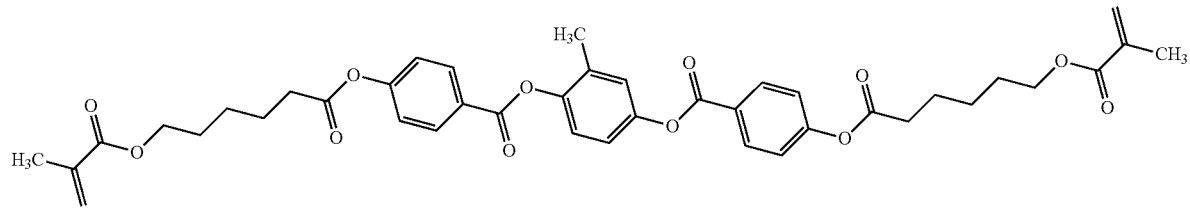

¹H NMR (CDCl₃, 400 MHz) δ 1.55 (m, 4H), 1.77 (m, 4H), 1.84 (m, 4H), 1.95 (s, 6H), 2.25 (s, 3H), 2.62 (t, J=7.4 Hz, 2H), 2.63 (t, J=7.4 Hz, 2H), 4.19 (t, J=6.5 Hz, 4H), 5.56 (m, 2H), 6.11 (br s, 2H), 7.10 (dd, J=8.7, 2.6 Hz, 1H), 7.14 (d, J=2.6 Hz, 1H), 7.19 (d, J=8.7 Hz, 1H), 7.23 (d, J=8.8 Hz, 2H), 7.24 (d, J=8.8 Hz, 2H), 8.22 (d, J=8.8 Hz, 2H), 8.25 (d, J=8.8 Hz, 2H).

Compound 16

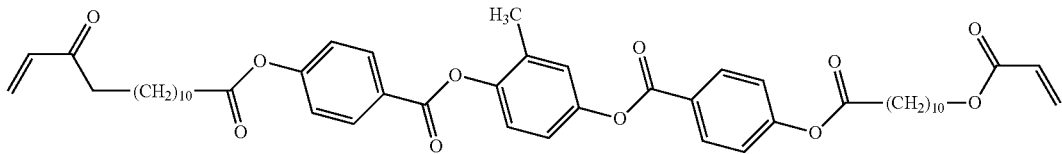

¹H NMR (CDCl₃, 400 MHz) δ 1.25-1.47 (m, 24H), 1.67 (m, 4H), 1.78 (m, (4H), 2.25 (s, 3H), 2.59 (t, J=7.5 Hz, 2H), 2.60 (t, J=7.5 Hz, 2H), 4.16 (t, J=6.7 Hz, 4H), 5.80 (dd, J=10.5, 1.3 Hz, 2H), 6.12 (dd, J=17.4, 10.5 Hz, 2H), 6.39 (dd, J=17.4, 1.3 Hz, 2H), 7.10 (dd, J=8.7 Hz, 2.5 Hz, 1H), 7.14 (d, J=2.5 Hz, 1H), 7.19 (d, J=8.7 Hz, 2H), 7.24 (d, J=8.7 Hz, 2H), 7.25 (d, J=8.7 Hz, 2H), 8.22 (d, J=8.7 Hz, 2H), 8.25 (d, J=8.7 Hz, 2H).

Compound 17

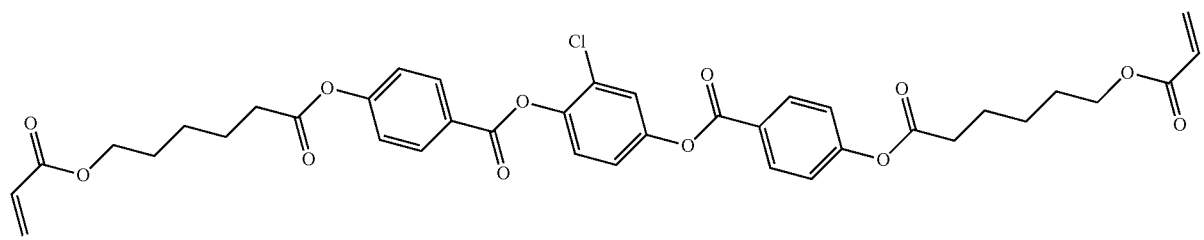

¹H NMR (CDCl₃, 500 MHz) δ 1.54 (m, 4H), 1.76 (m, 4H), 1.83 (m, 4H), 2.623 (t, J=7.4 Hz, 2H), 2.626 (t, J=7.4 Hz, 2H), 4.20 (t, J=6.5 Hz, 4H), 5.82 (dd, J=10.5, 1.3 Hz, 2H), 6.12 (dd, J=17.4, 10.5 Hz, 2H), 6.40 (dd, J=17.4, 1.3 Hz, 2H), 7.21 (dd, J=8.8, 2.7 Hz, 1H), 7.25 (d, J=8.7 Hz, 2H), 7.26 (d, J=8.7 Hz, 2H), 7.34 (d, J=8.8 Hz, 1H), 7.41 (d, J=2.7 Hz, 1H), 8.21 (d, J=8.7 Hz, 2H), 8.26 (d, J=8.7 Hz, 2H).

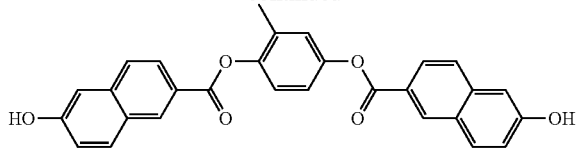

Compound 19

Compound 18

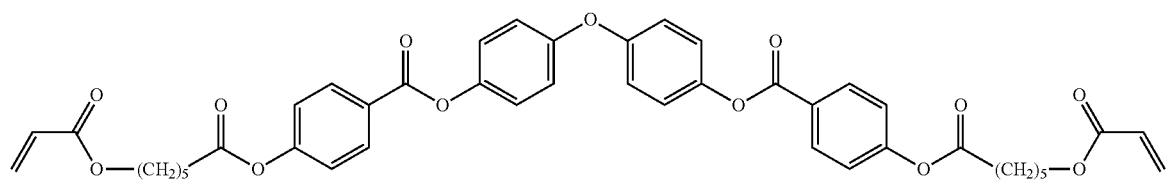

¹H NMR (DMSO-d₆, 500 MHz): δ 1.45 (m, 4H); 1.69 (m, 8H); 2.65 (t, 2H, $J_{HH}$=7.4 Hz); 4.14 (t, 4H, $J_{HH}$=6.5 Hz); 5.94 (d of d, 2H, $J_{HH}$=10.3 Hz); 6.18 (d of d, 2H, $J_{HH}$=17.3 Hz); 6.33 (d of d, 2H, $J_{HH}$=17.3 Hz); 7.15 (d, 4H); 7.36 (m, 8H); 8.19 (d, 4H).

Example 11

This example illustrates the formation of Compound 21, a liquid crystal monomer of one embodiment of the invention.

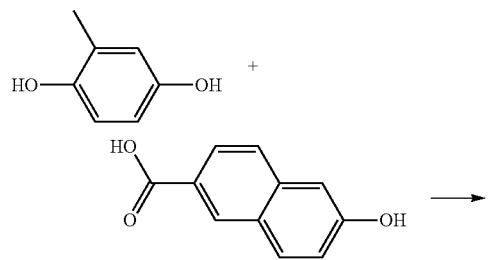

A mixture of 6-hydroxy-naphtalene-2-carboxylic acid (20 g), methylhydroquinone (6 g), concentrated sulfuric acid (1 mL), and xylenes (125 mL) was heated to reflux for 8 h under nitrogen in a flask equipped with a Dean-Stark trap, condenser and mechanical stirrer. About 2 mL water was collected in the trap. The mixture was cooled to RT, filtered, the solids were rinsed with hexanes and then dried. The solids were added to 400 mL of DMAc and the mixture was heated to 60° C. and stirred for 1 h. The mixture was cooled and the insoluble material was filtered off. The filtrate volume was concentrated to ~¼ volume and added drop-wise to 1 L of water and stirred for 2 h. The precipitate was filtered off and the crude product was dissolved in 200 mL acetone and boiled for 0.5 h. The mixture was cooled and stirred overnight at RT. The solids were filtered and the filtrate solution was added drop-wise to 1 L of water and stirred for 1 h. The precipitate was filtered off and dried overnight to provide Compound 19.
¹H-NMR (DMSO-d₆, 500 MHz): δ 2.25 (s, 3H); 7.2-7.4 (m, 7H); 7.8-7.9 (m, 2H); 8.0-8.1 (m, 4H); 8.75 (d, 2H, $J_{HH}$=16 Hz); 10.3 (s, 2H broad).

Compound 20

Compound 20 was prepared using an analogous procedure as was described above for the synthesis of Compound 8. $^1$H-NMR (DMSO-d$_6$, 500 MHz): δ 1.43 (q, 4H, J$_{HH}$=7.4 Hz); 1.62 (q, 4H, J$_{HH}$=7.5 Hz); 1.77 (q, 4H, J$_{HH}$=7.3 Hz); 2.14 (s, 3H); 2.57 (t, 4H, J$_{HH}$=7.4 Hz); 3.46 (t, 4H, J$_{HH}$=6.6 Hz); 7.1-7.4 (m, 5H); 7.72 (m, 2H); 7.9-8.1 (m, 4H), 8.17 (m, 2H); 8.80 (d, 2H, J$_{HH}$=20.6 Hz).

were collected. After cooling to room temperature the solids were filtered off, washed with hexanes, and dried. The obtained solids were placed into 600 mL of boiling acetone and stirred for 30 min. The mixture was filtered hot to eliminate traces of insoluble material. After cooling to room temperature the acetone solution was yellow but transparent. 1500 mL of DI water were added slowly to precipitate the

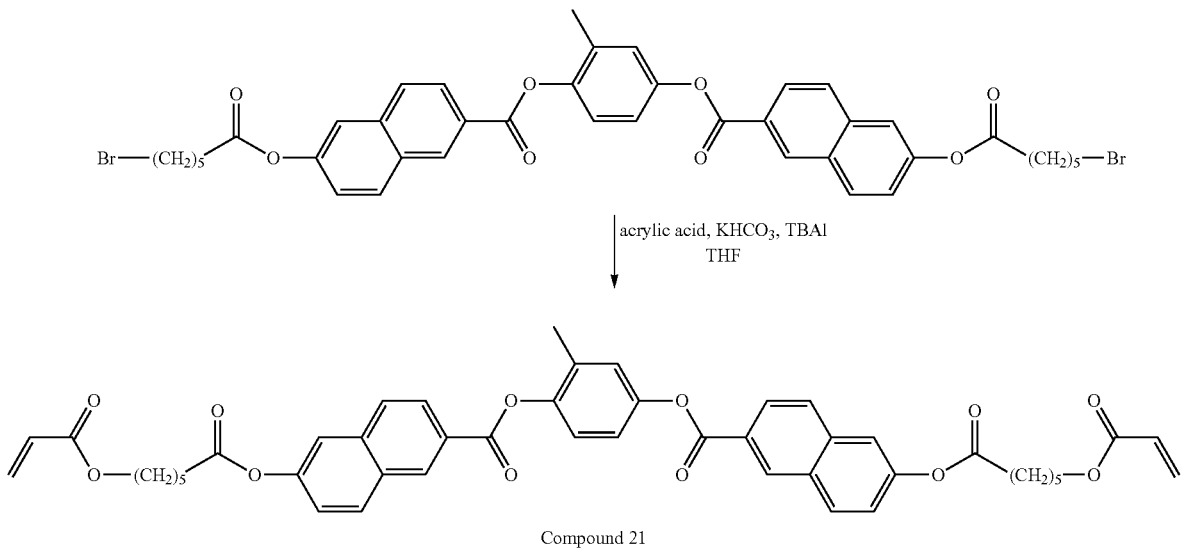

Compound 21

Compound 21 was prepared using an analogous procedure as was described above for the synthesis of Compound 9. The product was obtained in 76% isolated yield. $^1$H-NMR (DMSO-d$_6$, 500 MHz): δ 1.48 (q, 4H, J$_{HH}$=7.3 Hz); 1.72 (m, 8H, J$_{HH}$=7.5 Hz); 2.26 (s, 3H); 2.69 (t, 4H, J$_{HH}$=7.3 Hz); 4.16 (t, 4H, J$_{HH}$=6.5 Hz); 5.94 (d of d, 2H, J$_{HH}$=10.3 Hz); 6.20 (d of d, 2H, J$_{HH}$=17.2 Hz); 6.35 (d of d, 2H, J$_{HH}$=17.3 Hz); 7.3-7.5 (m, 5H); 7.83 (m, 2H); 8.1-8.2 (m, 4H), 8.28 (d of d, 2H, J$_{HH}$=9.1 Hz); 8.92 (d, 2H, J$_{HH}$=16.6 Hz).

Example 12

This example illustrates the formation of Compound 24, a liquid crystal monomer of one embodiment of the invention.

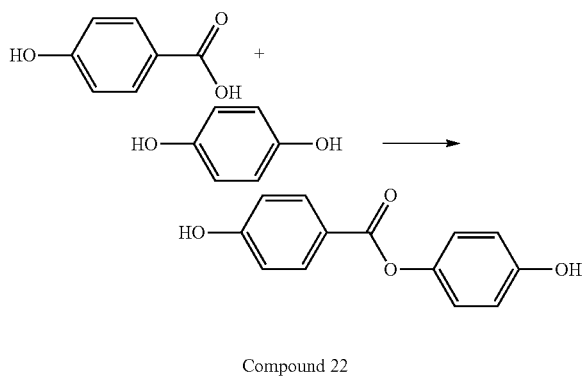

Compound 22

A mixture of 4-hydroxybenzoic acid (80 g), hydroquinone (64 g), p-toluenesulfonic acid (2 g), xylenes (500 mL) was heated to reflux in a flask equipped with a Dean-Stark trap, condenser and mechanical stirrer until about 10 mL of water product. The precipitated product was filtered off and dried to provide Compound 22. $^1$H NMR (CDCl$_3$, 500 MHz) δ 6.78 (d, 8.9 Hz, 2H), 6.90 (d, J=8.8 Hz, 2H), 7.00 (d, J=8.9 Hz, 2H), 7.94 (d, J=8.8 Hz, 2H), 9.42 (s, 1H), 10.44 (s, 1H).

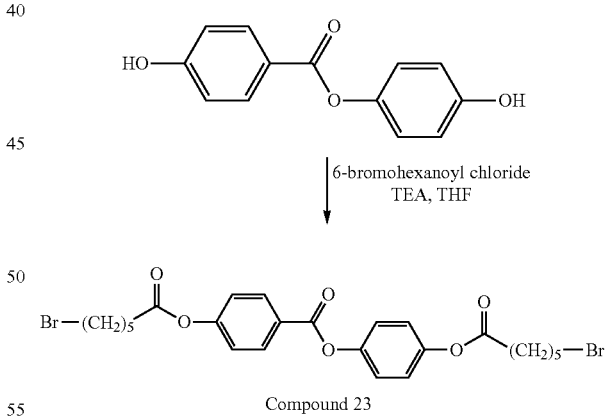

Compound 23

Compound 23 was prepared using an analogous procedure as was described above for the synthesis of Compound 8. $^1$H NMR (CDCl$_3$, 500 MHz) δ1.59 (m, 4H), 1.80 (m, 4H), 1.94 (m, 4H), 2.59 (t, J=7.4 Hz, 2H), 2.63 (t, J=7.4 Jz, 2H), 3.441 (t, J=6.7 Hz, 2H), 3.446 (t, J=6.7 Hz, 2H), 7.14 (d, J=9.0 Hz, 2H), 7.22 (d, 9.0 Hz, 2H), 7.24 (d, 8.8 Hz, 2H), 8.22 (d, 8.8 Hz, 2H).

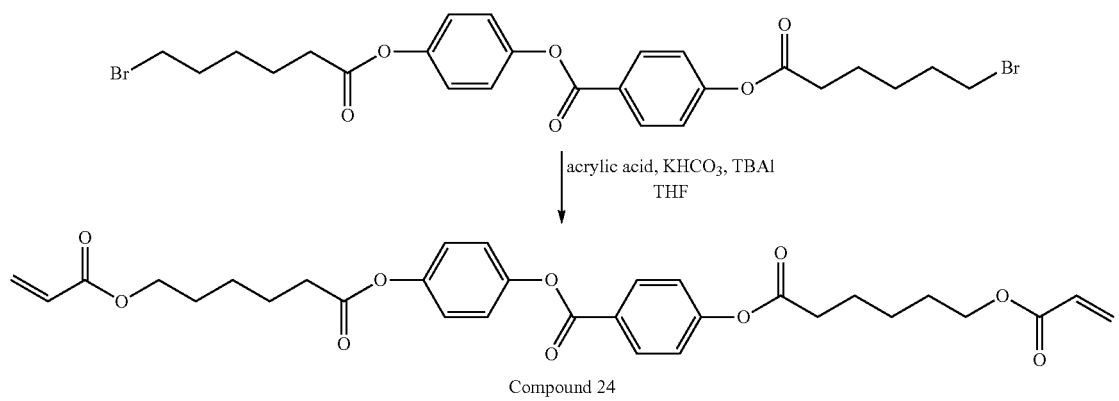

↓ acrylic acid, KHCO₃, TBAl
THF

Compound 24

Compound 24 was prepared using an analogous procedure as was described above for the synthesis of Compound 9. ¹H NMR (CDCl₃, 500 MHz) δ 1.52 (m, 4H), 1.76 (m, 4H), 1.78 (m, 4H), 2.59 (t, J=7.4 Hz, 2H), 2.62 (t, J=7.4 Hz, 2H), 4.19 (t, J=6.6 Hz, 2H), 4.20 (t, J=6.6 Hz, 2H), 5.823 (dd, 1H), 5.826 (dd, 1H), 6.122 (dd, 1H), 6.127 (dd, 1H), 6.404 (dd, 1H), 6.407 (dd, 1H), 7.13 (d, J=8.6 Hz, 2H), 7.21 (d, J=8.6 Hz, 2H), 7.23 (d, J=8.6 Hz, 2H), 8.21 (d, J=8.6 Hz, 2H).

Example 13

This example illustrates the formation of Compound 27, a liquid crystal monomer of one embodiment of the invention.

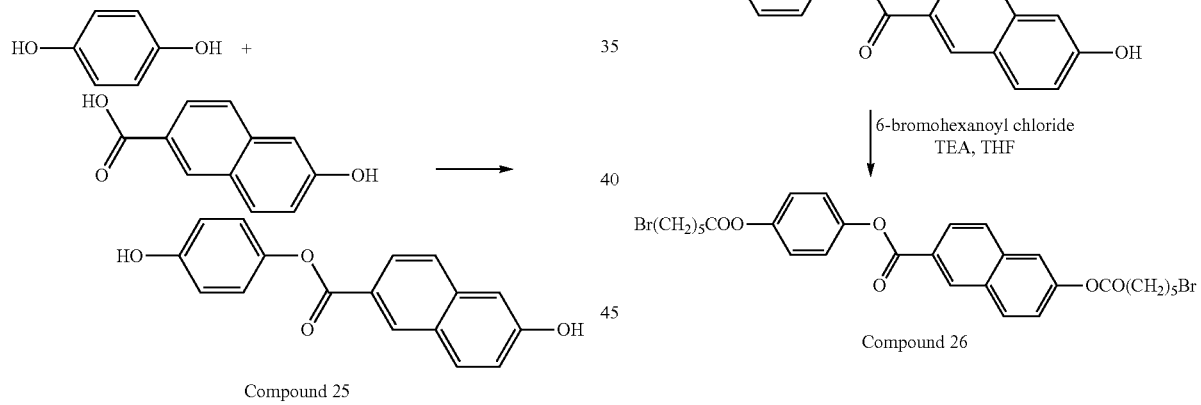

Compound 25

A mixture of 6-hydroxy-naphtalene-2-carboxylic acid (20 g), hydroquinone (17 g), concentrated sulfuric acid (4 drops), and xylenes (125 mL) was heated to reflux for 8 hours and during this time two more 4-drop aliquots of sulfuric acid were added. After 2.0 mL of water were collected in the trap the reaction was cooled to room temperature, the solids were filtered, washed with hexanes, and dried. The material was suspended into 300 mL of acetone and heated to reflux for 30 min. The mixture was filtered hot to remove insoluble materials and the clear solution was poured into 1 L of water. The precipitated product was filtered off, washed with water, and dried. The purification procedure described above was repeated once more to provide Compound 25. ¹H-NMR (DMSO-d₆, 500 MHz): δ 6.87 (m, 2H); 7.11 (m, 2H); 7.22-7.28 (m, 2H); 7.9-8.1 (m, 3H); 8.69 (d, 1H, J$_{HH}$=1 Hz); 9.50 (s, 1H); 10.27 (s, 1H).

Compound 26

Compound 26 was prepared using an analogous procedure as was described above for the synthesis of Compound 8. ¹H-NMR (DMSO-d₆, 500 MHz) δ 1.52 (m, 4H); 1.71 (m, 4H); 1.87 (m, 4H); 2.62 (t, 2H, J$_{HH}$=7.4 Hz); 2.68 (t, 2H, J$_{HH}$=7.3 Hz); 3.57 (m, 4H); 7.25 (m, 2H); 7.40 (m, 2H); 7.46 (m, 1H); 7.83 (d, 1H, J$_{HH}$=2 Hz); 8.1-8.3 (m, 3H); 8.87 (s, 1H).

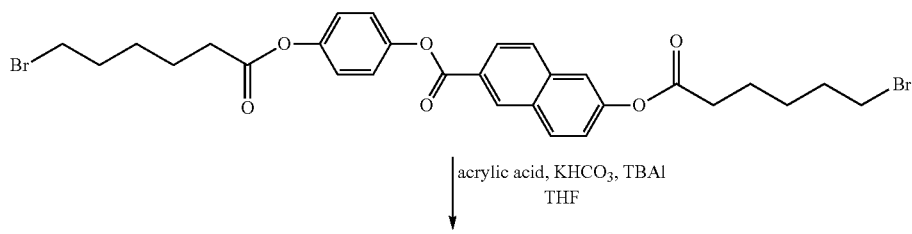

↓ acrylic acid, KHCO₃, TBAl
THF

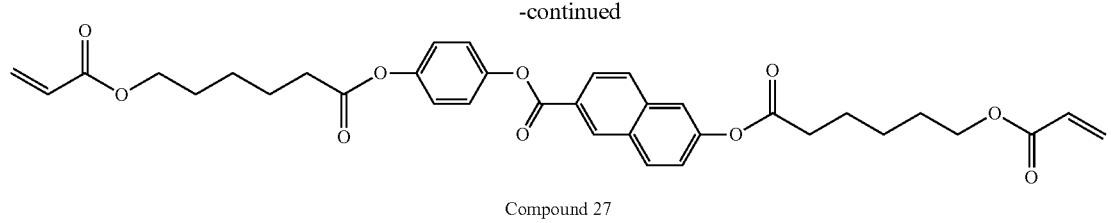

Compound 27

Compound 27 was prepared using an analogous procedure as was described above for the synthesis of Compound 9. $^1$H-NMR (DMSO-$d_6$, 500 MHz): δ 1.46 (m, 4H); 1.69 (m, 8H); 2.62 (t, 2H, $J_{HH}$=7.3 Hz); 2.69 (t, 2H, $J_{HH}$=7.3 Hz); 4.15 (m, 4H); 5.94 (d of d, 2H, $J_{HH}$=10.3 Hz); 6.19 (d of d, 2H, $J_{HH}$=17.3 Hz); 6.34 (d of d, 2H, $J_{HH}$=17.2 Hz); 7.24 (m, 2H); 7.40 (m, 2H); 7.46 (m, 1H); 7.83 (d, 1H, $J_{HH}$=2 Hz); 8.1-8.3 (m, 3H); 8.88 (s, 1H).

Examples 14-15

Procedures similar to those used in preparation of Compounds 8 and 9 (Example 1) were used to prepare Compounds 29 and 30, which are monomers provided by various embodiments the invention.

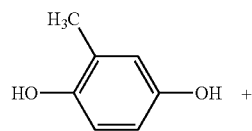

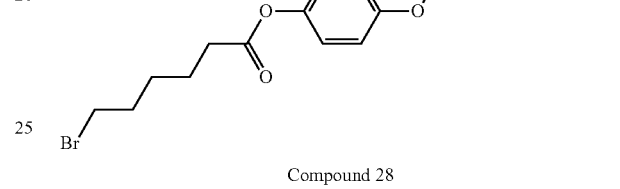

Compound 28

$^1$H NMR (CDCl$_3$, 500 MHz) δ 1.58 (m, 4H), 1.78 (m, 4H), 1.92 (m, 4H), 2.16 (s, 3H), 2.56 (t, J=7.4 Hz, 2H), 2.60 (t, J=7.4 Hz, 2H), 3.43 (t, J=6.7 Hz, 4H), 6.91 (dd, J=8.6, 2.8 Hz, 1H), 6.96 (d, J=2.8 Hz, 1H), 6.99 (d, J=8.6 Hz, 1H).

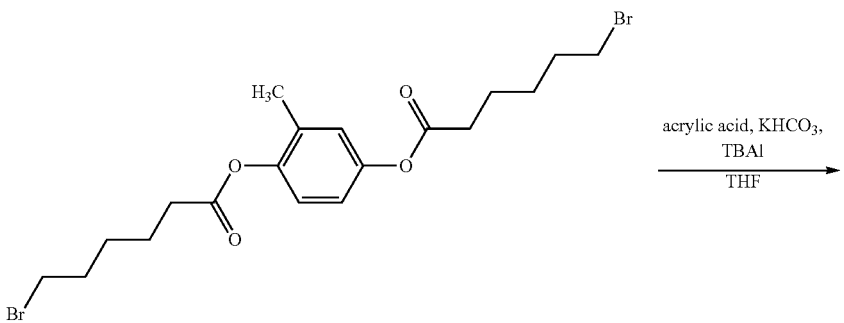

Compound 28

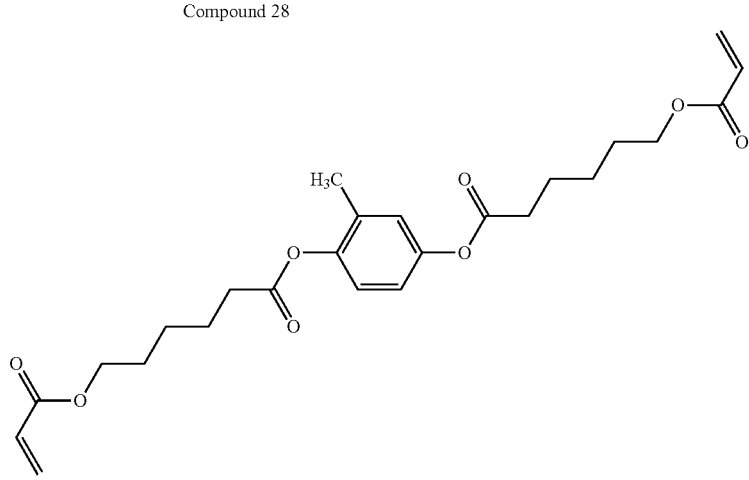

Compound 29

$^1$H NMR (CDCl$_3$, 500 MHz) δ 1.52 (m, 4H), 1.74 (m, 4H), 1.81 (m, 4H), 2.56 (t, J=7.5 Hz, 2H), 2.59 (t, J=7.5 Hz, 2H), 4.19 (t, J=6.55 Hz, 4H), 5.81 (br d, J=10.5 Hz, 2H), 6.12 (app dd, J=17.3, 10.5 Hz, 2H), 6.39 (app dd, J=17.3, 1.4 Hz, 2H), 6.90 (dd, J=8.7, 2.7 Hz, 1H), 6.95 (d, J=2.7 Hz, 1H), 6.99 (d, J=8.7 Hz, 1H).

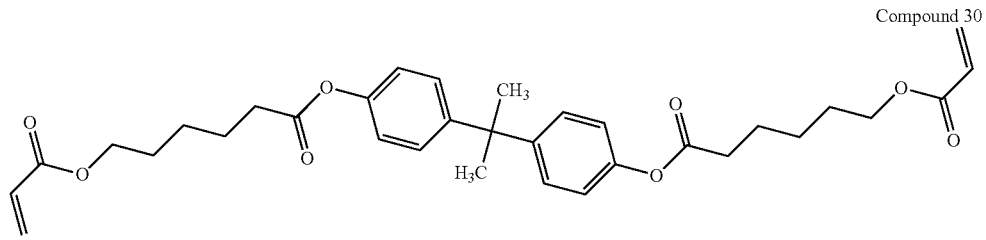 [SMILES: C=CC(=O)OCCCCCC(=O)Oc1ccc(C(C)(C)c2ccc(OC(=O)CCCCCOC(=O)C=C)cc2)cc1]

Compound 30

$^1$H NMR (CDCl$_3$, 500 MHz) δ 1.51 (m, 4H), 1.66 (s, 6H), 1.74 (m, 4H), 1.79 (m, 4H), 2.56 (t, J=7.3 Hz, 4H), 4.18 (t, J=6.5 Hz, 4H), 5.80 (dd, J=10.5, 1.3 Hz, 2H), 6.11 (dd, J=17.4, 10.5 Hz, 2H), 6.38 (dd, J=17.4, 1.3 Hz, 2H), 6.96 (d, J=8.8 Hz, 4H), 7.21 (d, J=8.8 Hz, 4H).

Example 16

This example illustrates a process provided by the invention wherein Compound 9 is prepared directly from Compound 7, without isolation of intermediate Compound 8.

Compound 7 (5.0 g) was combined with 60 mL of THF, and 8.3 mL triethylamine. The solution was cooled to 0° C. and a solution of 6.3 g 6-bromohexanoyl chloride in 40 mL THF was added dropwise over 20 minutes. The reaction was stirred at 0° C. for 1.5 and then for two hours at RT. The solution was filtered and rinsed with 20 mL THF. The reaction solution was then combined with 12.4 g potassium bicarbonate, 2.03 g tetrabutylammonium iodide, 0.42 g 2,6-di-tertbutyl-4-methylphenol, and 2.82 mL acrylic acid and heated at reflux open to air for 5.5 hours. The reaction was added to 250 mL water and the pH adjusted to 5 using concentrated HCl. The product was extracted with diethyl ether and then washed with water. The organics were dried (MgSO$_4$) and then concentrated to provide a yellow oil. 100 mL hexanes was added and the mixture was cooled to 0° C. for 20 minutes to produce a solid which was filtered and dried, providing Compound 9. The $^1$H NMR spectrum was identical to that obtained following the method of Example 1.

Example 17

This example illustrates the formation of Mixture 1, a liquid crystal composition as provided by the invention, prepared by a process as provided by the invention. The molar ratios are the nominal ratios based on the reaction stoichiometry.

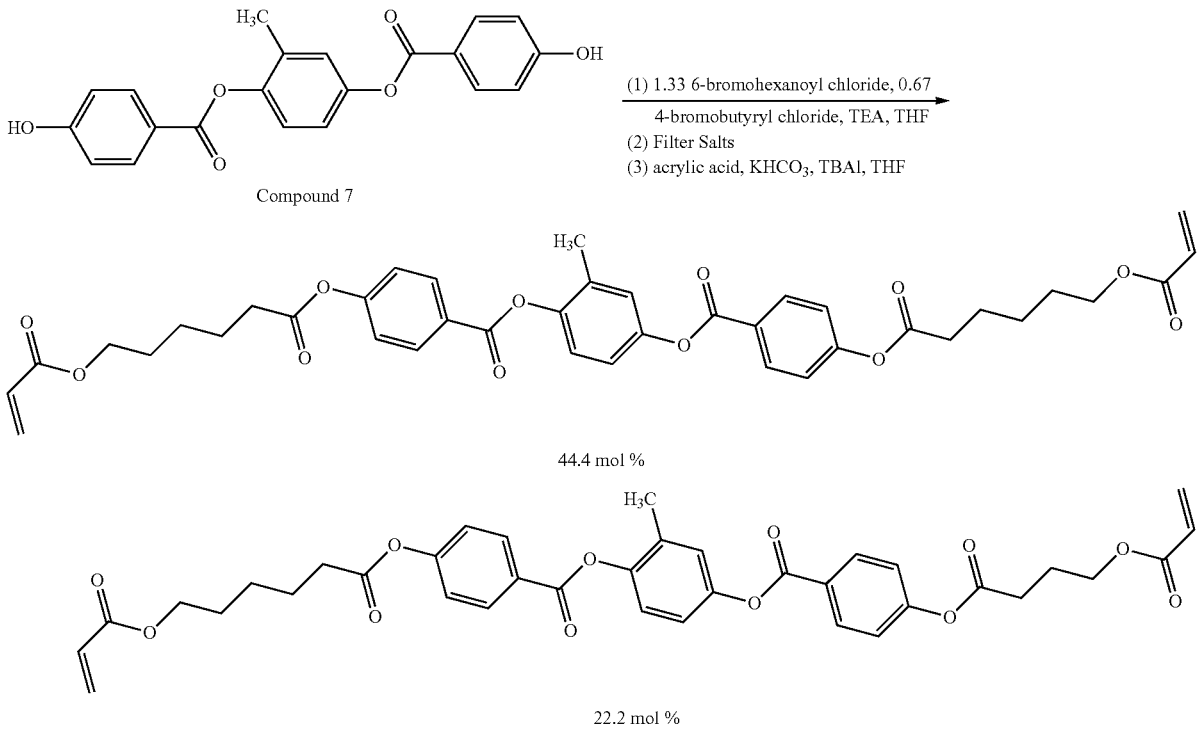

-continued

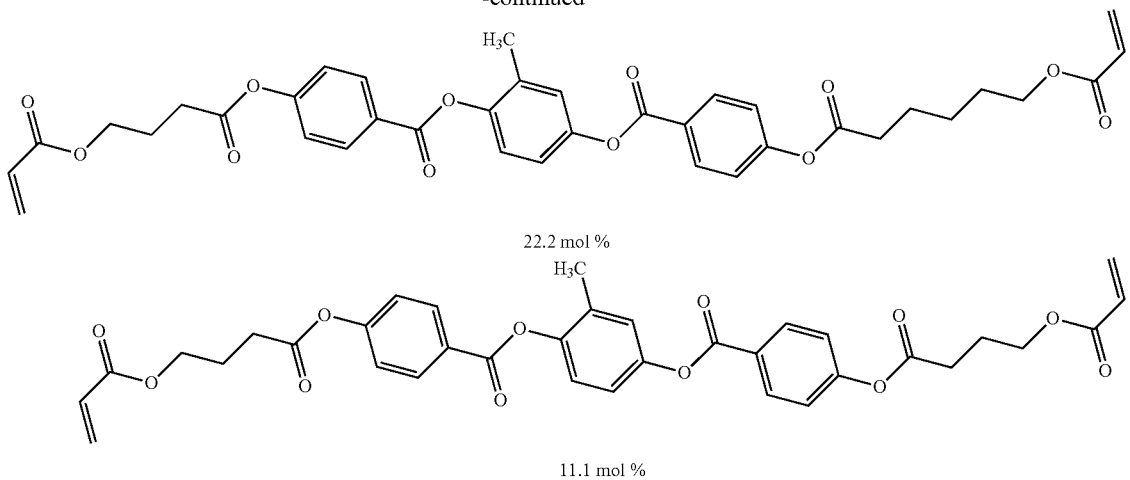

22.2 mol %

11.1 mol %

A mixture of Compound 7 (5.0 g), THF (60 mL), and 8.4 mL triethylamine was cooled to 0° C., and a mixture of 4.29 g 6-bromohexanoyl chloride and 1.87 g 4-bromobutyryl chloride in 50 mL THF was added dropwise over 20 min. The reaction was stirred for an additional 1 h at 0° C. followed by 2 h at RT. The mixture was filtered and the filtered solids were washed with 20 mL to THF. The filtrate was then combined with 12.4 g potassium bicarbonate, 2.03 g tetrabutylammonium iodide, and 0.42 g 2,6-di-tertbutyl-4-methylphenol. After stirring for 5 min at RT, acrylic acid (2.82 mL) was added. The mixture was heated to reflux, open to air, for 4 h. The mixture was stirred for an additional 14 h at RT. Water (250 mL) was added and pH adjusted to 6 using concentrated HCl. The product was extracted into diethyl ether. The organics were washed with water, dried (MgSO$_4$), filtered, and concentrated to a cloudy, yellow oil. The crude product was washed with 75 mL methanol for 30 min. The methanol was decanted and hexanes (75 mL) was added. After stirring for 30 min the hexanes was decanted and residual solvent removed to provide Mixture 1. Phase behavior: X–29 N 131 I.

Example 18

This example illustrates the formation of Mixture 2, a chiral liquid crystal composition prepared by a process as provided by the invention.

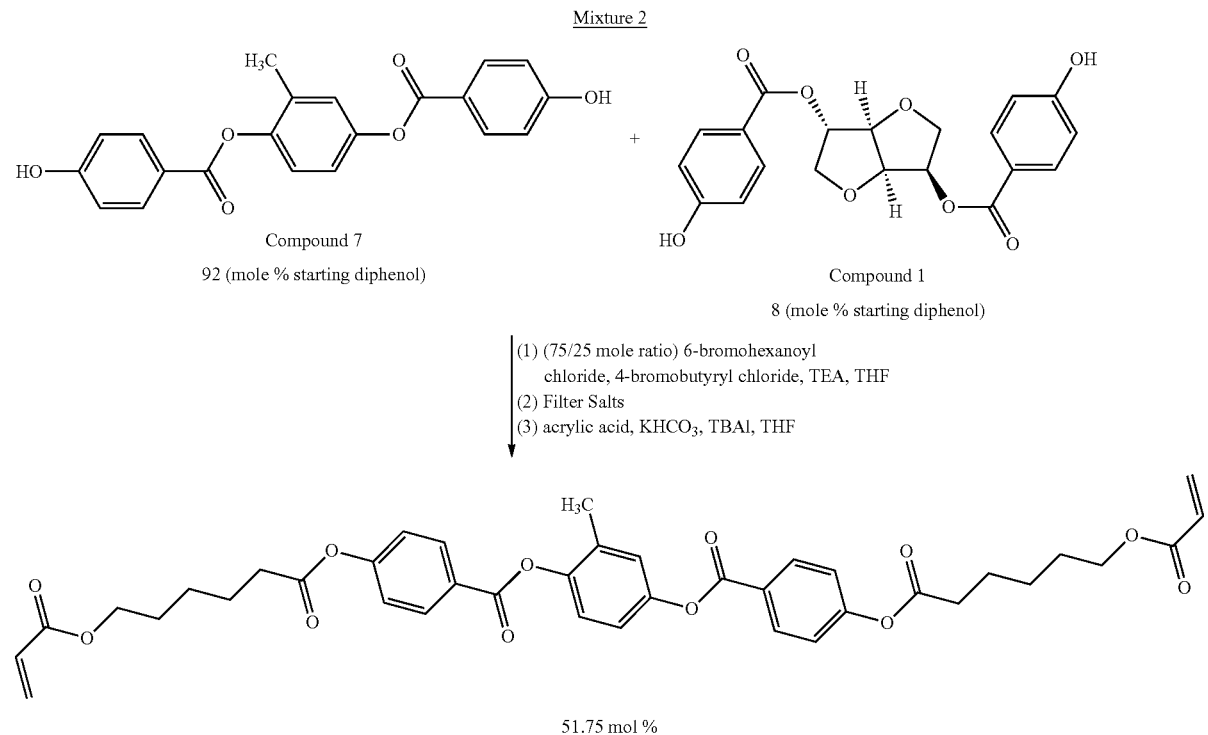

-continued
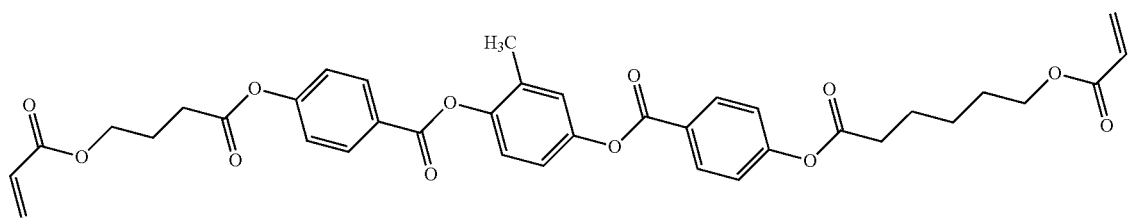
17.25 mol %
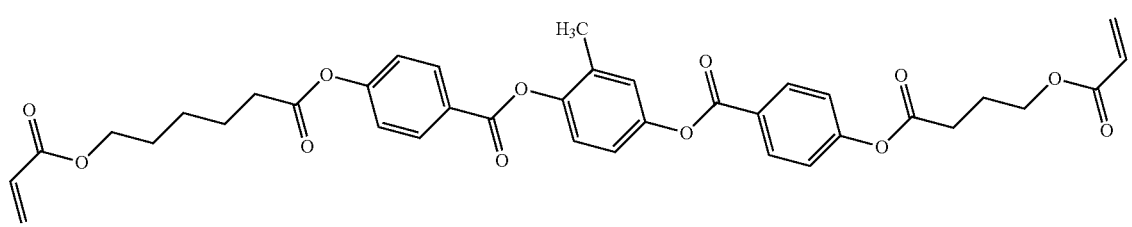
17.25 mol %
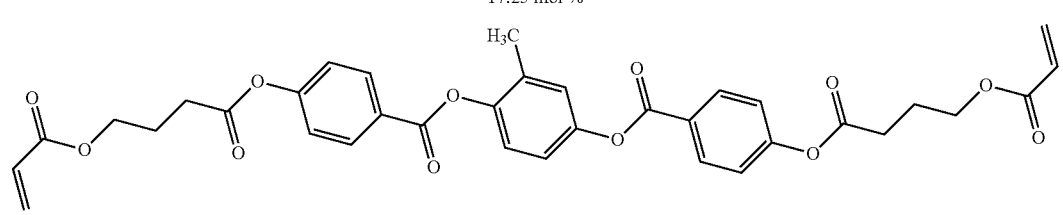
5.75 mol %
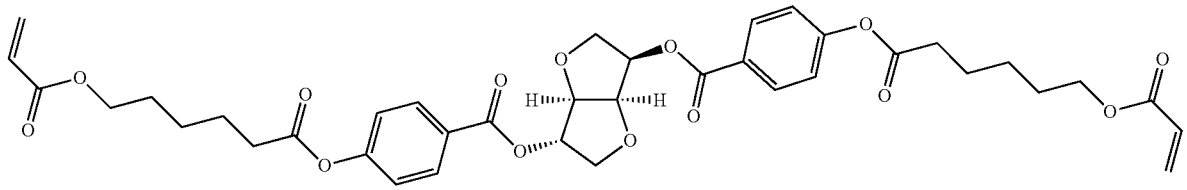
4.5 mol %
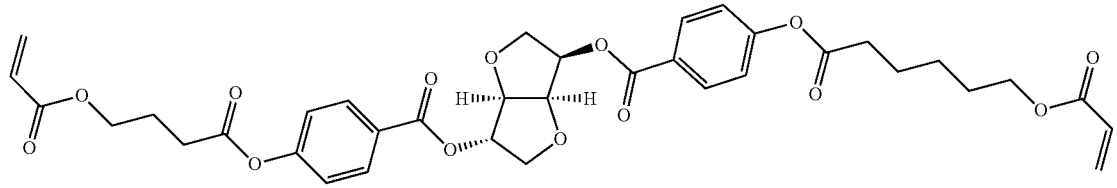
1.5 mol %
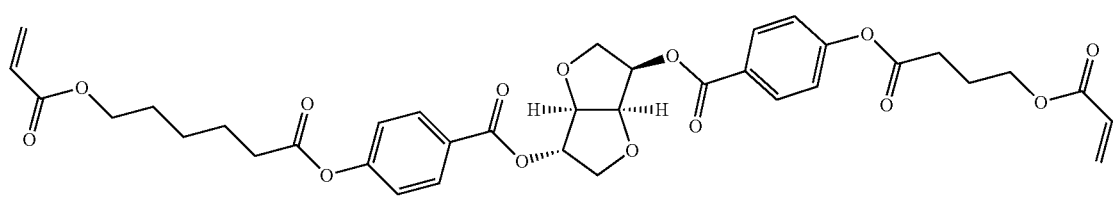
1.5 mol %
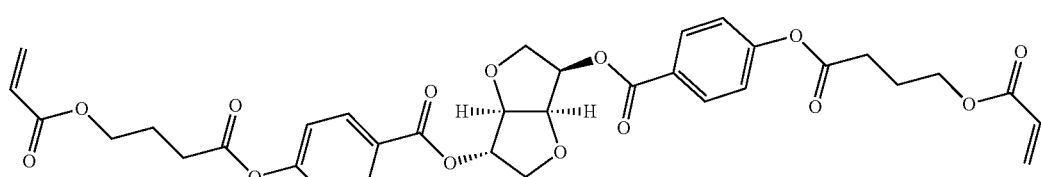
0.5 mol %

A mixture of 4.60 g Compound 7, 0.424 g Compound 1, 60 mL THF and 6.3 mL triethylamine was cooled to 0° C. A solution of 4.83 g 6-bromohexanoyl chloride and 1.40 g 4-bromobutyryl chloride in 40 mL THF was then added dropwise over 20 minutes. The reaction was stirred for an hour at 0° C. before being stirred for an additional 2 h at RT. The reaction mixture was filtered and the filtered solids were washed with 20 mL THF. The filtrate was then transferred to a fresh flask and 12.4 g potassium bicarbonate, 2.03 g tetrabutylammonium iodide, and 0.42 g 2,6-di-tertbutyl-4-methylphenol were added. After stirring for 5 minutes at room temperature 2.82 mL acrylic acid were added. The reaction mixture was heated to reflux, open to air, for 4 hours. After cooling to room temperature, the reaction mixture was stirred for an additional 14 hours at room temperature. The reaction mixture was added to 200 mL of water and then adjusted to pH 5 using concentrated HCl. The residue was extracted into diethyl ether and the extract washed with water 3×, dried, filtered and concentrated to a yellow oil. The oil was washed with isopropyl alcohol (75 mL), washed with hexanes (75 mL) and the residual solvent removed to provide Mixture 2. Phase behavior: $1^{st}$ Heating=X–31 TN*110 I; $1^{st}$ Cooling=I 109 TN*–34X; $2^{nd}$ Heating=X–31 TN*111 I. Wavelength of Reflectance=797 nm.

Example 19

This example illustrates a method to prepare an achiral liquid crystal mixture, wherein each compound of the mixture was prepared separately.

Mixture 3

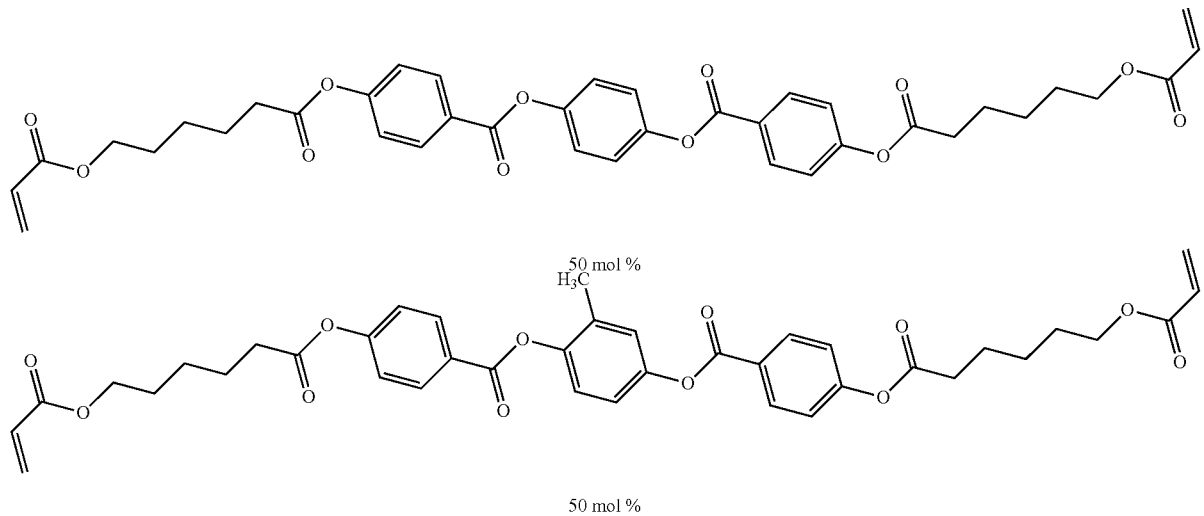

Compound 9 (0.125 g) and Compound 11 (0.123 g) were combined and dissolved in methylene chloride. The solution was filtered (0.45 micron filter), and solvent removed to provide Mixture 3.

Example 20

This example illustrates the method used to prepare a twisted nematic mixture wherein each compound was prepared separately.

Mixture 4

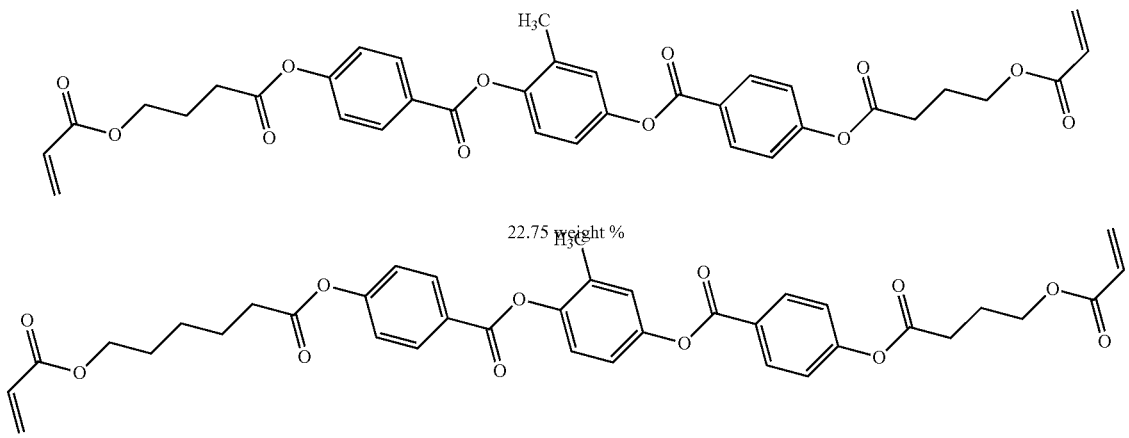

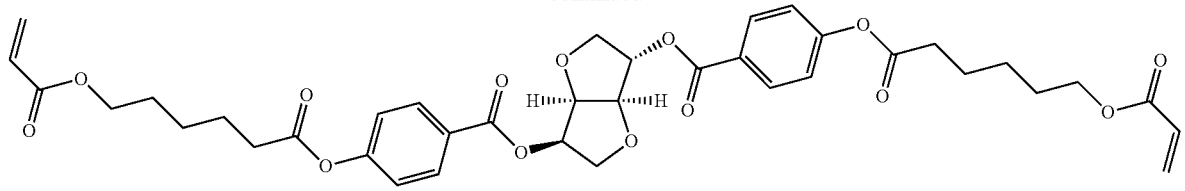

7 weight %

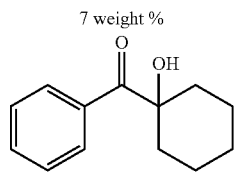

Irgacure (R) 184

2 weight %

An analogous procedure was followed as was described above for the preparation of Mixture 3. DSC: $1^{st}$ Heating=K 55 TN*105 I; $1^{st}$ Cooling=I 104 TN*–53x; $2^{nd}$ Heating=X–31 TN*105 I. Wavelength of reflectance=532 nm.

Example 21

This example illustrates the method used to prepare a twisted nematic mixture wherein each compound was prepared separately.

Mixture 5

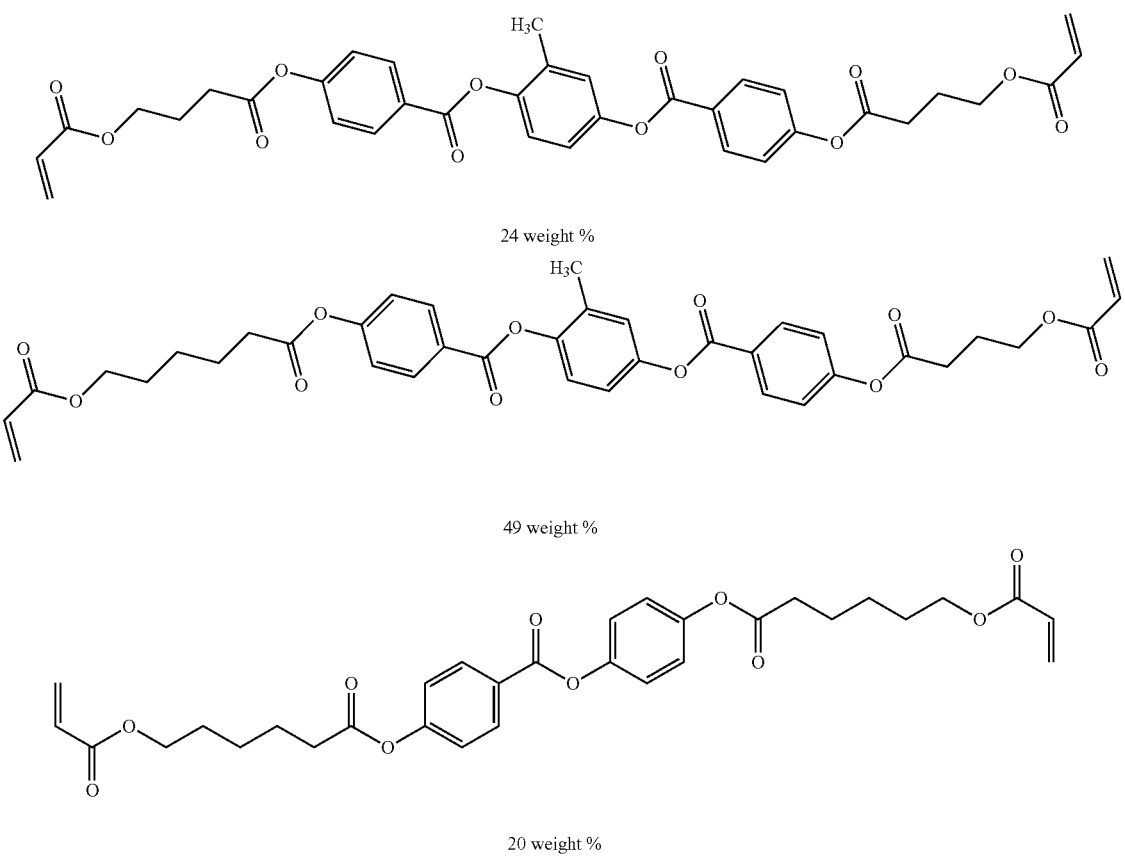

24 weight %

49 weight %

20 weight %

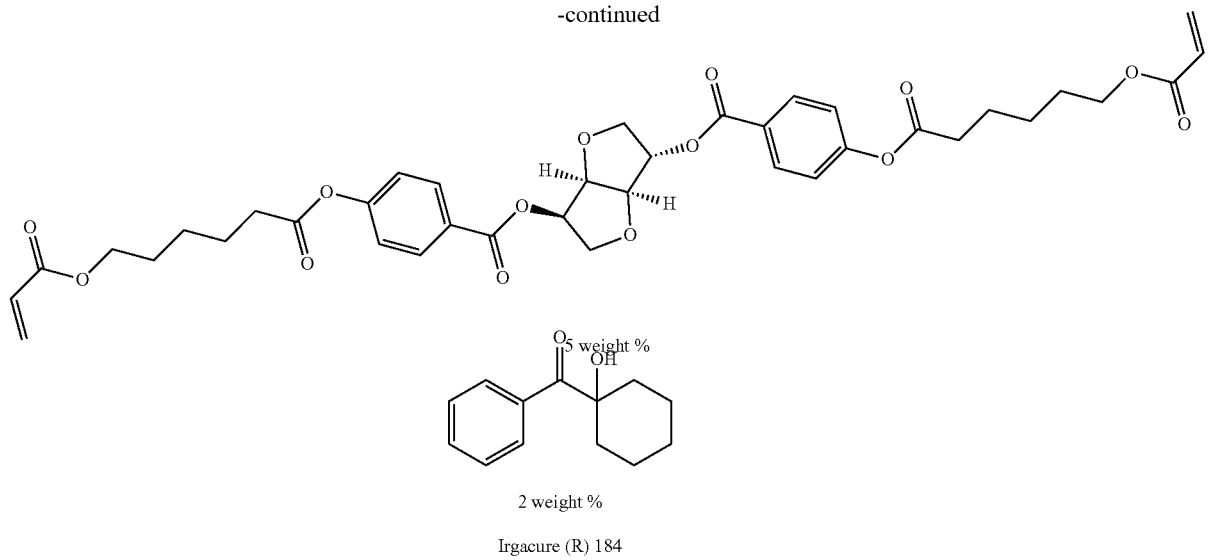

5 weight %

2 weight %

Irgacure (R) 184

An analogous procedure was followed as was described above for the preparation of Mixture 3. Phase behavior: $1^{st}$ heating=X–32 TN*94 I, $1^{st}$ cooling: 185 TN*, $2^{nd}$ heating=TN*97 I. Wavelength of Reflectance=789 nm.

Example 22

This example illustrates the formation of a polymer network of the invention derived from liquid crystal monomers of the invention.

Mixture 2 (0.5 g), Compound 24 (0.128 g), and Irgacure® 184 (0.013 g) were dissolved in 1,1,2,2-tetrachloroethane (1.19 mL) to provide Mixture 6. A polyethylene terephthalate film was hand rubbed with a Yoshikawa YA-20-R rubbing cloth. A small amount of Mixture 6 was coated by hand using a Wire Size 20 Wire Wound Lab Rod (Paul N. Gardner Company, Pompano Beach, Fla.). The wet coating was heated at 50° C. for 2 min and was exposed with a Blak-Ray Long Wave UV Mercury Lamp (UVP Inc., Upland, Calif.) for 2 min under a nitrogen atmosphere. The infrared spectrum of the film is shown in FIG. 1.

Example 23

This example illustrates the preparation of a twisted nematic composition wherein the chiral monomer is a reactive cholesteryl ester compound. Compound 31 has been previously reported by Shibaev. Preparation of Compound 32 has been previously reported by Shannon (Marcromolecules 1983, 16, 1677-1678).

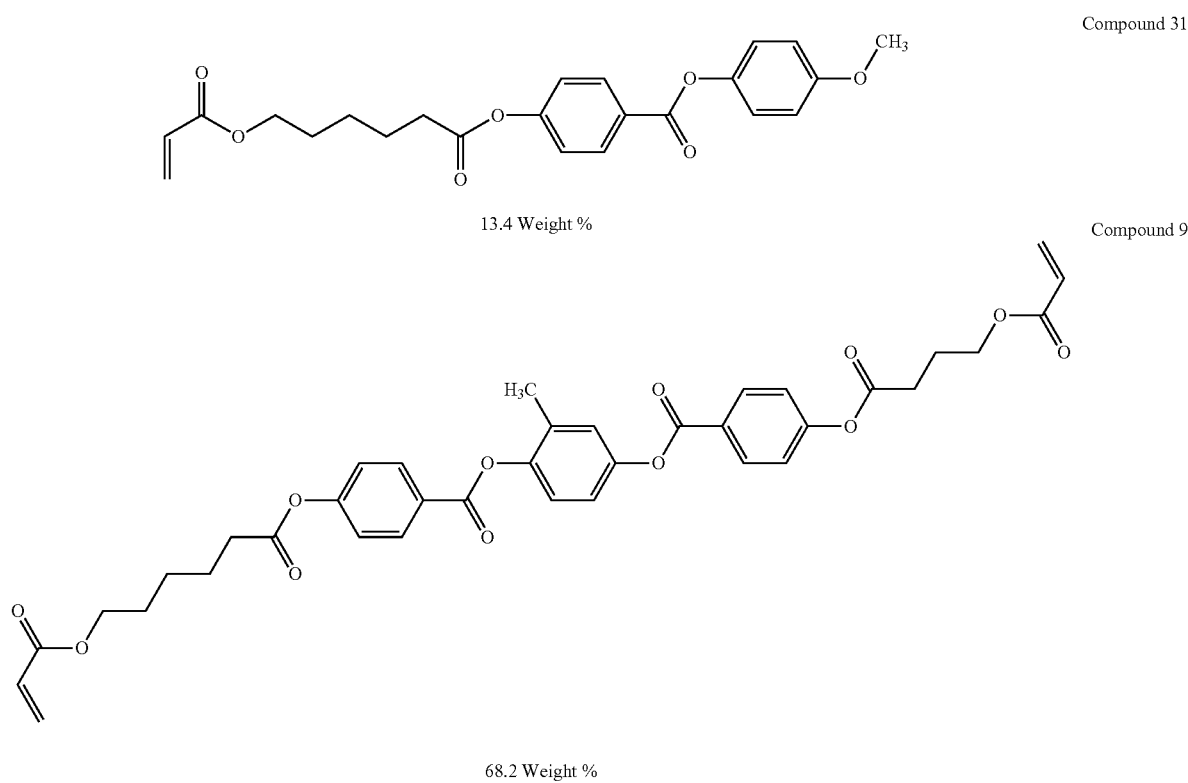

Compound 31

13.4 Weight %

Compound 9

68.2 Weight %

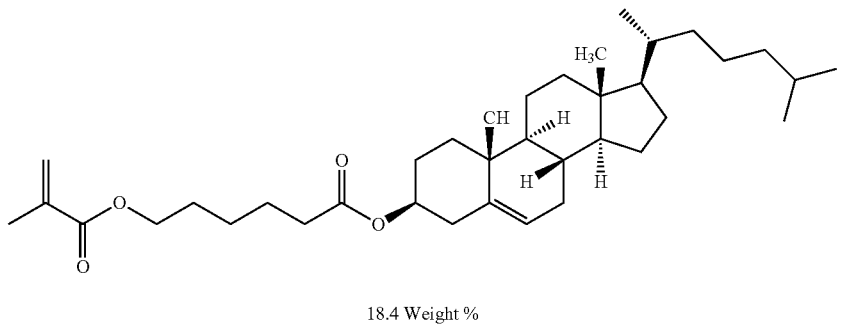

Compound 32

18.4 Weight %

An analogous procedure was followed as was described above for the preparation of Mixture 3. Phase behavior: 1st Heating=X60 TN*95 I; 1St Cooling=194 TN*; 2nd Heating=TN*96 I. Wavelength of reflectance=1015 nm.

Example 24

This example illustrates the synthesis of (meth)acrylate aryl acid halides of Formula (IX).

6-Hydroxyhexanoic acid was first prepared following the procedure reported in PCT/JP2005/004389.

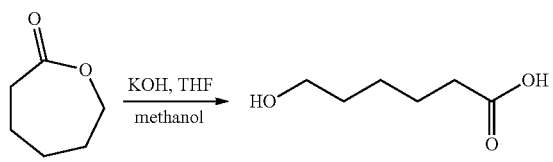 [SMILES: O=C1CCCCCO1 ; O=C(O)CCCCCO]

Caprolactone (100 g) was added to a mixture of potassium hydroxide (145 g), methanol (110 mL), and THF (390 mL). The resulting mixture was stirred at room temperature overnight. The solution was then acidified with HCl and extracted with ethyl acetate. The combined organic layers were washed with water, dried, filtered, and concentrated to obtain 6-hydroxyhexanoic acid. $^1$H NMR (CDCl$_3$, 500 MHz) δ 1.44 (m, 2H), 1.60 (m, 2H), 1.68 (m, 2H), 2.37 (t, J=7.5 Hz, 2H), 3.66 (t, J=6.5 Hz, 2H), 5.80 (br, 1 H).

6-Acryloyloxyhexanoic acid was prepared following the procedure reported in PCT/JP2005/004389.

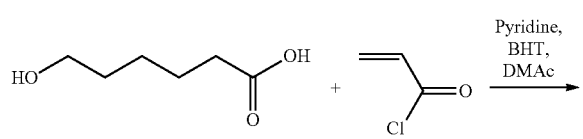

A mixture of 6-hydroxyhexanoic acid (10 g), 2,6-di-tert-butyl-4-methylphenol (0.5 g), and dimethylacetamide (57 mL) was cooled to 0° C. Acryloyl chloride (17.2 g) was then added dropwise. After stirring for 3.5 hrs, pyridine (12 mL) and water (12 mL) were slowly added. After stirring for another 2 hrs, the solution was acidified with dilute HCl and extracted with ethyl acetate. The combined organic layer was washed with water, dried, filtered, and concentrated to afford 6-acryloyloxyhexanoic acid. $^1$H NMR (CDCl$_3$, 500 MHz) δ 1.46 (m, 2H), 1.70 (m, 4H), 2.37 (t, J=7.3 Hz, 2H), 4.17 (t, J=6.4 Hz, 2H), 5.82 (d, J=10.4 Hz, 1H), 6.12 (dd, J=17.3, 10.5 Hz, 1H), 6.39 (d, J=17.3 Hz, 1H), 11.59 (br, 1 H).

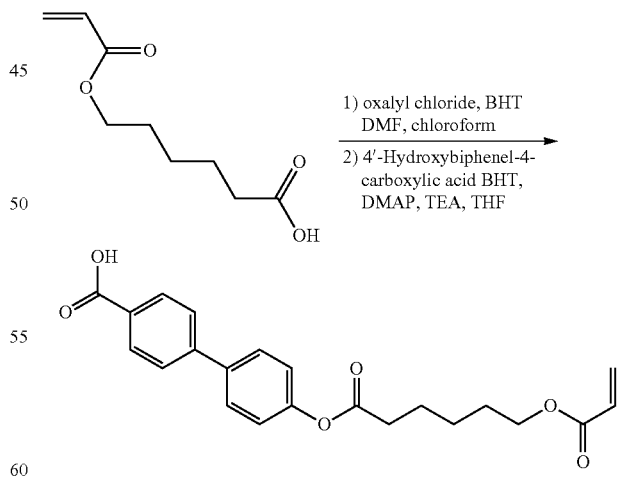

Compound 33

A mixture of 6-acryloyloxyhexanoic acid (5.0 g), 2,6-di-tert-butyl-4-methylphenol (0.3 g), chloroform (30 mL), and DMF (10 drops) was cooled to 0° C. Oxalyl chloride (5.12 g) and chloroform (20 mL) were then added dropwise. After stirring for 3 hrs, the solvent was removed and the resulting acid chloride was re-dissolved in a mixture of chloroform (20 mL) and tetrahydrofuran (20 mL). The acid chloride solution was then transferred to a mixture of 4'-hydroxy-4-biphenyl-carboxylic acid (5.76 g), triethylamine (5.2 mL), 4-dimethylaminopyridine (0.13 g), 2,6-di-tert-butyl-4-methylphenol (0.3 g), and tetrahydrofuran (55 mL) which had been cooled to 0° C. After stirring for 12 hrs, the reaction mixture was added to water, acidified with dilute HCl, extracted with chloroform, dried, filtered, and concentrated. The crude mixture was purified by washing with acetonitrile and isopropanol to obtain Compound 33. $^1$H NMR (DMSO-d$_6$, 500 MHz) δ 1.45 (m, 2H), 1.69 (m, 4H), 2.63 (t, J=7.4 Hz, 2H), 4.14 (t, J=6.6 Hz, 2H), 5.94 (app d, J=10.3 Hz, 1H), 6.18 (app dd, J=17.3, 10.4 Hz, 1H), 6.33 (app d, J=17.3 Hz, 1H), 7.24 (m, 2H), 7.79 (m, 4H), 8.02 (m, 2H), 12.95 (br, 1 H).

A mixture of Compound 33 (3.0 g), 2,6-di-tert-butyl-4-methylphenol (0.14 g), tetrahydrofuran (20 mL), and DMF (6 drops) was cooled to 0° C. Oxalyl chloride (1.49 g) and tetrahydrofuran (20 mL) were then added dropwise. After stirring for 7 hrs, the solvent was removed to provide the corresponding acid chloride.

Comparative Example 1

Comparative Examples 1-3 demonstrate that known processes for providing meth(acrylate) functionality in molecules by halide displacement are not sufficient when bis (meth)acrylates comprising aryl alkanoate esters are to be provided.

Acrylate addition was performed using a literature procedure.

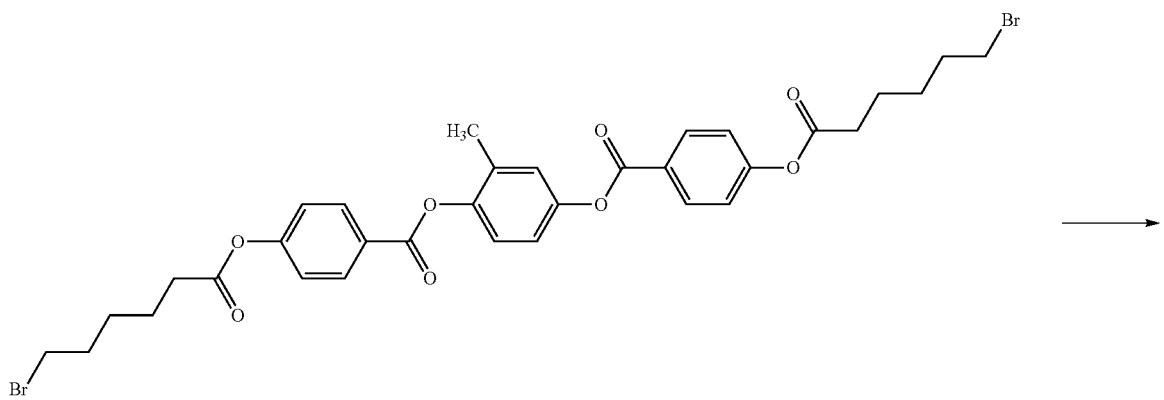

Compound 8

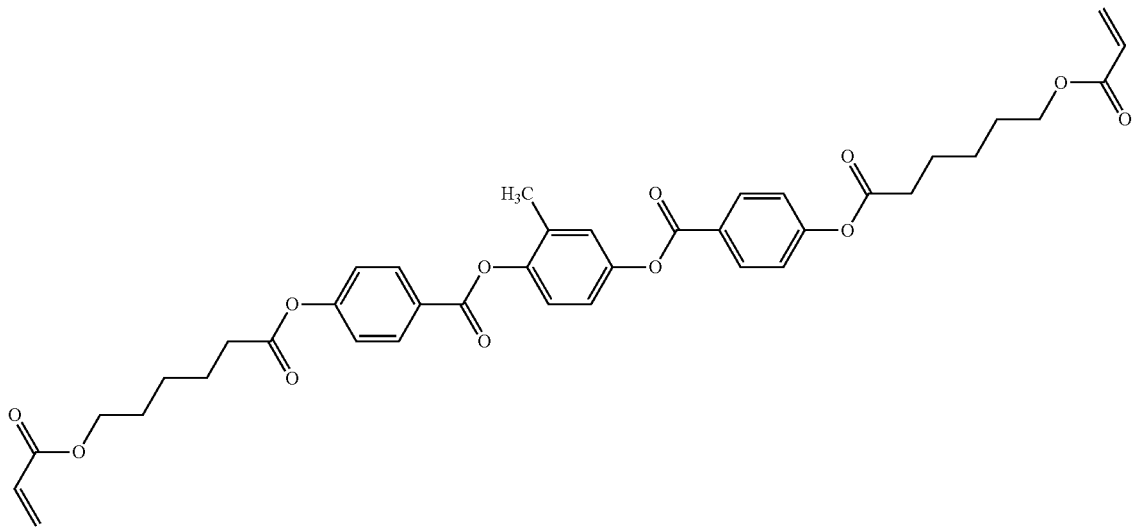

Compound 9

The conversion of Compound 8 to Compound 9 was attempted following the procedure reported by Lander and Hegedus (*J. Am. Chem. Soc.* 1994, 116, 8126-8132).

To a 25 mL round-bottom flask was added 0.3 g (0.418 mmol) of Compound 8, 0.233 mL (1.67 mmol) triethylamine, and 5 mL dimethylformamide Acrylic acid (0.115 mL, 1.67 mmol) was then added. The reaction was stirred for 19 hours at 25° C. The crude reaction mixture was diluted with ethyl acetate and washed three times with water. The organics were dried (MgSO$_4$) and then concentrated by rotary evaporation to provide 0.23 g of a colorless oil. NMR analysis showed that only 39% of the alkyl bromides were converted to acryloxy groups. The aromatic ester framework remained intact.

Comparative Example 2

Acrylate addition was performed using a literature procedure.

(0.836 mmol) bis(4-(6-bromohexanoyl)-benzoic acid) ester of methyl hydroquinone, 0.002 g hydroquinone, and 10 mL DMF were added. The reaction was heated to 100° C. for 14 hours. The reaction mixture was diluted with methylene chloride and washed with 5% sodium hydroxide solution, followed by water. The organics were dried (MgSO$_4$) and then concentrated by rotary evaporation to provide a tan oil. NMR analysis indicated complete conversion of bromides to acry-

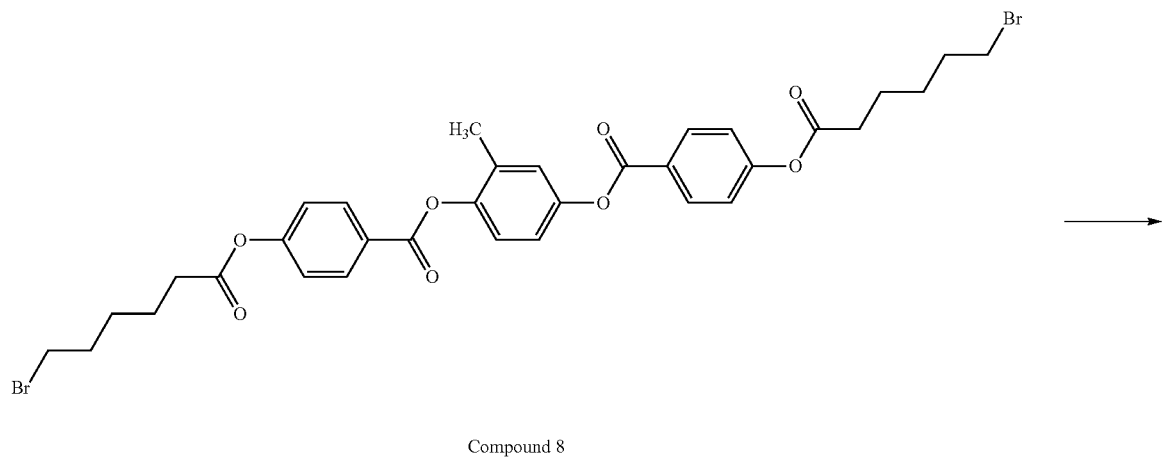

Compound 8

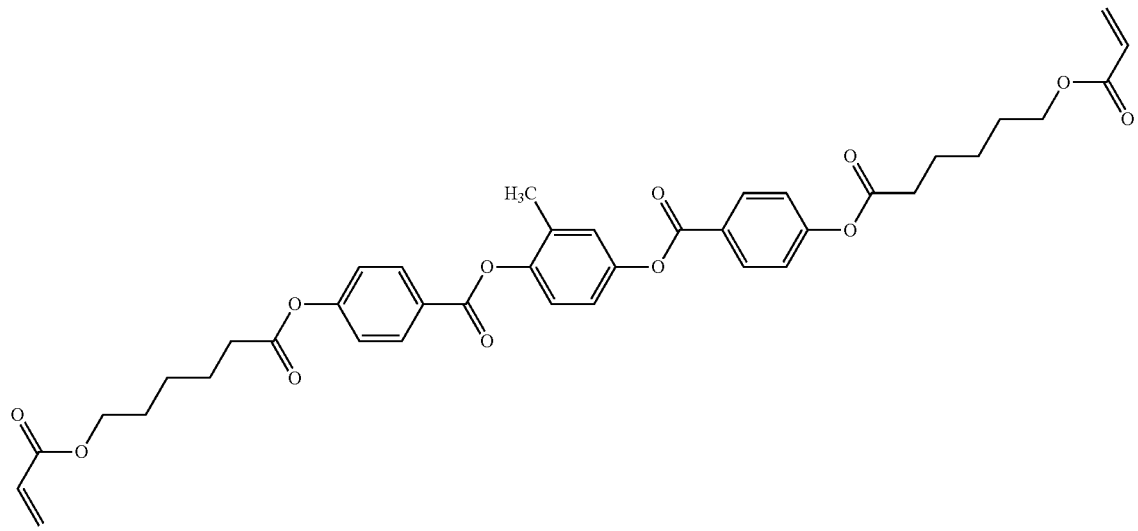

Compound 9

The conversion of Compound 8 to Compound 9 was attempted following the procedure reported by Craig and Imrie (*Macromolecules*, 1995, 28, 3617-3624).

To a Schlenk tube was added 0.238 g (2.38 mmol) potassium bicarbonate followed by 0.17 mL acrylic acid. The mixture was stirred together for 5 mins at 25° C. before 0.6 g loyloxy groups, however there was extensive cleavage of the ester linkages resulting in a product yield (NMR) of <30%.

Comparative Example 3

Acrylate addition was performed using patent procedure.

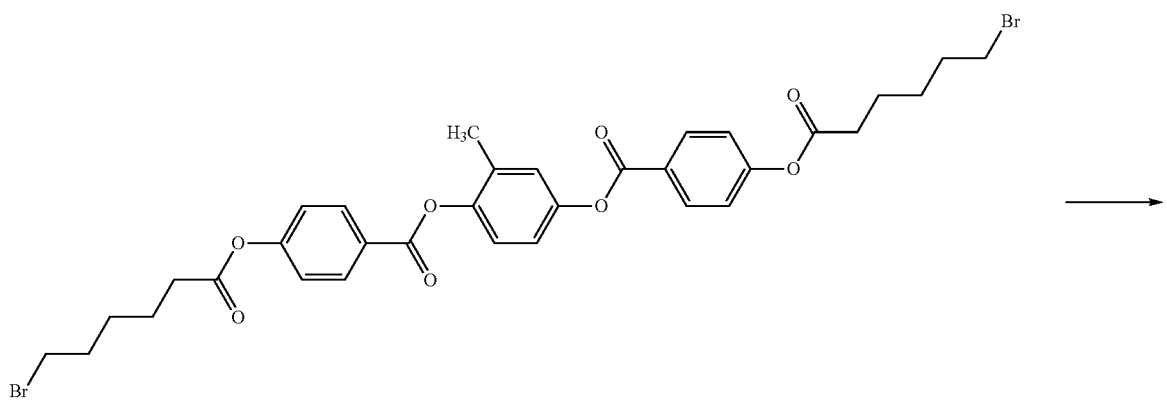

Compound 8

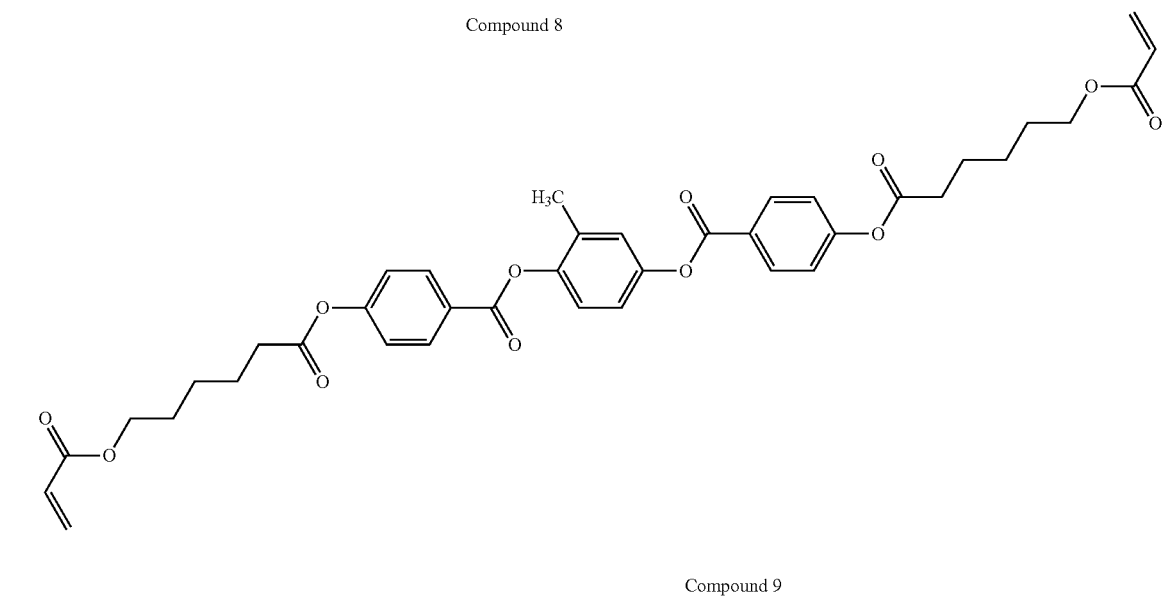

Compound 9

The conversion of Compound 8 to Compound 9 was attempted following the procedure reported in U.S. Pat. No. 4,614,619. A mixture of Compound 8 (0.6 g, 0.836 mmol), potassium acrylate (0.553 g, 5.016 mmol), tetrabutyl ammonium bromide (0.108 g, 0.3344 mmol), 2,6-di-tert-buty-4-methyl phenol (0.013 g, 0.057 mmol), water (0.6 mL) and chloroform (0.3 mL) was heated at an oil bath temp of 112° C. for 40 h. To the cooled reaction mixture was added 40 mL diethyl ether and 10 mL methylene chloride and the organic phase washed with water 3×, dried over MgSO$_4$, filtered, and concentrated, providing a white solid. NMR analysis indicated complete conversion of the bromides to acryloyloxy groups, however there was complete hydrolysis of the ester linkages resulting in a product yield (NMR) of <5%.

Comparative Example 4

This example demonstrates that the methodology used to prepare the conventional ether linked materials (Formula C—I) is not applicable to the preparation of the materials provided by the present invention. The first step in the preparation of the materials of Formula C—I, as disclosed in U.S. Pat. No. 5,833,880, Example 1, was followed, but replacing 4-chlorobutyl acetate with 6-bromohexanoyl chloride.

As such, 3 g ethyl 4-hydroxybenzoate, 0.036 g potassium iodide, and 2.99 g potassium carbonate were dissolved in 24 mL DMF, and 4.62 g 6-bromohexanoyl chloride was added dropwise. The reaction was heated at 90° C. for 10 hours, before being added to ice water. The product separated as an oil, in contrast to the teachings of U.S. Pat. No. 5,833,880, wherein a solid was isolated. The oily product was separated from the water using an ether extraction. The ether was dried and removed to provide 5.36 g of a yellow oil. NMR analysis indicated the presence of a complex mixture of acylation and alkylation products. The yellow oil was combined with 4.81 g potassium hydroxide and 36 mL ethanol and heated to reflux for 3 hours. The reaction was added to ice water, acidified with concentrated HCl, filtered, washed with fresh water, and dried, to obtain 1.3 g of a white solid. NMR analysis indicated that the product was Compound 34, rather than the desired, Compound 35.

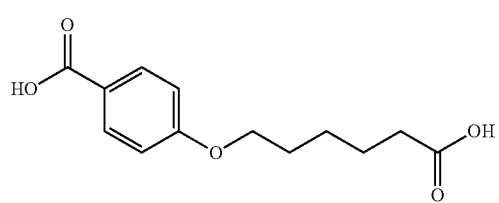

Compound 34

69

-continued

Compound 35

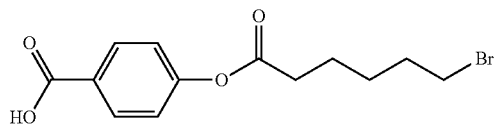

¹H-NMR of Compound 34: (DMSO-d₆, 400 MHz) δ 1.43 (m, 2H), 1.57 (m, 2H), 1.73 (m, 2H), 2.23 (t, J=7.3 Hz, 2H), 4.03 (t, J=6.5 Hz, 2H), 6.99 (d, 8.9 Hz, 2H), 7.88 (d, 8.9 Hz, 2H).

70

Comparative Example 5

Liquid crystal mixture Merck RMS03-009 (Comparative Mixture 1-C) was purchased from Merck KGaA, Liquid Crystals, Darmstadt, Germany. A coating was prepared using an analogous procedure as described above in Example 22. The infrared spectrum of the ether linked (—O—) polymer network is shown in FIG. 1.

Comparative Mixture 1-C

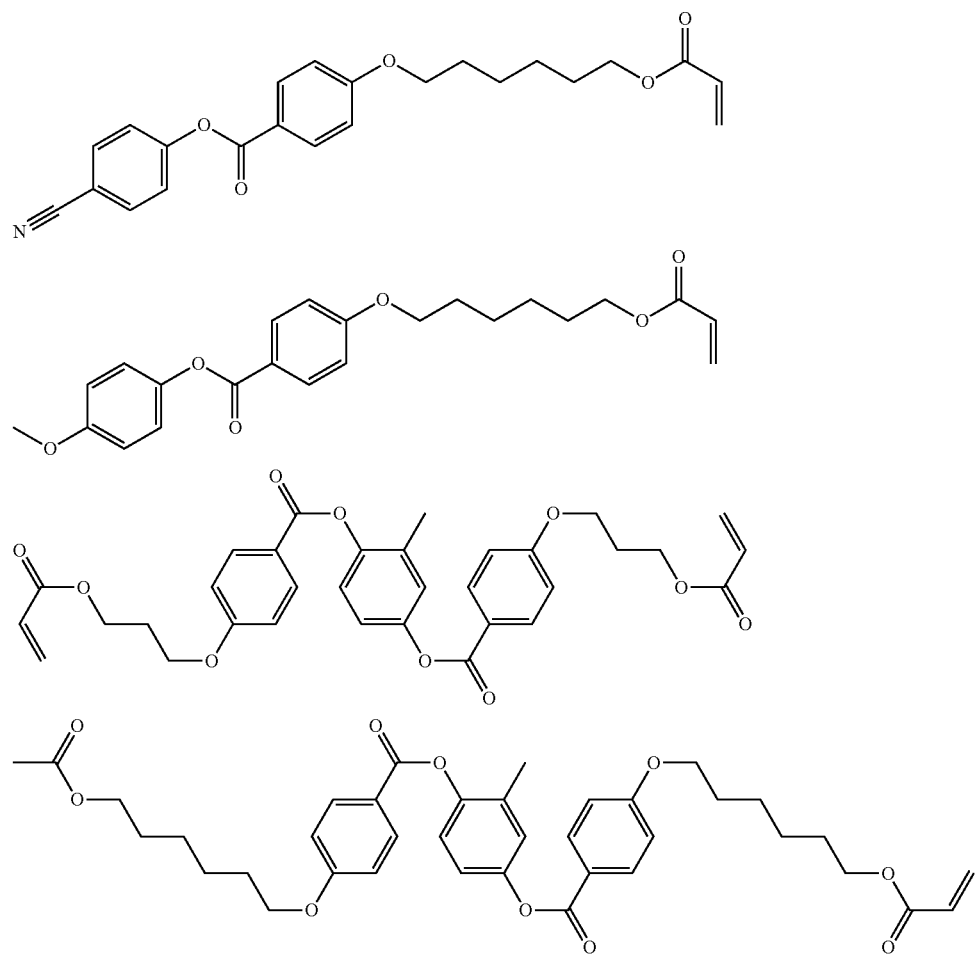

TABLE 1

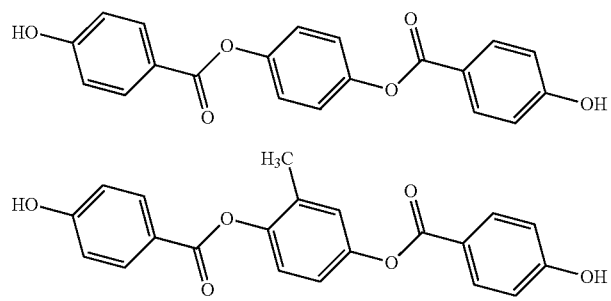

TABLE 1-continued
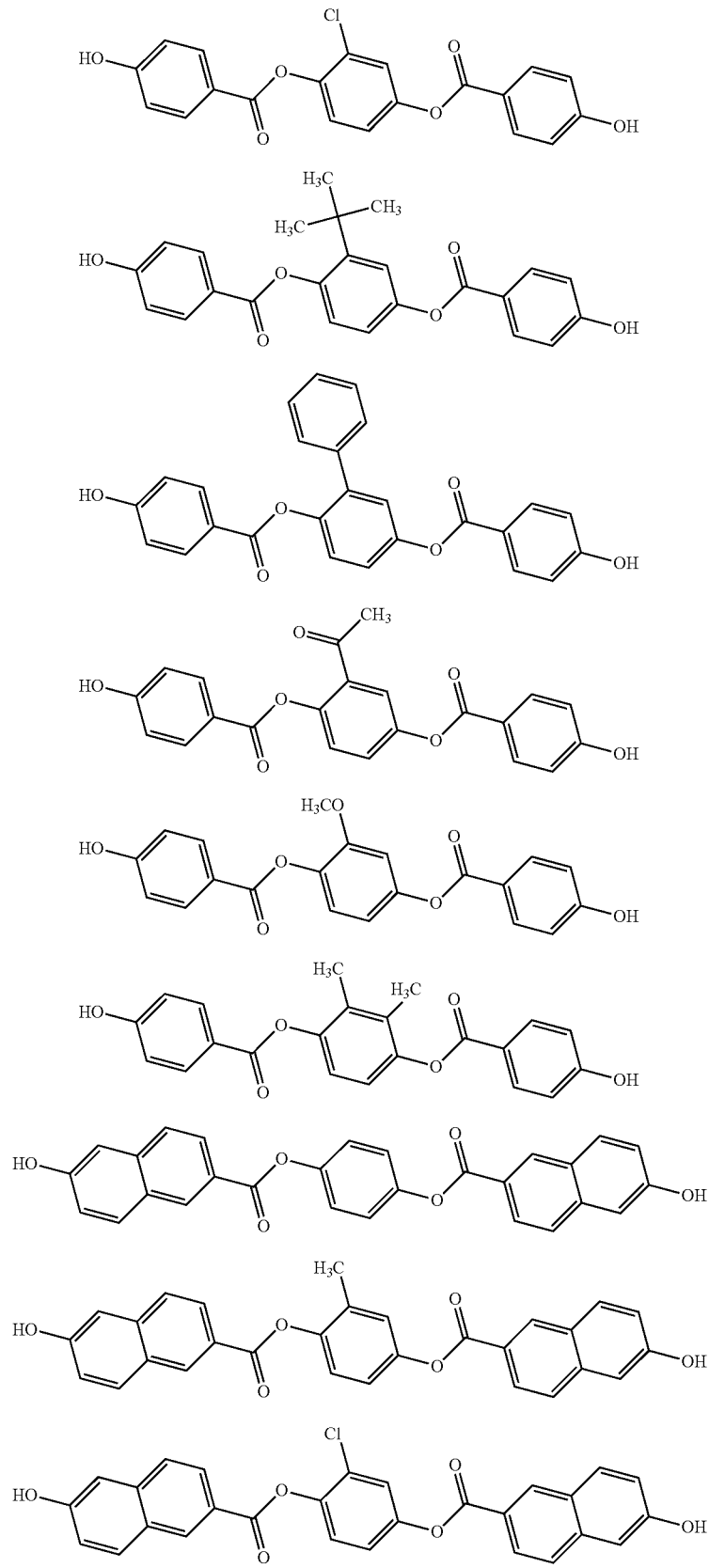

TABLE 1-continued
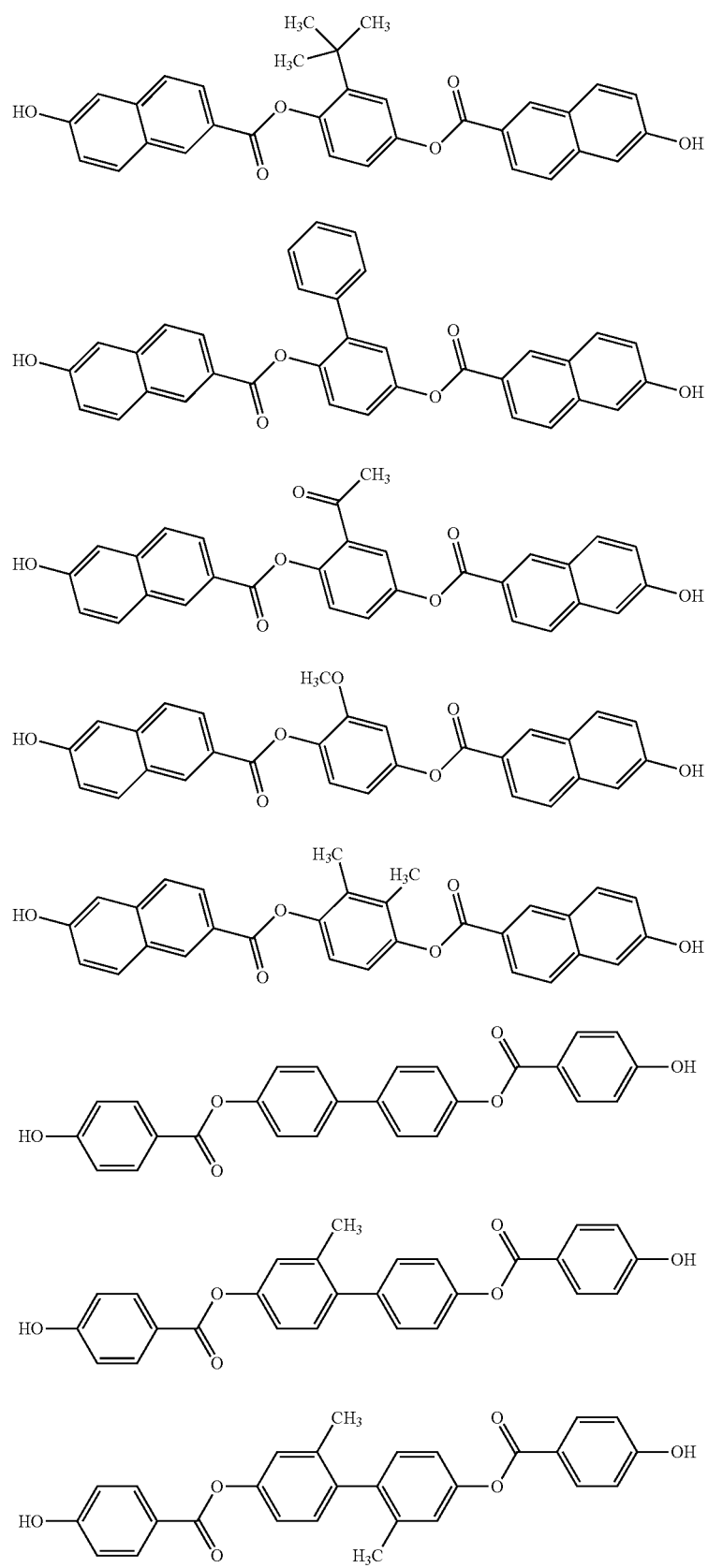

TABLE 1-continued
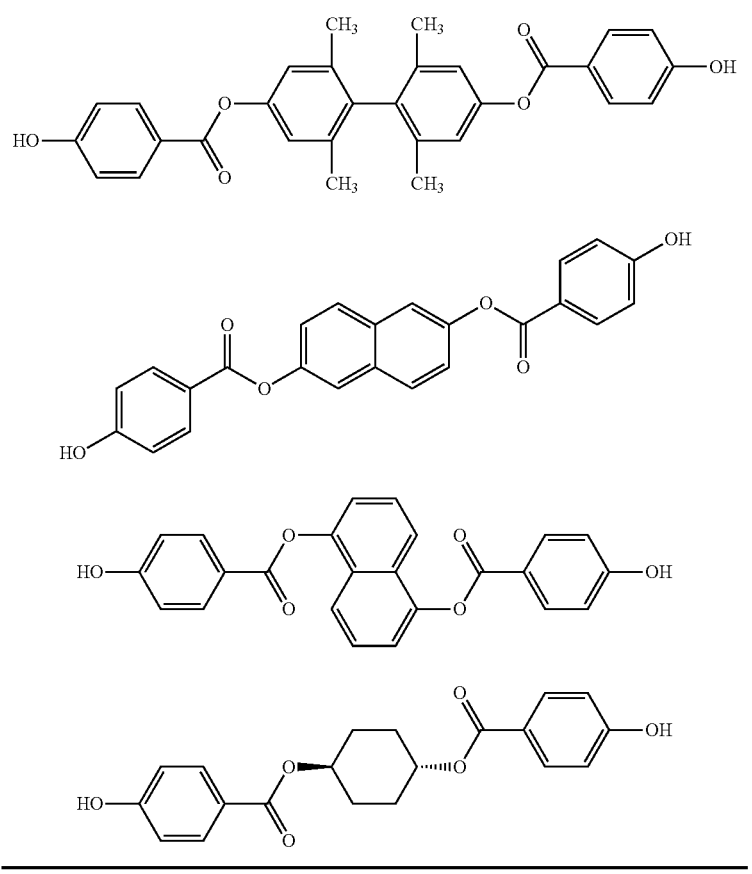
TABLE 2
| Example Number | Compound and First Heating Phase Behavior | Nematic Window (deg C) |
|---|---|---|
| 12 | Compound 24<br>X 10 N 30 I | 20 |
| 13 | Compound 27<br>X -24 N 68 I | 92 |

TABLE 2-continued
| Example Number | Compound and First Heating Phase Behavior | Nematic Window (deg C) |
|---|---|---|
| 23 | 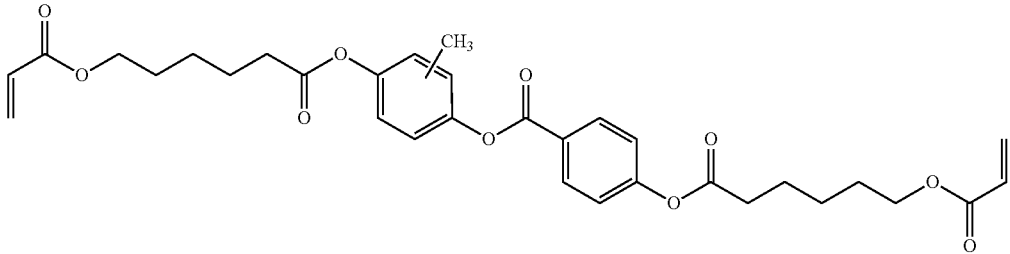
Compound(s) 31
RT Liquid | N/A |
TABLE 3
| Example Number | Compound and First Heating Phase Behavior | Nematic Window (deg C) |
|---|---|---|
| 2 | 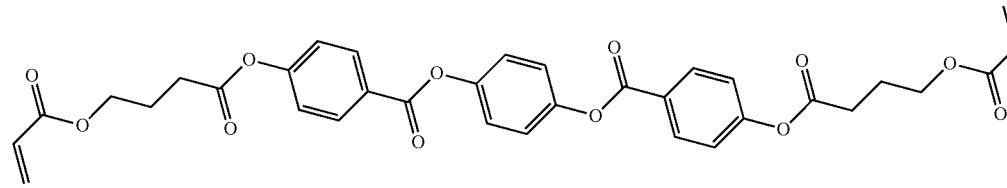
Compound 10
K1 118 K2 126 N 192 I | 66 |
| 3 | 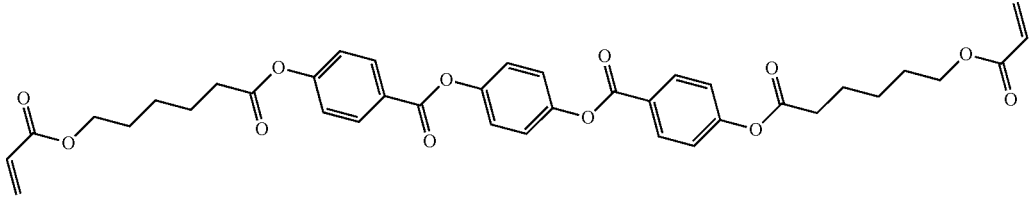 [SMILES: C=CC(=O)OCCCCCC(=O)Oc1ccc(C(=O)Oc2ccc(OC(=O)c3ccc(OC(=O)CCCCCOC(=O)C=C)cc3)cc2)cc1]
Compound 11
K1 58 K2 100 S 115 N 175 I | 60 |
| 4 | 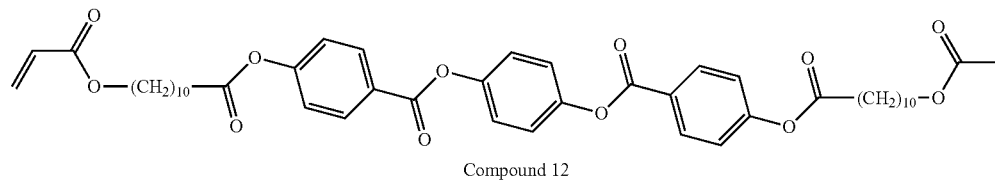
Compound 12
K 118 S 134 N 156 I | 22 |
| 5 | 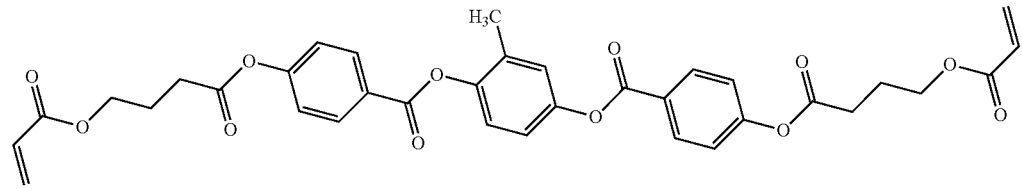
Compound 13
K 62 X 96 N 145 I | 49 |

TABLE 3-continued

| Example Number | Compound and First Heating Phase Behavior | Nematic Window (deg C) |
|---|---|---|
| 6 | Compound 14<br>K 50 N 152 I | 102 |
| 1 | Compound 9<br>K 46 N 130 I | 84 |
| 7 | Compound 15<br>K 43 N 118 I | 75 |
| 8 | Compound 16<br>K 51 S 69 N 117 I | 48 |
| 9 | Compound 17<br>K 43 N 143 I | 100 |
| 11 | Compound 21<br>K 55 N 165 P | 110 |

TABLE 4
| Example Number | Mixture and First Heating Phase Behavior | Nematic Window (deg C) |
|---|---|---|
| 9 | 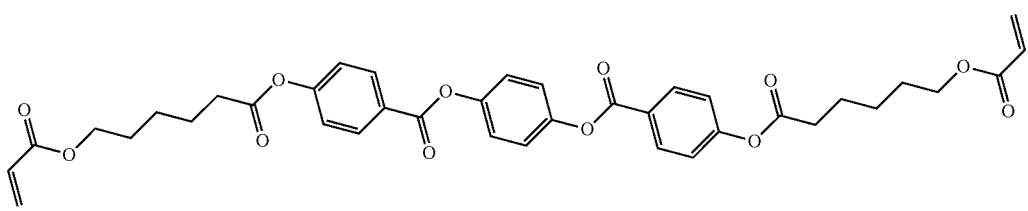 [SMILES: C=CC(=O)OCCCCCC(=O)Oc1ccc(C(=O)Oc2ccc(OC(=O)c3ccc(OC(=O)CCCCCOC(=O)C=C)cc3)cc2)cc1]<br>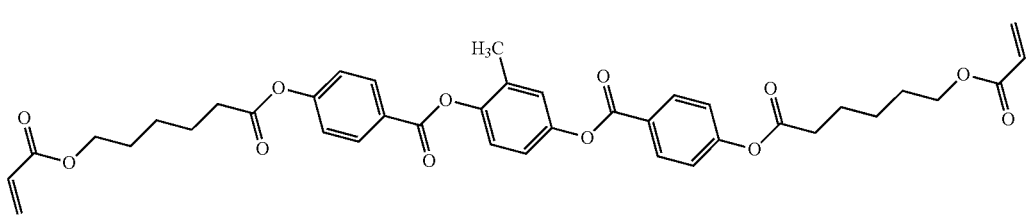<br>Mixture 3 (50/50 mole ratio)<br>K 58 N 143 I | 85 |
| 24 | 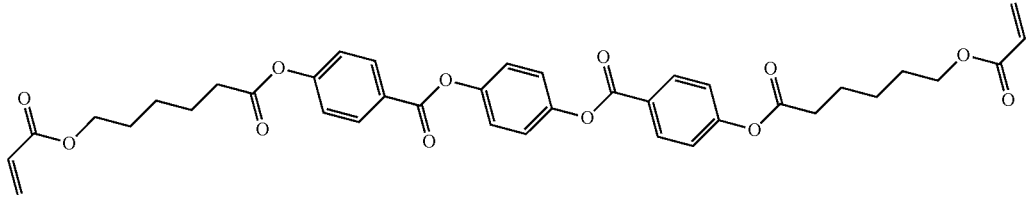 [SMILES: C=CC(=O)OCCCCCC(=O)Oc1ccc(C(=O)Oc2ccc(OC(=O)c3ccc(OC(=O)CCCCCOC(=O)C=C)cc3)cc2)cc1]<br>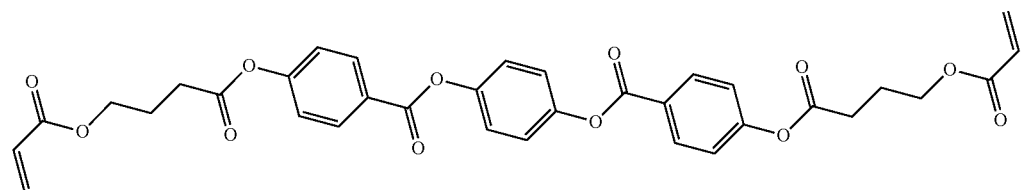<br>Mixture 7 (50/50 mole ratio)<br>K 100 K + N 110 N 183 I | 73 |
| 25 | 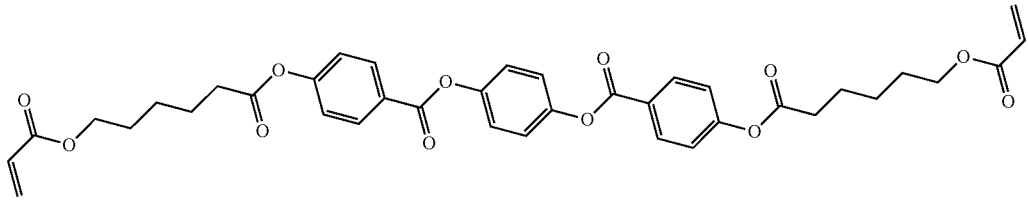<br>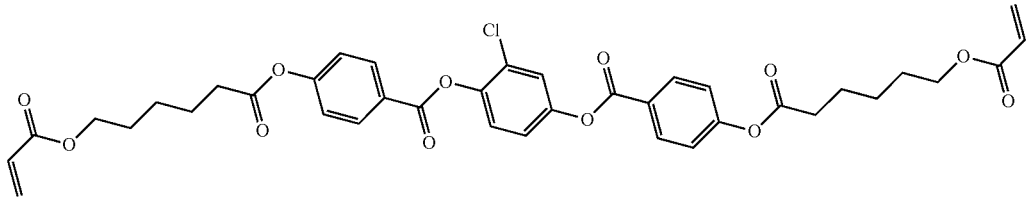<br>Mixture 8 (50/50 mole ratio)<br>K 60 N 160 I | 100 |

TABLE 4-continued
| Example Number | Mixture and First Heating Phase Behavior | Nematic Window (deg C) |
|---|---|---|
| 17 | 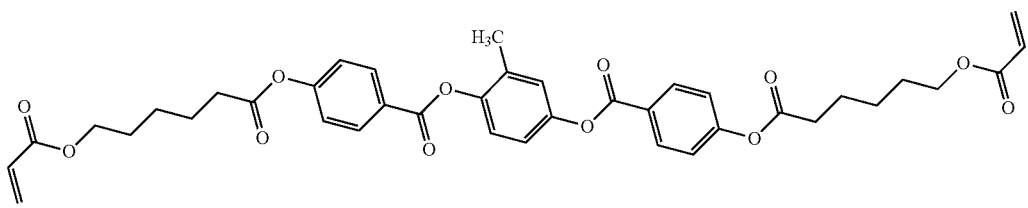 44.44 mol % 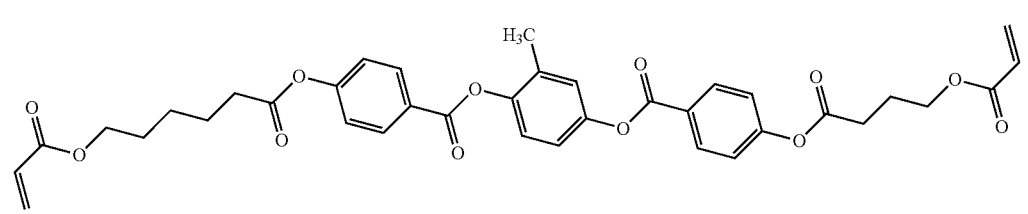 22.22 mol % 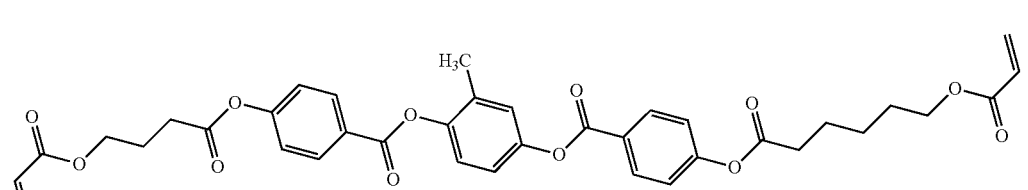 22.22 mol % 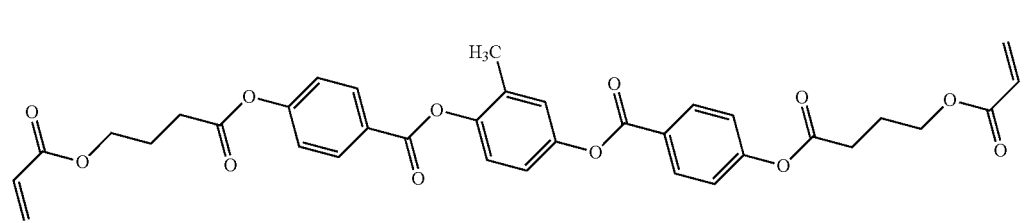 11.11 mol % Mixture 1 X -29 N 131 I | 160 |
| 26 | 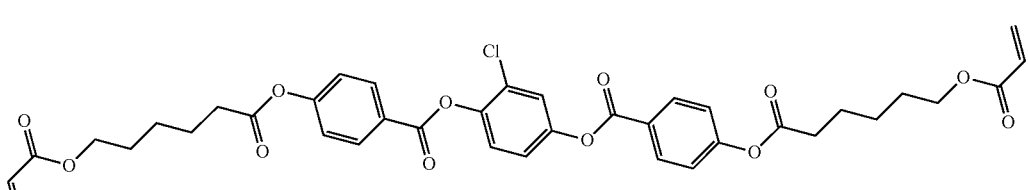 25 mol % 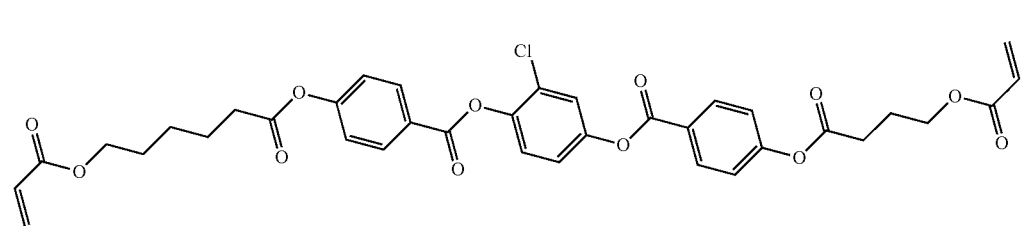 25 mol % | 173 |

TABLE 4-continued
| Example Number | Mixture and First Heating Phase Behavior | Nematic Window (deg C) |
|---|---|---|
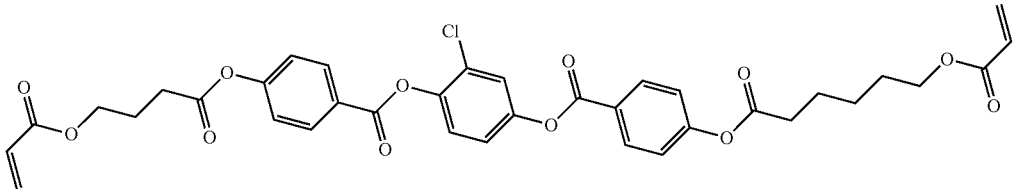
25 mol %
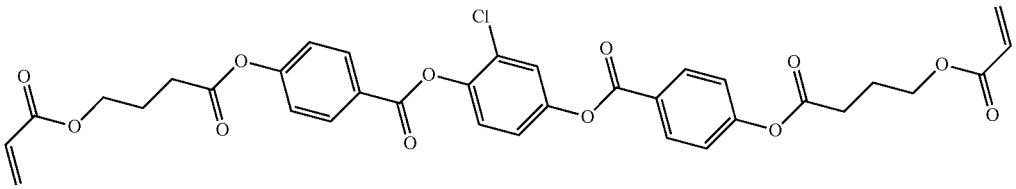
25 mol %
Mixture 9
X -24 N 149 I
TABLE 5
Comparative Compounds and Mixtures
| Compound and 1st Heating Phase Behavior | Nematic Window (deg C) |
|---|---|
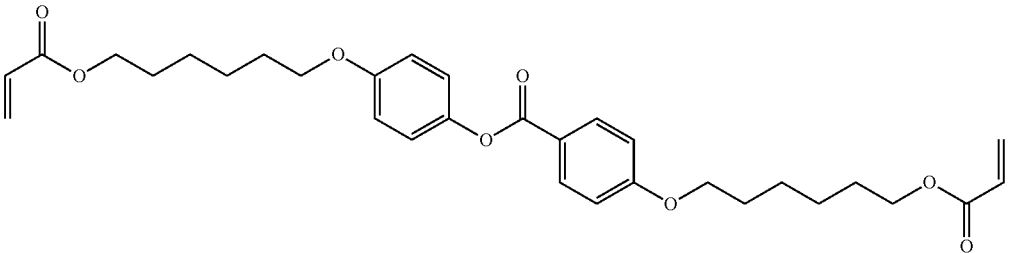
Comparative Compound 1-C
K 33 S 47 N 50 I [1]
3
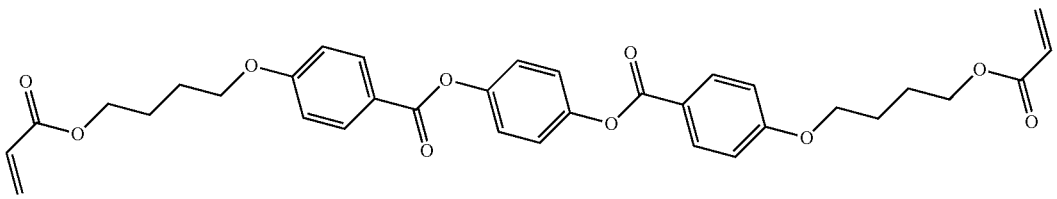
Comparative Compound 2-C
K 107 N 165 I [2]
58

TABLE 5-continued
Comparative Compounds and Mixtures
| Compound and 1st Heating Phase Behavior | Nematic Window (deg C) |
|---|---|
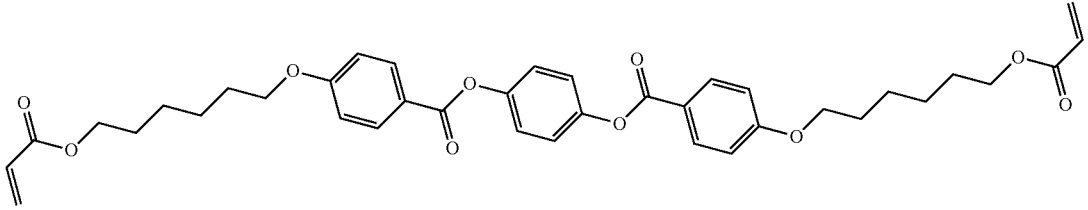 [SMILES: C=CC(=O)OCCCCCCOc1ccc(C(=O)Oc2ccc(OC(=O)c3ccc(OCCCCCCOC(=O)C=C)cc3)cc2)cc1]
Comparative Compound 3-C
K 108 N 155 I [2]
47
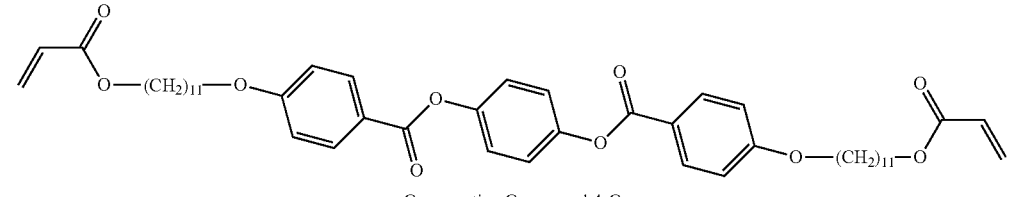
Comparative Compound 4-C
K 81 S 114 N 134 I [2]
20
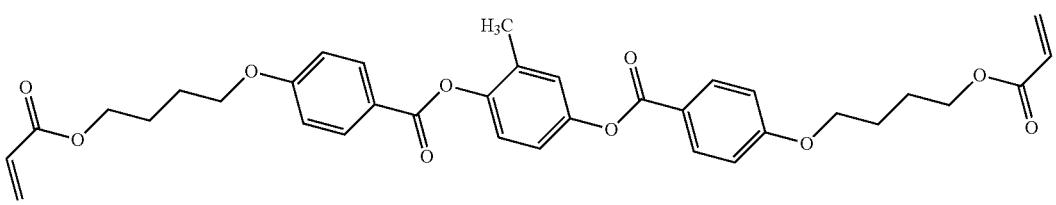 [SMILES: C=CC(=O)OCCCCOc1ccc(C(=O)Oc2ccc(OC(=O)c3ccc(OCCCCOC(=O)C=C)cc3)cc2)cc1]
Comparative Compound 5-C
K 80 N 120 I [2]
40
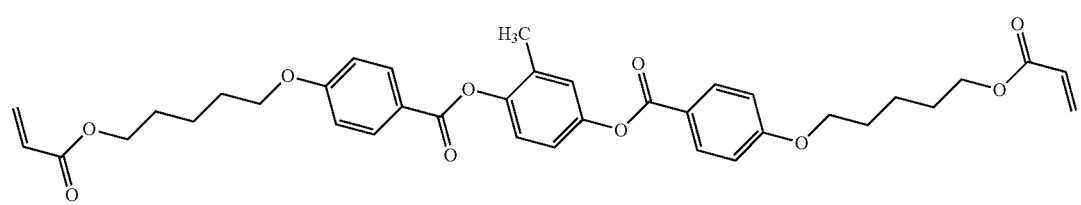
Comparative Compound 6-C
K 93 N 124 I [2]
31
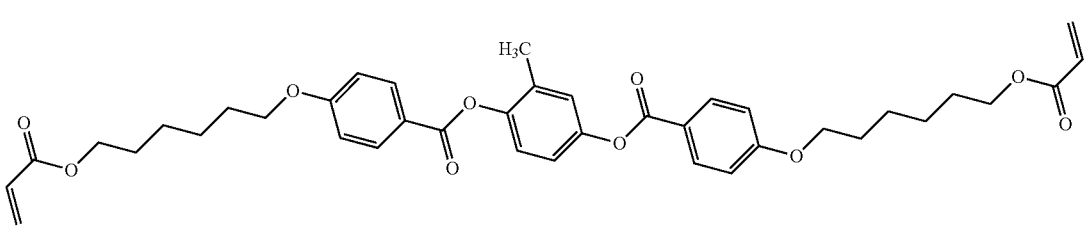 [SMILES: C=CC(=O)OCCCCCCOc1ccc(C(=O)Oc2ccc(OC(=O)c3ccc(OCCCCCCOC(=O)C=C)cc3)cc2)cc1]
Comparative Compound 7-C
K 86 N 116 I [2]
30

TABLE 5-continued

Comparative Compounds and Mixtures

| Compound and 1st Heating Phase Behavior | Nematic Window (deg C) |
|---|---|
| Comparative Compound 8-C<br>K 57 N 105 I [3] | 48 |
| Comparative Compound 9-C<br>K 66 N 117 I [4] | 51 |
| | 49<br>22 |
| Comparative Mixture 2-C (50/50 mole ratio)<br>K 88 N 137 I [5]<br>K 82 N 104 I [6] | |
| | 8 |

TABLE 5-continued

Comparative Compounds and Mixtures

| Compound and 1st Heating Phase Behavior | Nematic Window (deg C) |
|---|---|

Comparative Mixture 3-C (50/50 mole ratio)
K 98 N 106 I [6]

48

Comparative Mixture 4-C (50/50 mole ratio)
K 50 N 98 I [6]

37

25 mol %

25 mol %

TABLE 5-continued

Comparative Compounds and Mixtures

| Compound and 1st Heating Phase Behavior | Nematic Window (deg C) |
|---|---|

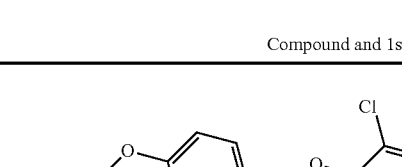

25 mol %

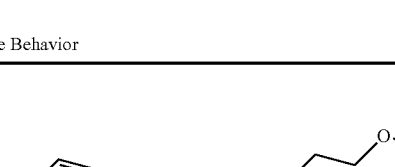

25 mol %
Comparative Mixture 5-C
S 60 N 97 I [6]

References
[1] Macromolecules, 1988, 31, 5940
[2] Makromol. Chem. 192, 59-74 (1991)
[3] WO1998047979
[4] J. Polym. Sci.: Part A: Polym. Chem., Vol. 37, 3929-3935 (1999)
[5] Makromol. Chem. 190, 3201-3215 (1989)
[6] U.S. Pat. No. 5,833,880

Each of the formulae shown herein describes each and all of the separate, individual compounds that can be formed in that formula by (i) selection from within the prescribed range for one of the variable, substituents or numerical coefficients while all of the other variable radicals, substituents or numerical coefficients are held constant, and (ii) performing in turn the same selection from within the prescribed range for each of the other variable radicals, substituents or numerical coefficients with the others being held constant. In addition to a selection made within the prescribed range for any of the variable radicals, substituents or numerical coefficients of only one of the members of the group described by the range, a plurality of compounds may be described by selecting more than one but less than all of the members of the group of radicals, substituents or numerical coefficients. When the selection made within the prescribed range for any of the variable radicals, substituents or numerical coefficients is a subgroup containing (a) only one of the members of the group described by the range, or (b) more than one but less than all of the members of the group, the selected member(s) are selected by omitting those member(s) of the whole group that are not selected to form the subgroup. The compound, or plurality of compounds, may in such event be described as containing one or more variable radicals, substituents or numerical coefficients each of which variable radicals, substituents or numerical coefficients is defined by the members of the whole group, described by the range for that variable radical, substituent or numerical coefficient in the absence of the member(s) omitted to form the subgroup.

Certain features of this invention are described herein in the context of an embodiment that combines various such features together, whether as described in the disclosure or in one of the drawings. The scope of the invention is not, however, limited by the description of only certain features within any particular embodiment, and the invention also includes (1) a subcombination of fewer than all of the features of any described embodiment, which subcombination is characterized by the absence of the features omitted to form the subcombination; (2) each of the features, individually, included within the combination of the described embodiment; and (3) other combinations of features formed from one or more or all of the features of the described embodiment together with other features as disclosed elsewhere herein.

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of this invention is stated or described as comprising, including, containing, having, being composed of or being constituted by or of certain features or elements, one or more features or elements in addition to those explicitly stated or described may be present in the embodiment. An alternative embodiment of this invention, however, may be stated or described as consisting essentially of certain features or elements, in which embodiment features or elements that would materially alter the principle of operation or the distinguishing characteristics of the embodiment are not present therein. A further alternative embodiment of this invention may be stated or described as consisting of certain features or elements, in which embodiment, or in insubstantial variations thereof, only the features or elements specifically stated or described are present.

In this specification, unless explicitly stated otherwise or indicated to the contrary by the context of usage, (a) amounts, sizes, formulations, parameters, and other quantities and characteristics recited herein, particularly when modified by the term "about", may but need not be exact, and may be approximate and/or larger or smaller than stated (as desired), reflecting tolerances, conversion factors, rounding off, measurement error and the like, as well as the inclusion within a stated value of those values outside it that have, within the context of this invention, functional and/or operable equivalence to the stated value;

(b) all numerical quantities of parts, percentage or ratio are given as parts, percentage or ratio by weight;

(c) use of the indefinite article "a" or "an" with respect to a to statement or description of the presence of an element or feature of this invention, does not limit the presence of the element or feature to one in number;

(d) the words "include", "includes" and "including" are to be read and interpreted as if they were followed by the phrase "without limitation" if in fact that is not the case; and (e) the word "or", as used herein, is inclusive; more specifically, the phrase "A or B" means "A, B, or both A and B"; and use of "or" in an exclusive sense is designated, for example, by terms such as "either A or B" and "one of A or B".

What is claimed is:

1. A process comprising:
a) providing one or more organic polyol(s) comprising at least two hydroxyl groups and at least two covalently bonded carbon atoms, each hydroxyl group being bonded to a different carbon atom within an organic polyol;
b) reacting the organic polyol(s) with one or more functionalized alkyl acid(s) of the Formula (V):

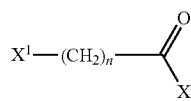
(V)

wherein X is —OH; $X^1$ is selected from the group: Cl, Br, I, -OMs, -OTs and
-OTf; and n is an integer equal to 3 to 20; and a first reaction solvent at a first reaction temperature to provide one or more polyfunctionalized aryl alkanoate ester(s) and a first spent reaction mixture; and
c) reacting the one or more polyfunctionalized aryl alkanoate ester(s) with a (meth)acrylate salt in the presence of a phase transfer catalyst, and a second reaction solvent at a second reaction temperature; to provide one or more poly(meth)acrylate-aryl alkanoate ester(s) and a second spent reaction mixture.

2. The process of claim 1 wherein step (b) further comprises addition of a base; and step (c) further comprises addition of one or more radical inhibitors.

3. The process of claim 2 wherein the base is an amine base and is present in an amount of about 0.8 to about 5 equivalents of the functionalized alkyl acid.

4. A process comprising:
a) providing one or more organic polyol(s) comprising at least two hydroxyl groups and at least two covalently bonded carbon atoms, each hydroxyl group being bonded to a different carbon atom within an organic polyol;
b) reacting the organic polyol(s) with one or more functionalized alkyl acid(s) or acid halide(s) of the Formula (V):

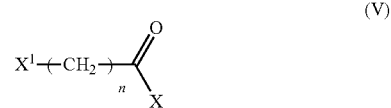
(V)

wherein X is Cl, Br or —OH; $X^1$ is selected from the group: Cl, Br, I, -OMs, -OTs and
-OTf; and n is an integer equal to 3 to 20; and a first reaction solvent at a first reaction temperature to provide one or more polyfunctionalized aryl alkanoate ester(s) and a first spent reaction mixture; and
c) reacting the one or more polyfunctionalized aryl alkanoate ester(s) with a (meth)acrylate salt in the presence of a phase transfer catalyst, and a second reaction solvent at a second reaction temperature; to provide one or more poly(meth)acrylate-aryl alkanoate ester(s) and a second spent reaction mixture;
wherein the second reaction solvent is an aprotic solvent having a dipole moment of less than about 3.5; and the (meth)acrylate salt is selected from an alkali metal salt or ammonium salt.

5. A process comprising:
a) providing one or more organic polyol(s) comprising at least two hydroxyl groups and at least two covalently bonded carbon atoms, each hydroxyl group being bonded to a different carbon atom within an organic polyol;
b) reacting the organic polyol(s) with one or more functionalized alkyl acid(s) or acid halide(s) of the Formula (V):

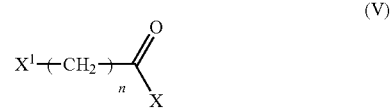
(V)

wherein X is Cl, Br or —OH; $X^1$ is selected from the group: Cl, Br, I, -OMs, -OTs and
-OTf; and n is an integer equal to 3 to 20; and a first reaction solvent at a first reaction temperature to provide one or more polyfunctionalized aryl alkanoate ester(s) and a first spent reaction mixture;
c) reacting the one or more polyfunctionalized aryl alkanoate ester(s) with a (meth)acrylate salt in the presence of a phase transfer catalyst, and a second reaction solvent at a second reaction temperature; to provide one or more poly(meth)acrylate-aryl alkanoate ester(s) and a second spent reaction mixture;
d) separating the one or more polyfunctionalized aryl alkanoate ester(s) from the first spent reaction mixture; and
e) separating the one or more poly(meth)acrylate-aryl alkanoate ester(s) from the second spent reaction mixture.

6. The process of claim 1 wherein the second reaction solvent comprises the first spent reaction mixture.

7. A process comprising:

a) providing one or more organic polyol(s) comprising at least two hydroxyl groups and at least two covalently bonded carbon atoms, each hydroxyl group being bonded to a different carbon atom within an organic polyol;

b) reacting the organic polyol(s) with two or more functionalized alkyl acid halides of the Formula (V):

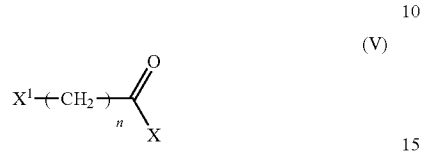

(V)

wherein X is Cl, Br or —OH; $X^1$ is selected from the group: Cl, Br, I, —OMs, -OTs and -OTf; and n is an integer equal to 3 to 20; and a first reaction solvent at a first reaction temperature to provide a mixture of at least three polyfunctionalized aryl alkanoate esters and a first spent reaction mixture; and c) reacting the mixture of polyfunctionalized aryl alkanoate ester(s) with a (meth)acrylate salt in the presence of a phase transfer catalyst, and a second reaction solvent at a second reaction temperature; to provide poly(meth)acrylate-aryl alkanoate esters and a second spent reaction mixture.

8. A process comprising:

a) providing one or more organic polyol(s) comprising at least two hydroxyl groups and at least two covalently bonded carbon atoms, each hydroxyl group being bonded to a different carbon atom within an organic polyol;

b) reacting the organic polyol(s) with one or more functionalized alkyl acid(s) or acid halide(s) of the Formula (V):

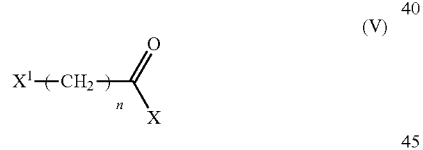

(V)

wherein X is Cl, Br or —OH; $X^1$ is selected from the group: Cl, Br, I, -OMs, -OTs and -OTf; and n is an integer equal to 3 to 20; and a first reaction solvent at a first reaction temperature to provide one or more polyfunctionalized aryl alkanoate ester(s) and a first spent reaction mixture; and c) reacting the one or more polyfunctionalized aryl alkanoate ester(s) with a (meth)acrylate salt in the presence of a phase transfer catalyst, and a second reaction solvent at a second reaction temperature; to provide one or more poly(meth)acrylate-aryl alkanoate ester(s) and a second spent reaction mixture;

wherein said (meth)acrylate salt is provided by mixing (meth)acrylic acid and an alkali metal carbonate selected from potassium hydrogen carbonate or potassium carbonate; in a molar ratio of about 1:1 to about 1:5, respectively, in said second reaction solvent; and said sufficient amount of (meth)acrylate salt is about 2.0 to about 10.0 equivalents of the polyfunctionalized aryl alkanoate ester(s).

9. The process of claim 1 wherein said polyol is a diol selected from the group of compounds of Formulas (VIa-e):

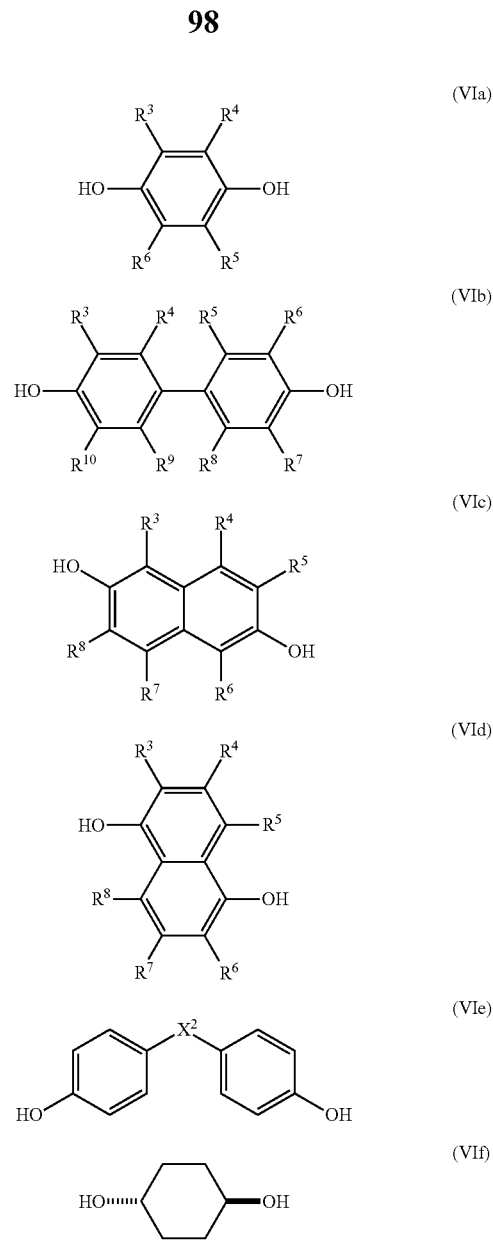

wherein $R^3$-$R^{10}$ are selected from the group: H, $C_1$-$C_8$ straight or branched chain alkyl, $C_1$-$C_8$ straight or branched chain alkyloxy, F, Cl, phenyl, —C(O)CH$_3$, CN and CF$_3$; and $X^2$ is a divalent radical selected from the group: —O—, —(CH$_3$)$_2$C—, and —(CF$_3$)$_2$C—.

10. The process of claim 1 wherein said polyol is an ester diol selected from the group of materials of Formulas (VIIa-g):

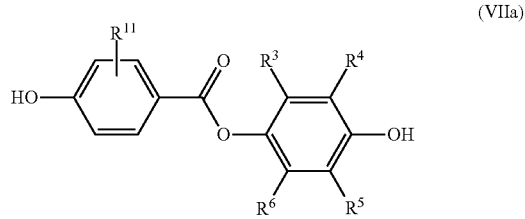

-continued

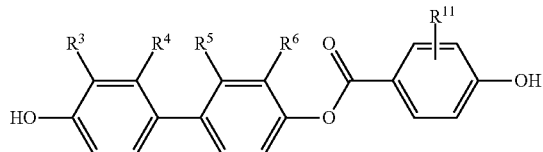
(VIIb)

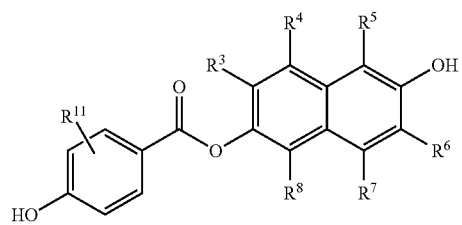
(VIIc)

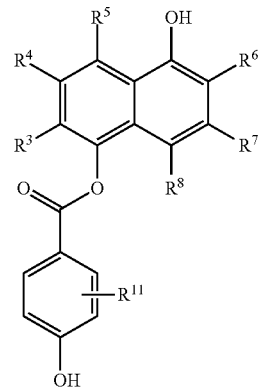
(VIId)

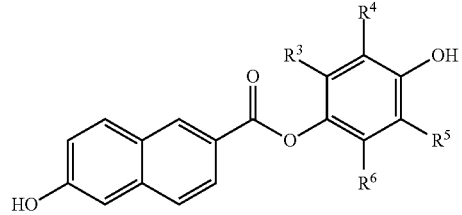
(VIIe)

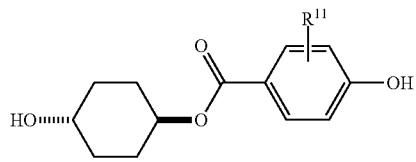
(VIIf)

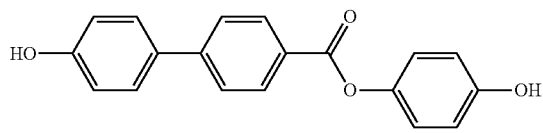
(VIIg)

wherein $R^3$-$R^{10}$ are selected from the group: H, $C_1$-$C_8$ straight or branched chain alkyl, $C_1$-$C_8$ straight or branched chain alkyloxy, F, Cl, phenyl, —C(O)CH$_3$, CN and CF$_3$; and $R^{11}$ is H, —CH$_3$ or —OCH$_3$.

11. The process of claim 1 wherein said polyol is a diester diol selected from the group of compounds of Formulas (VIIIa-e):

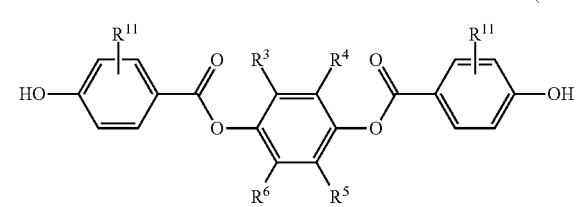
(VIIIa)

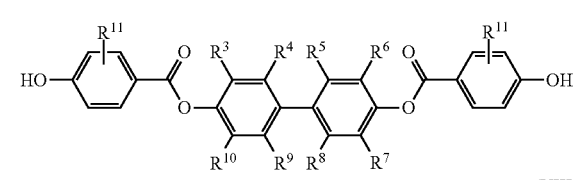
(VIIIb)

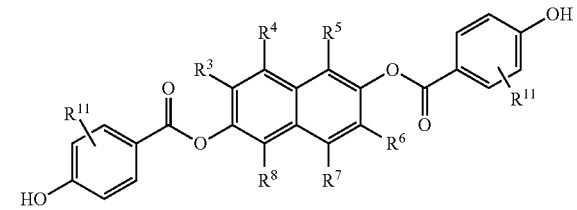
(VIIIc)

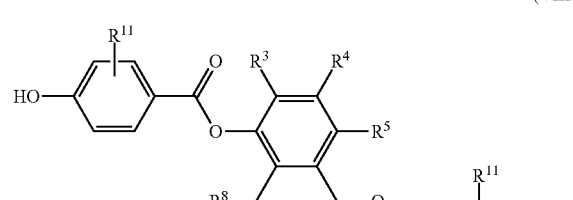
(VIIId)

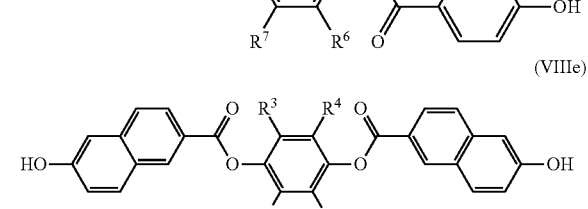
(VIIIe)

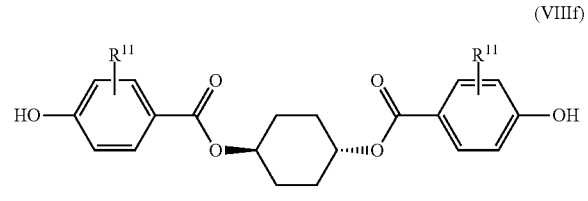
(VIIIf)

wherein $R^3$-$R^{10}$ are selected from the group: H, $C_1$-$C_8$ straight or branched chain alkyl, $C_1$-$C_8$ straight or branched chain alkyloxy, F, Cl, phenyl, —C(O)CH$_3$, CN and CF$_3$; and $R^{11}$ is H, —CH$_3$ or —OCH$_3$.

* * * * *